(12) United States Patent
Lu et al.

(10) Patent No.: US 9,691,017 B2
(45) Date of Patent: Jun. 27, 2017

(54) RECOMBINASE-BASED LOGIC AND MEMORY SYSTEMS

(71) Applicant: Massachusetts Institute of Technology, Cambridge, MA (US)

(72) Inventors: Timothy Kuan-Ta Lu, Charlestown, MA (US); Piro Siuti, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 696 days.

(21) Appl. No.: 14/105,994

(22) Filed: Dec. 13, 2013

(65) Prior Publication Data

US 2014/0315310 A1 Oct. 23, 2014

Related U.S. Application Data

(60) Provisional application No. 61/757,113, filed on Jan. 26, 2013, provisional application No. 61/736,792, filed on Dec. 13, 2012.

(51) Int. Cl.
*G06F 19/16* (2011.01)
*G06F 19/18* (2011.01)
*G06F 19/22* (2011.01)
*G06N 3/00* (2006.01)

(52) U.S. Cl.
CPC .................................. *G06N 3/002* (2013.01)

(58) Field of Classification Search
None
See application file for complete search history.

(56) References Cited

FOREIGN PATENT DOCUMENTS

| CN | 102224249 A | 10/2011 |
|---|---|---|
| CN | 102656178 A | 9/2012 |
| WO | WO 2010/075441 A1 | 7/2010 |
| WO | WO 2013/169867 A1 | 11/2013 |

OTHER PUBLICATIONS

Ajo-Franklin et al., Rational design of memory in eukaryotic cells. Genes Dev. Sep. 15, 2007;21(18):2271-6.
Benenson, Biomolecular computing systems: principles, progress and potential. Nat Rev Genet. Jun. 12, 2012;13(7):455-68. doi: 10.1038/nrg3197.
Bonnet et al., Rewritable digital data storage in live cells via engineered control of recombination directionality. Proc Natl Acad Sci U S A. Jun. 5, 2012;109(23):8884-9. doi: 10.1073/pnas. 1202344109. Epub May 21, 2012.
Burrill et al., Making cellular memories. Cell. Jan. 8, 2010;140(1):13-8. doi: 10.1016/j.cell.2009.12.034.
Ellis et al., Diversity-based, model-guided construction of synthetic gene networks with predicted functions. Nat Biotechnol. May 2009;27(5):465-71. doi: 10.1038/nbt.1536. Epub Apr. 19, 2009.
Friedland et al., Synthetic gene networks that count. Science. May 29, 2009;324(5931):1199-202. doi:10.1126/science.1172005.

(Continued)

*Primary Examiner* — Larry D Riggs, II
(74) *Attorney, Agent, or Firm* — Wolf, Greenfield & Sacks, P.C.

(57) ABSTRACT

The invention provides, inter alia, recombinase-based systems that provide for integrated logic and memory in living cells.

25 Claims, 62 Drawing Sheets

(56) References Cited

OTHER PUBLICATIONS

Ham et al., Design and construction of a double inversion recombination switch for heritable sequential genetic memory. PLoS One. Jul. 30, 2008;3(7):e2815. doi: 10.1371/journal.pone.0002815.
Marchisio, In silico design and in vivo implementation of yeast gene Boolean gates. J Biol Eng. Feb. 2, 2014;8(1):6. doi: 10.1186/1754-1611-8-6.
Regot et al., Distributed biological computation with multicellular engineered networks. Nature. Jan. 13, 2011;469(7329):207-11. doi: 10.1038/nature09679. Epub Dec. 8, 2010.
Stanton et al., Genomic mining of prokaryotic repressors for orthogonal logic gates. Nat Chem Biol. Feb. 2014;10(2):99-105. doi: 10.1038/nchembio.1411. Epub Dec. 8, 2013.
Tamsir et al., Robust multicellular computing using genetically encoded NOR gates and chemical 'wires'. Nature. Jan. 13, 2011;469(7329):212-5. doi: 10.1038/nature09565. Epub Dec. 8, 2010.
Ausländer et al., Programmable single-cell mammalian biocomputers. Nature. Jul. 5, 2012;487(7405):123-7. doi: 10.1038/nature11149.
Bacchus et al., Synthetic two-way communication between mammalian cells. Nat Biotechnol. Oct. 2012;30(10):991-6. doi: 10.1038/nbt.2351. Epub Sep. 16, 2012.
Bennett et al., Microfluidic devices for measuring gene network dynamics in single cells. Nat Rev Genet. Sep. 2009;10(9):628-38. doi: 10.1038/nrg2625. Epub Aug. 11, 2009.
Blancafort et al., Genetic reprogramming of tumor cells by zinc finger transcription factors. Proc Natl Acad Sci U S A. Aug. 16, 2005;102(33):11716-21. Epub Aug. 4, 2005.
Blount et al., Rational diversification of a promoter providing fine-tuned expression and orthogonal regulation for synthetic biology. PLoS One. 2012;7(3):e33279. doi: 10.1371/journal.pone.0033279. Epub Mar. 19, 2012.
Callura et al., Genetic switchboard for synthetic biology applications. Proc Natl Acad Sci U S A. Apr. 10, 2012;109(15):5850-5. doi: 10.1073/pnas.1203808109. Epub Mar. 27, 2012.
Callura et al., Tracking, tuning, and terminating microbial physiology using synthetic riboregulators. Proc Natl Acad Sci U S A. Sep. 7, 2010;107(36):15898-903. doi: 10.1073/pnas.1009747107. Epub Aug. 16, 2010.
Cheng et al., Synthetic biology: an emerging engineering discipline. Annu Rev Biomed Eng. 2012;14:155-78. doi: 10.1146/annurev-bioeng-071811-150118. Epub May 7, 2012.
Collomns et al., Rapid metabolic pathway assembly and modification using serine integrase site-specific recombination. Nucleic Acids Res. Feb. 2014;42(4):e23. doi: 10.1093/nar/gkt1101. Epub Nov. 12, 2013.
Colman-Lerner et al., Yeast Cbk1 and Mob2 activate daughter-specific genetic programs to induce asymmetric cell fates. Cell. Dec. 14, 2001;107(6):739-50.
Daniel et al., Synthetic analog computation in living cells. Nature. May 30, 2013;497(7451):619-23. doi: 10.1038/nature12148. Epub May 15, 2013.
Datsenko et al., One-step inactivation of chromosomal genes in *Escherichia coli* K-12 using PCR products. Proc Natl Acad Sci U S A. Jun. 6, 2000;97(12):6640-5.
Davis et al., Design, construction and characterization of a set of insulated bacterial promoters. Nucleic Acids Res. Feb. 2011;39(3):1131-41. doi: 10.1093/nar/gkq810. Epub Sep. 15, 2010.
Dvir et al., Deciphering the rules by which 5'-UTR sequences affect protein expression in yeast. Proc Natl Acad Sci U S A. Jul. 23, 2013;110(30):E2792-801. doi: 10.1073/pnas.1222534110. Epub Jul. 5, 2013.
Elowitz et al., A synthetic oscillatory network of transcriptional regulators. Nature. Jan. 20, 2000;403(6767):335-8.
Ferreira et al., Tuning gene expression with synthetic upstream open reading frames. Proc Natl Acad Sci U S A. Jul. 9, 2013;110(28):11284-9. doi: 10.1073/pnas.1305590110. Epub Jun. 24, 2013.

Flagfeldt et al., Characterization of chromosomal integration sites for heterologous gene expression in *Saccharomyces cerevisiae*. Yeast. Oct. 2009;26(10):545-51. doi: 10.1002/yea.1705.
Friedland et al., Synthetic gene networks that count. Science. May 29, 2009;324(5931):1199202. doi: 10.1126/science.1172005.
Gerasimova et al., Chromatin insulators and boundaries: effects on transcription and nuclear organization. Annu Rev Genet. 2001;35:193-208.
Ghosh et al., Control of phage Bxb1 excision by a novel recombination directionality factor. PLoS Biol. Jun. 2006;4(6):e186.
Ghosh et al., Synapsis in phage Bxb1 integration: selection mechanism for the correct pair of recombination sites. J Mol Biol. Jun. 3, 2005;349(2):331-48. Epub Apr. 7, 2005.
Ghosh et al., The orientation of mycobacteriophage Bxb1 integration is solely dependent on the central dinucleotide of attP and attB. Mol Cell. Nov. 2003;12(5):1101-11.
Ghosh et al., Two-step site selection for serine-integrase-mediated excision: DNA-directed integrase conformation and central dinucleotide proofreading. Proc Natl Acad Sci U S A. Mar. 4, 2008;105(9):3238-43. doi: 10.1073/pnas.0711649105. Epub Feb. 25, 2008.
Gibson et al., Enzymatic assembly of DNA molecules up to several hundred kilobases. Nat Methods. May 2009;6(5):343-5. doi: 10.1038/nmeth.1318. Epub Apr. 12, 2009.
Gordley et al., Synthesis of programmable integrases. Proc Natl Acad Sci U S A. Mar. 31, 2009;106(13):5053-8. doi:10.1073/pnas.0812502106. Epub Mar. 12, 2009.
Grilly et al., A synthetic gene network for tuning protein degradation in *Saccharomyces cerevisiae*. Mol Syst Biol. 2007;3:127. Epub Jul. 31, 2007.
Groth et al., A phage integrase directs efficient site-specific integration in human cells. Proc Natl Acad Sci U S A. May 23, 2000;97(11):5995-6000.
Groth et al., Phage integrases: biology and applications. J Mol Biol. Jan. 16, 2004;335(3):667-78.
Ham et al., A tightly regulated inducible expression system utilizing the fim inversion recombination switch. Biotechnol Bioeng. May 5, 2006;94(1):1-4.
Hasty et al., Engineered gene circuits. Nature. Nov. 14, 2002;420(6912):224-30.
Haynes et al., Engineering bacteria to solve the Burnt Pancake Problem. J Biol Eng. May 20, 2008;2:8. doi: 10.1186/1754-1611-2-8.
Isaacs et al., Engineered riboregulators enable post-transcriptional control of gene expression. Nat Biotechnol. Jul. 2004;22(7):841-7. Epub Jun. 20, 2004.
Jang et al., Specification and simulation of synthetic multicelled behaviors. ACS Synth Biol. Aug. 17, 2012;1(8):365-74. doi: 10.1021/sb300034m. Epub Jul. 31, 2012.
Kang et al., Zinc finger proteins as designer transcription factors. J Biol Chem. Mar. 24, 2000;275(12):8742-8.
Khalil et al., A synthetic biology framework for programming eukaryotic transcription functions. Cell. Aug. 3, 2012;150(3):647-58. doi: 10.1016/j.cell.2012.05.045.
Kilby et al., Site-specific recombinases: tools for genome engineering. Trends Genet. Dec. 1993;9(12):413-21.
Kim et al., Mycobacteriophage Bxb1 integrates into the *Mycobacterium smegmatis* groEL1 gene. Mol Microbiol. Oct. 2003;50(2):463-73.
Kim et al., Construction of combinatorial libraries that encode zinc finger-based transcription factors. Methods Mol Biol. 2010;649:133-47. doi: 10.1007/978-1-60761-753-2_8.
Lindstrom et al., The mother enrichment program: a genetic system for facile replicative life span analysis in *Saccharomyces cerevisiae*. Genetics. Oct. 2009;183(2):413-22, 1SI-13SI. doi: 10.1534/genetics.109.106229. Epub Aug. 3, 2009.
Loessner et al., Complete nucleotide sequence, molecular analysis and genome structure of bacteriophage A118 of *Listeria monocytogenes*: implications for phage evolution. Mol Microbiol. Jan. 2000;35(2):324-40.
Lorbach et al., Site-specific recombination in human cells catalyzed by phage lambda integrase mutants. J Mol Biol. Mar. 10, 2000;296(5):1175-81.

(56) References Cited

OTHER PUBLICATIONS

Lou et al., Ribozyme-based insulator parts buffer synthetic circuits from genetic context. Nat Biotechnol. Nov. 2012;30(11):1137-42. doi: 10.1038/nbt.2401. Epub Oct. 3, 2012.

Lu et al., Next-generation synthetic gene networks. Nat Biotechnol. Dec. 2009;27(12):1139-50. doi: 10.1038/nbt.1591.

Lux et al., Genetic design automation: engineering fantasy or scientific renewal? Trends Biotechnol. Feb. 2012;30(2):120-6. doi: 10.1016/j.tibtech.2011.09.001. Epub Oct. 14, 2011.

Matsuura et al., The sre gene (ORF469) encodes a site-specific recombinase responsible for integration of the R4 phage genome. J Bacteriol. Jun. 1996;178(11):3374-6.

Mcmillen et al., Synchronizing genetic relaxation oscillators by intercell signaling. Proc Natl Acad Sci U S A. Jan. 22, 2002;99(2):679-84.

Mijakovic et al., Tunable promoters in systems biology. Curr Opin Biotechnol. Jun. 2005;16(3):329-35.

Mutalik et al., Precise and reliable gene expression via standard transcription and translation initiation elements. Nat Methods. Apr. 2013;10(4):354-60. doi: 10.1038/nmeth.2404. Epub Mar. 10, 2013.

Neuteboom et al., Effects of different zinc finger transcription factors on genomic targets. Biochem Biophys Res Commun. Jan. 6, 2006;339(1):263-70. Epub Nov. 10, 2005.

Nevozhay et al., Negative autoregulation linearizes the dose-response and suppresses the heterogeneity of gene expression. Proc Natl Acad Sci U S A. Mar. 31, 2009;106(13):5123-8. doi: 10.1073/pnas.0809901106. Epub Mar. 11, 2009.

Nissim et al., A tunable dual-promoter integrator for targeting of cancer cells. Mol Syst Biol. Dec. 21, 2010;6:444. doi: 10.1038/msb.2010.99.

Ow et al., Conditionally replicating plasmid vectors that can integrate into the Klebsiella pneumoniae chromosome via bacteriophage P4 site-specific recombination. J Bacteriol. Aug. 1983;155(2):704-13.

Qi et al., RNA processing enables predictable programming of gene expression. Nat Biotechnol. Oct. 2012;30(10):1002-6. doi: 10.1038/nbt.2355. Epub Sep. 16, 2012.

Rinaudo et al., A universal RNAi-based logic evaluator that operates in mammalian cells. Nat Biotechnol. Jul. 2007;25(7):795-801. Epub May 21, 2007.

Ringrose et al., Quantitative comparison of DNA looping in vitro and in vivo: chromatin increases effective DNA flexibility at short distances. EMBO J. Dec. 1, 1999;18(23):6630-41.

Siuti et al., Synthetic circuits integrating logic and memory in living cells. Nat Biotechnol. May 2013;31(5):448-52. doi: 10.1038/nbt.2510. Epub Feb. 10, 2013.

Tabor et al., A synthetic genetic edge detection program. Cell. Jun. 26, 2009;137(7):1272-81. doi: 10.1016/j.cell.2009.04.048.

Thomson et al., Site-specific recombination systems for the genetic manipulation of eukaryotic genomes. Genesis. Oct. 2006;44(10):465-76.

Voth et al., Yeast vectors for integration at the HO locus. Nucleic Acids Res. Jun. 15, 2001;29(12):E59-9.

Win et al., Higher-order cellular information processing with synthetic RNA devices. Science. Oct. 17, 2008;322(5900):456-60. doi: 10.1126/science.1160311.

You et al., Programmed population control by cell-cell communication and regulated killing. Nature. Apr. 22, 2004;428(6985):868-71. Epub Apr. 4, 2004.

Zhang et al., DNA cleavage is independent of synapsis during Streptomyces phage phiBT1 integrase-mediated site-specific recombination. J Mol Cell Biol. Oct. 2010;2(5):264-75. doi: 10.1093/jmcb/mjq025.

Logic Gate 1

Logic Gate 2

Add AHL Only =
Expression of RFP (red)

Add AHL First and then
add aTc second =
Expression of GFP (green)

SEQUENCE LISTING

<160> NUMBER OF SEQ ID NOS: 16

<210> SEQ ID NO 1
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 1
ggcgcgtact cctaagaaac                                               20

<210> SEQ ID NO 2
<211> LENGTH: 20
<212> TYPE: DNA
<213> ORGANISM: Artificial Sequence
<220> FEATURE:
<223> OTHER INFORMATION: Synthetic oligonucleotide

<400> SEQUENCE: 2
tctccgtcgt caggatcatc                                               20

<210> SEQ ID NO 3
<211> LENGTH: 25
<212> TYPE: DNA
<213> ORGANISM: Artificial Sequence
<220> FEATURE:
<223> OTHER INFORMATION: Synthetic oligonucleotide

<400> SEQUENCE: 3
attaaagagg agaaaggtac catgc                                         25

<210> SEQ ID NO 4
<211> LENGTH: 28
<212> TYPE: DNA
<213> ORGANISM: Artificial Sequence
<220> FEATURE:
<223> OTHER INFORMATION: Synthetic oligonucleotide

<400> SEQUENCE: 4
aaagttaaac aaaattattt gtagaggg                                      28

<210> SEQ ID NO 5
<211> LENGTH: 144
<212> TYPE: DNA
<213> ORGANISM: Artificial Sequence
<220> FEATURE:
<223> OTHER INFORMATION: Synthetic oligonucleotide

<400> SEQUENCE: 5
cacagctaac accacgtcgt ccctatctgc tgccctaggt ctatgagtgg ttgctggata    60
actttacggg catgcataag gctcgtataa tatattcagg gagaccacaa cggtttccct   120
ctacaaataa ttttgtttaa cttt                                         144

<210> SEQ ID NO 6
<211> LENGTH: 105
<212> TYPE: DNA
<213> ORGANISM: Artificial Sequence
<220> FEATURE:
<223> OTHER INFORMATION: Synthetic oligonucleotide

<400> SEQUENCE: 6
ggcatcaaat aaaacgaaag gctcagtcga aagactgggc ctttcgtttt atctgttgtt    60
tgtcggtgaa cgctctcctg agtaggacaa atccgccgcc ctaga                  105

<210> SEQ ID NO 7
<211> LENGTH: 717
<212> TYPE: DNA
<213> ORGANISM: Artificial Sequence
<220> FEATURE:
<223> OTHER INFORMATION: Synthetic oligonucleotide

<400> SEQUENCE: 7

| | | | | | | |
|---|---|---|---|---|---|---|
| atgcgtaaag | gagaagaact | tttcactgga | gttgtcccaa | ttcttgttga | attagatggt | 60 |
| gatgttaatg | ggcacaaatt | ttctgtcagt | ggagagggtg | aaggtgatgc | aacatacgga | 120 |
| aaacttaccc | ttaaatttat | ttgcactact | ggaaaactac | ctgttccatg | gccaacactt | 180 |
| gtcactactt | tcggttatgg | tgttcaatgc | tttgcgagat | acccagatca | tatgaaacag | 240 |
| catgactttt | tcaagagtgc | catgcccgaa | ggttatgtac | aggaaagaac | tatattttc | 300 |
| aaagatgacg | ggaactacaa | gacacgtgct | gaagtcaagt | ttgaaggtga | tacccttgtt | 360 |
| aatagaatcg | agttaaaagg | tattgatttt | aaagaagatg | gaaacattct | tggacacaaa | 420 |
| ttggaataca | actataactc | acacaatgta | tacatcatgg | cagacaaaca | aaagaatgga | 480 |
| atcaaagtta | acttcaaaat | tagacacaac | attgaagatg | gaagcgttca | actagcagac | 540 |
| cattatcaac | aaaatactcc | aattggcgat | ggccctgtcc | ttttaccaga | caaccattac | 600 |
| ctgtccacac | aatctgccct | ttcgaaagat | cccaacgaaa | agagagacca | catggtcctt | 660 |
| cttgagtttg | taacagctgc | tgggattaca | catggcatgg | atgaactata | caaataa | 717 |

<210> SEQ ID NO 8
<211> LENGTH: 1503
<212> TYPE: DNA
<213> ORGANISM: Artificial Sequence
<220> FEATURE:
<223> OTHER INFORMATION: Synthetic oligonucleotide

<400> SEQUENCE: 8

| | | | | | | |
|---|---|---|---|---|---|---|
| atgagagccc | tggtagtcat | ccgcctgtcc | cgcgtcaccg | atgctacgac | ttcaccggag | 60 |
| cgtcagctgg | agtcttgcca | gcagctctgc | gcccagcgcg | gctgggacgt | cgtcggggta | 120 |
| gcggaggatc | tggacgtctc | cggggcggtc | gatccgttcg | accggaagcg | cagaccgaac | 180 |
| ctggcccggt | ggctagcgtt | cgaggagcaa | ccgttcgacg | tgatcgtggc | gtaccggta | 240 |
| gaccggttga | cccgatcgat | ccggcatctg | cagcagctgg | tccactgggc | cgaggaccac | 300 |
| aagaagctgg | tcgtctccgc | gaccgaagcg | cacttcgata | cgacgacgcc | gtttgcggcg | 360 |
| gtcgtcatcg | cgcttatggg | aacggtggcg | cagatggaat | agaagcgat | caaagagcgg | 420 |
| aaccgttcgg | ctgcgcattt | caatatccgc | gccgggaaat | accgaggatc | cctgccgccg | 480 |
| tgggatacc | tgcctacgcg | cgtggacggg | gagtggcggc | tggtgccgga | ccctgtgcag | 540 |
| cgagagcgca | tcctcgaggt | gtatcaccgc | gtcgtcgaca | ccacgagcc | gctgcacctg | 600 |
| gtggcccacg | acctgaaccg | gcgtggtgtc | ctgtcgccga | aggactactt | cgcgcagctg | 660 |
| caaggccgcg | agccgcaggg | ccgggagtgg | tcggctaccg | cgctgaagcg | atcgatgatc | 720 |
| tccgaggcga | tgctcgggta | cgcgactctg | aacggtaaga | ccgtccgaga | cgacgacgga | 780 |
| gccccgctgg | tgcgggctga | gccgatcctg | accgtgagc | agctgaggc | gctgcgcgcc | 840 |
| gagctcgtga | agacctcccg | ggcgaagccc | gcggtgtcta | ccccgtcgct | gctgctgcgg | 900 |
| gtgttgttct | gcgcggtgtg | cgggggagccc | gcgtacaagt | cgccggggg | aggacgtaag | 960 |
| cacccgcgct | accgctgccg | ctcgatgggg | ttcccgaagc | actgcgggaa | cggcacggtg | 1020 |
| gcgatggccg | agtgggacgc | gttctgcgag | gagcaggtgc | tggatctgct | cggggacgcg | 1080 |

-continued

| | |
|---|---|
| gagcgtctgg agaaagtctg ggtagccggc tcggactccg cggtcgaact cgcggaggtg | 1140 |
| aacgcggagc tggtggacct gacgtcgctg atcggctccc cggcctaccg ggccggctct | 1200 |
| ccgcagcgag aagcactgga tgcccgtatt gcggcgctgg ccgcgcggca agaggagctg | 1260 |
| gagggtctag aggctcgccc gtctggctgg gagtggcgcg agaccgggca gcggttcggg | 1320 |
| gactggtggc gggagcagga caccgcggca agaacacct ggcttcggtc gatgaacgtt | 1380 |
| cggctgacgt tcgacgtccg cggcgggctg actcgcacga tcgacttcgg ggatctgcag | 1440 |
| gagtacgagc agcatctcag gctcggcagc gtggtcgaac ggctacacac cgggatgtcg | 1500 |
| tag | 1503 |

<210> SEQ ID NO 9
<211> LENGTH: 50
<212> TYPE: DNA
<213> ORGANISM: Artificial Sequence
<220> FEATURE:
<223> OTHER INFORMATION: Synthetic oligonucleotide

<400> SEQUENCE: 9

| | |
|---|---|
| tcggccggct tgtcgacgac ggcggtctcc gtcgtcagga tcatccgggc | 50 |

<210> SEQ ID NO 10
<211> LENGTH: 58
<212> TYPE: DNA
<213> ORGANISM: Artificial Sequence
<220> FEATURE:
<223> OTHER INFORMATION: Synthetic oligonucleotide

<400> SEQUENCE: 10

| | |
|---|---|
| gtcgtggttt gtctggtcaa ccaccgcggt ctcagtggtg tacggtacaa accccgac | 58 |

<210> SEQ ID NO 11
<211> LENGTH: 1842
<212> TYPE: DNA
<213> ORGANISM: Artificial Sequence
<220> FEATURE:
<223> OTHER INFORMATION: Synthetic oligonucleotide

<400> SEQUENCE: 11

| | |
|---|---|
| atgacacaag gggttgtgac cggggtggac acgtacgcgg gtgcttacga ccgtcagtcg | 60 |
| cgcgagcgcg agaattcgag cgcagcaagc ccagcgacac agcgtagcgc caacgaagac | 120 |
| aaggcggccg accttcagcg cgaagtcgag cgcgacgggg gccggttcag gttcgtcggg | 180 |
| catttcagcg aagcgccggg cacgtcggcg ttcgggacgg cggagcgccc ggagttcgaa | 240 |
| cgcatcctga acgaatgccg cgccgggcgg ctcaacatga tcattgtcta tgacgtgtcg | 300 |
| cgcttctcgc gcctgaaggt catggacgcg attccgattg tctcggaatt gctcgccctg | 360 |
| ggcgtgacga ttgtttccac tcaggaaggc gtcttccggc agggaaacgt catggacctg | 420 |
| attcacctga ttatgcggct cgacgcgtcg cacaaagaat cttcgctgaa gtcggcgaag | 480 |
| attctcgaca cgaagaacct tcagcgcgaa ttgggcgggt acgtcggcgg gaaggcgcct | 540 |
| tacggcttcg agcttgtttc ggagacgaag gagatcacgc gcaacggccg aatggtcaat | 600 |
| gtcgtcatca acaagcttgc gcactcgacc actccccctta ccggacccct tcgagttcgag | 660 |
| cccgacgtaa tccggtggtg gtggcgtgag atcaagacgc acaaacacct tcccttcaag | 720 |
| ccgggcagtc aagccgccat tcacccgggc agcatcacgg gctttgtaa gcgcatggac | 780 |
| gctgacgccg tgccgaccccg gggcgagacg attgggaaga agaccgcttc aagcgcctgg | 840 |
| gacccggcaa ccgttatgcg aatccttcgg gacccgcgta ttgcgggctt cgccgctgag | 900 |

```
gtgatctaca agaagaagcc ggacggcacg ccgaccacga agattgaggg ttaccgcatt      960
cagcgcgacc cgatcacgct ccggccggtc gagcttgatt gcggaccgat catcgagccc     1020
gctgagtggt atgagcttca ggcgtggttg gacggcaggg ggcgcggcaa ggggctttcc     1080
cgggggcaag ccattctgtc cgccatggac aagctgtact gcgagtgtgg cgccgtcatg     1140
acttcgaagc gcggggaaga atcgatcaag gactcttacc gctgccgtcg ccggaaggtg     1200
gtcgacccgt ccgcacctgg gcagcacgaa ggcacgtgca acgtcagcat ggcggcactc     1260
gacaagttcg ttgcggaacg catcttcaac aagatcaggc acgccgaagg cgacgaagag     1320
acgttggcgc ttctgtggga agccgcccga cgcttcggca agctcactga ggcgcctgag     1380
aagagcggcg aacgggcgaa ccttgttgcg gagcgcgccg acgccctgaa cgcccttgaa     1440
gagctgtacg aagaccgcgc ggcaggcgcg tacgacggac ccgttggcag gaagcacttc     1500
cggaagcaac aggcagcgct gacgctccgg cagcaagggg cggaagagcg gcttgccgaa     1560
cttgaagccg ccgaagcccc gaagcttccc cttgaccaat ggttccccga agacgccgac     1620
gctgacccga ccggccctaa gtcgtggtgg gggcgcgcgt cagtagacga caagcgcgtg     1680
ttcgtcgggc tcttcgtaga caagatcgtt gtcacgaagt cgactacggg caggggcag     1740 ggaacgccca tcgagaagcg cgcttcgatc acgtgggcga agccgccgac cgacgacgac     1800
gaagacgacg cccaggacgg cacggaagac gtagcggcgt ag                        1842

<210> SEQ ID NO 12
<211> LENGTH: 45
<212> TYPE: DNA
<213> ORGANISM: Artificial Sequence
<220> FEATURE:
<223> OTHER INFORMATION: Synthetic oligonucleotide

<400> SEQUENCE: 12
tgcgggtgcc agggcgtgcc cttgggctcc ccgggcgcgt actcc                       45

<210> SEQ ID NO 13
<211> LENGTH: 42
<212> TYPE: DNA
<213> ORGANISM: Artificial Sequence
<220> FEATURE:
<223> OTHER INFORMATION: Synthetic oligonucleotide

<400> SEQUENCE: 13
gtgccccaac tggggtaacc tttgagttct ctcagttggg gg                          42

<210> SEQ ID NO 14
<211> LENGTH: 144
<212> TYPE: DNA
<213> ORGANISM: Artificial Sequence
<220> FEATURE:
<223> OTHER INFORMATION: Synthetic oligonucleotide

<400> SEQUENCE: 14
cacagctaac accacgtcgt ccctatctgc tgccctaggt ctatgagtgg ttgctggata       60
actttacggg catgcataag gctcgtaggc tatattcagg gagaccacaa cggtttccct      120
ctacaaataa ttttgtttaa cttt                                             144

<210> SEQ ID NO 15
<211> LENGTH: 144
<212> TYPE: DNA
<213> ORGANISM: Artificial Sequence
<220> FEATURE:
<223> OTHER INFORMATION: Synthetic oligonucleotide
```

```
<400> SEQUENCE: 15
cacagctaac accacgtcgt ccctatctgc tgccctaggt ctatgagtgg ttgctggata        60
actttacggg catgcataag gctcgtatga tatattcagg gagaccacaa cggtttccct       120
ctacaaataa ttttgtttaa cttt                                              144

<210> SEQ ID NO 16
<211> LENGTH: 75
<212> TYPE: DNA
<213> ORGANISM: Artificial Sequence
<220> FEATURE:
<223> OTHER INFORMATION: Synthetic oligonucleotide

<400> SEQUENCE: 16
agctgtcacc ggatgtgctt tccggtctga tgagtccgtg aggacgaaac agcctctaca        60
aataattttg tttaa                                                         75
```

RECOMBINASE-BASED LOGIC AND MEMORY SYSTEMS

RELATED APPLICATIONS

This application claims the benefit under 35 U.S.C. §119 (e) of U.S. provisional application No. 61/736,792, filed Dec. 13, 2012, and of U.S. provisional application No. 61/757,113, filed Jan. 26, 2013, each of which is incorporated by reference herein in its entirety.

FEDERALLY SPONSORED RESEARCH

This invention was made with government support under Grant No. OD008435 awarded by the National Institutes of Health and under Contract No. N66001-12-C-4016 awarded by the Space and Naval Warfare Systems Center. The government has certain rights in the invention.

BACKGROUND OF THE INVENTION

A central goal of synthetic biology is to create cellular networks that integrate input signals for decision making and actuation [1]. In recent years, artificial logic gates [2-4] and memory devices [5,6] have been independently constructed. In previous implementations of cellular logic, complex gates required the layering of multiple genetic circuits [2,7], thus necessitating significant efforts for circuit construction and tuning. These complex logic gates can achieve only combinatorial logic.

SUMMARY OF THE INVENTION

The invention provides, inter alia, synthetic recombinase-based systems for integrating combinatorial logic and memory in living cells. Integrated logic and memory are crucial for performing complex and persistent state-dependent computation such as sequential logic [8]. Using a defined set of programming rules, the logic and memory systems of the invention enable efficient, one-step assembly of any Boolean logic function with stable, DNA-based memory of events. These systems utilize chemical inducer inputs to drive the expression of orthogonal recombinases from promoters. These recombinases target genetic elements for DNA inversion, or excision, resulting in conditional nucleic acid expression. Such logic and memory systems are useful for a variety of applications, including programming cellular state machines, behaviors and pathways for therapeutic, diagnostic and basic science applications.

Thus, in some aspects of the invention, provided herein are synthetic logic and memory systems operable in a single cell, the systems comprising a plurality of nucleic acid sequences encoding at least two promoters and at least two recombinases, wherein each of the plurality of recombinase-encoding nucleic acid sequences is operably linked to a different promoter, a plurality of logic gates that are single genetic circuit constructs of an output nucleic acid sequence operably linked, or conditionally operably linked, to a genetic regulatory element such as a promoter and/or a unidirectional terminator, wherein at least one of the output nucleic acid, the genetic regulatory element such as the promoter and the unidirectional terminator is flanked by a forward and a reverse recognition site of at least one of the recombinases, and wherein the logic gates provide all two-input Boolean logic functions except TRUE and FALSE logic gates.

In some aspects of the invention, provided herein are synthetic logic and memory systems operable in a single cell, the systems comprising a plurality of nucleic acid sequences encoding at least two promoters and at least two recombinases, wherein each of the plurality of recombinase-encoding nucleic acid sequences is operably linked to a different promoter, a plurality of logic gates that are single genetic circuit constructs of an output nucleic acid sequence operably linked, or conditionally operably linked, to a genetic regulatory element such as a promoter and/or a unidirectional terminator, wherein at least one of the output nucleic acid and the genetic regulatory element, such as the promoter and the unidirectional terminator, is flanked by a forward and a reverse recognition site of at least one of the recombinases, and wherein the logic gates provide at least two two-input Boolean logic functions. In some embodiments, the logic gates provide at least three, at least four at least five, at least six, at least 7, at least 8 or at least 9 two-input Boolean logic functions. In some embodiments, the logic gates provide TRUE and FALSE logic gates, while in other embodiments the logic gates do not provide TRUE and FALSE logic gates.

The expression of the recombinases is operably linked to a signal of interest, such as an external input or a cellular regulatory signal. In some embodiments, one or more of the at least two promoters is/are inducible promoters.

In some embodiments, the at least two recombinases are irreversible recombinases. In some embodiments, the at least two irreversible recombinases are serine recombinases. In some embodiments, the serine recombinases are Bxb1 and phiC31.

In some embodiments, the logic gates are NOR, AND, OR, NAND, A, NOT A, B, NOT B, A IMPLY B, A NIMPLY B, B IMPLY A, B NIMPLY A, XOR and XNOR. In some embodiments, the synthetic logic and memory systems of the invention further comprise TRUE and/or FALSE logic gates, wherein the TRUE logic gate is a single genetic circuit construct of an output nucleic acid sequence operably linked to a promoter, and wherein the FALSE gate is a single genetic circuit construct of an output nucleic acid sequence immediately downstream of an inverted promoter.

In some embodiments, the output nucleic acid encodes an output product. In some embodiments, the output product is a reporter protein, a transcriptional repressor, a transcriptional activator, a selection marker, an enzyme, a receptor protein, a ligand protein, an RNA, a riboswitch, a short-hairpin RNA or a recombinase.

In some embodiments, the NOR logic gate is a single genetic circuit construct of (a) an output nucleic acid operably linked to a promoter and (b) two unidirectional terminators, wherein each terminator is inverted and flanked by different forward and reverse recombinase recognition sites and is located between the promoter and the output nucleic acid.

In some embodiments, the AND logic gate is a single genetic circuit construct of an output nucleic acid conditionally operably linked to a promoter, wherein the output nucleic acid and the promoter is each inverted and flanked by different forward and reverse recombinase recognition sites.

In some embodiments, the OR logic gate is a single genetic circuit construct of an output nucleic acid conditionally operably linked to two promoters, wherein each promoter is inverted and flanked by different forward and reverse recombinase recognition sites.

In some embodiments, the NAND logic gate is a single genetic circuit construct of an output nucleic acid operably linked to two promoters, wherein each promoter is flanked by different forward and reverse recombinase recognition sites.

In some embodiments, the A logic gate is a single genetic circuit construct of an output nucleic acid conditionally operably linked to a promoter, wherein the output nucleic acid is inverted and flanked by forward and reverse recombinase recognition sites.

In some embodiments, the B logic gate is a single genetic circuit construct of an output nucleic acid conditionally operably linked to a promoter, wherein the promoter is inverted and flanked by forward and reverse recombinase recognition sites.

In some embodiments, the NOT A logic gate is a single genetic circuit construct of an output nucleic acid operably linked to a promoter, wherein the output nucleic acid is flanked by forward and reverse recombinase recognition sites.

In some embodiments, the NOT B logic gate is a single genetic circuit construct of an output nucleic acid operably linked to a promoter, wherein the promoter is flanked by forward and reverse recombinase recognition sites.

In some embodiments, the A IMPLY B logic gate is a single genetic circuit construct of an output nucleic acid operably linked to a first promoter and conditionally operably linked to a second promoter, wherein the first promoter is flanked by forward and reverse recombinase recognition sites, and the second promoter is inverted and flanked by different forward and reverse recombinase recognition sites and is located between the first promoter and the output nucleic acid.

In some embodiments, the B IMPLY A logic gate is a single genetic circuit construct of an output nucleic acid conditionally operably linked to a first promoter and operably linked to a second promoter, wherein the first promoter is inverted and flanked by forward and reverse recombinase recognition sites, and the second promoter is flanked by different forward and reverse recombinase recognition sites and is located between the first promoter and the output nucleic acid.

In some embodiments, the A NIMPLY B logic gate is a single genetic circuit construct of an output nucleic acid conditionally operably linked to a promoter, wherein the promoter is flanked by forward and reverse recombinase recognition sites, and the output nucleic acid is inverted and flanked by different forward and reverse recombinase recognition sites.

In some embodiments, the B NIMPLY A logic gate is a single genetic circuit construct of an output nucleic acid conditionally operably linked to a promoter and a unidirectional terminator, wherein the promoter is inverted and flanked by forward and reverse recombinase recognition sites, and the terminator is inverted and flanked by different forward and reverse recombinase recognition sites and is located between the promoter and the output nucleic acid.

In some embodiments, the XOR logic gate is a single genetic circuit construct of an output nucleic acid conditionally operably linked to a promoter, wherein the promoter is inverted and flanked by two, different forward and reverse recombinase recognition sites.

In some embodiments, the XNOR logic gate is a single genetic circuit construct of an output nucleic acid operably linked to a promoter, wherein the output nucleic acid is flanked by two, different forward and reverse recombinase recognition sites.

In some embodiments, a logic gate may comprise a single genetic circuit construct containing at least two promoters (e.g., constitutive promoters), optionally wherein each promoter is a different strength. In some embodiments, a logic gate may contain a pair of promoters, optionally wherein each promoter is a different strength. Such a pair of promoters, if of different strengths, may be referred to herein as a pair of variant promoters. In some embodiments, the promoter(s) is/are selected from proD, proA and proC.

In other aspects, provided herein are cells comprising a synthetic logic and memory system of the invention. In some embodiments, the cells comprise at least two logic gates of the invention.

In yet other aspects, provided herein are methods of altering gene expression or cellular differentiation comprising engineering a cell to comprise at least one recombinase and at least two logic gates of the invention.

BRIEF DESCRIPTION OF THE DRAWINGS

The accompanying drawings are not intended to be drawn to scale. In the drawings, each identical or nearly identical component illustrated in various figures is represented by a like numeral. For purposes of clarity, not every component may be labeled in every drawing.

DETAILED DESCRIPTION OF THE INVENTION

Provided herein is an efficient strategy and programming language for assembling, in single cells, synthetic logic with concomitant DNA-encoded memory storage. The modular DNA assembly strategy described herein enables straightforward "plug-and-play" encoding of logic functions with concomitant memory arising from the ability of recombinases to "write" information in DNA. DNA-based memory is a useful implementation of long-term storage, as it is naturally propagated throughout cellular generations and can be stable even after cell death [9,10].

Figure 1:
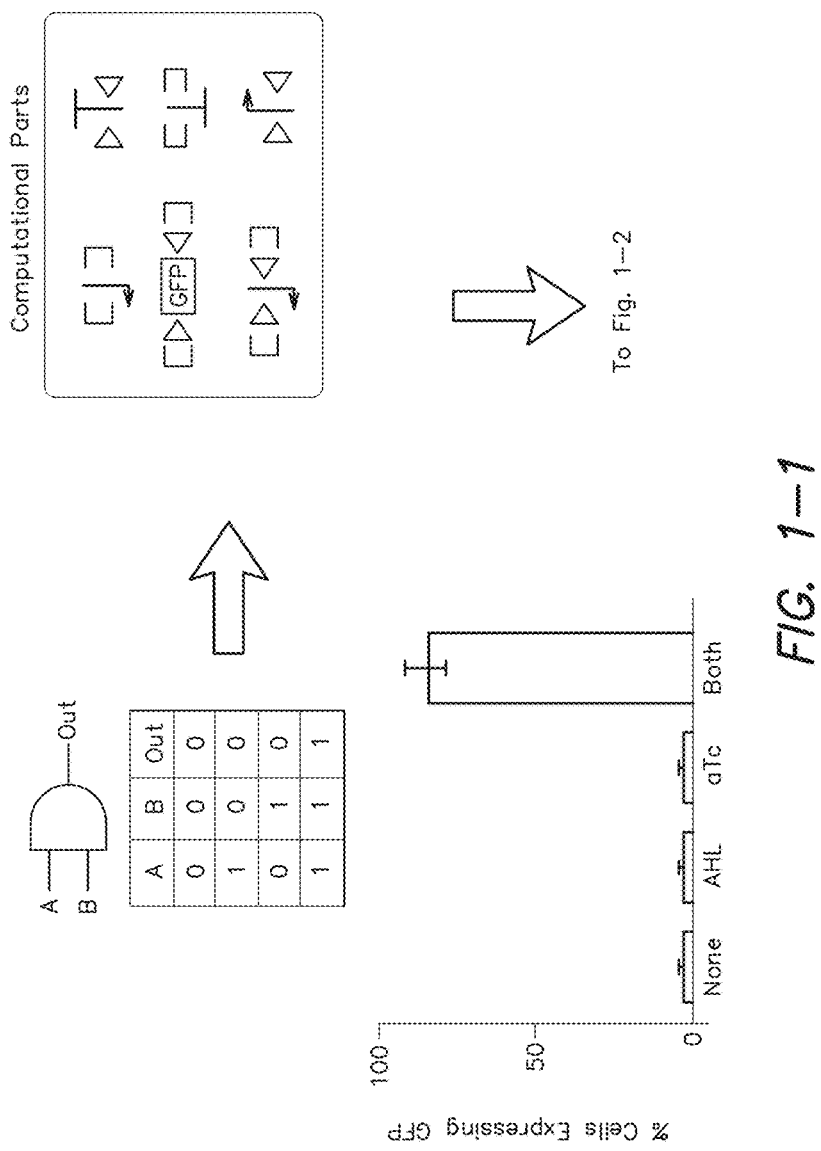
FIG. 1 shows schematics of a platform for building recombinase-based integrated logic and memory systems in accordance with the invention, the platform containing a simple programming language to translate desired computational functions into [promoter(s)]-[terminator(s)]-[output] designs, which can be constructed with straightforward Gibson assembly. N-acyl homoserine lactone (AHL) ("Input A") activates expression of Bxb1 recombinase while anhydrotetracycline (aTc) ("Input B") activates expression of phiC31 recombinase through orthogonal riboregulated systems. The example gate shown here implements AND functionality. The performance of this logic gate was characterized by the percentage of cells which were positive for green fluorescent protein (GFP), as assayed by flow cytometry after exposure to the indicated set of inputs. Measurements are from three independent experiments, and the error bars represent standard errors of the mean.

The integrated logic and memory systems of the invention are comprised of logic gates, which are single genetic circuit constructs containing, in various orientations, at least one promoter operably linked, or conditionally operably linked, to an output nucleic acid (e.g., a gene encoding a protein product) and optionally at least one unidirectional terminator (FIG. 1). The systems employ chemical inducer inputs to drive the expression of orthogonal recombinases from inducible promoters. The recombinases then target recognition sites flanking a promoter, terminator and/or output nucleic acid sequence in the genetic circuit constructs for DNA inversion, or excision, resulting in conditional expression of the output nucleic acid sequence.

A feature of the invention is that the logic gates maintain stable output memory after inputs are withdrawn. This feature may be used to create biosensors with states that can be interrogated in a multiplexed fashion using high-throughput sequencing technologies. Further, the programming language provided herein, which governs the behavior of the recombinase-based computation, is compatible with automated genetic circuit design algorithms [22].

Logic and Memory Systems and Logic Gates

Boolean logic function is based on logic gates that can be used to assemble combinations of functions that will implement any digital component imaginable. The invention provides for one-step assembly of any Boolean logic function with stable DNA-based memory of genetic (e.g., recombination) events. The invention contemplates the assembly of two or more genetic-based logic gates for integrated logic and memory in living cells. The basic "genetic elements" of the logic gates are listed in Table 1, and each logic gate contains a combination of at least two of these genetic elements.

Figures 1, 2:
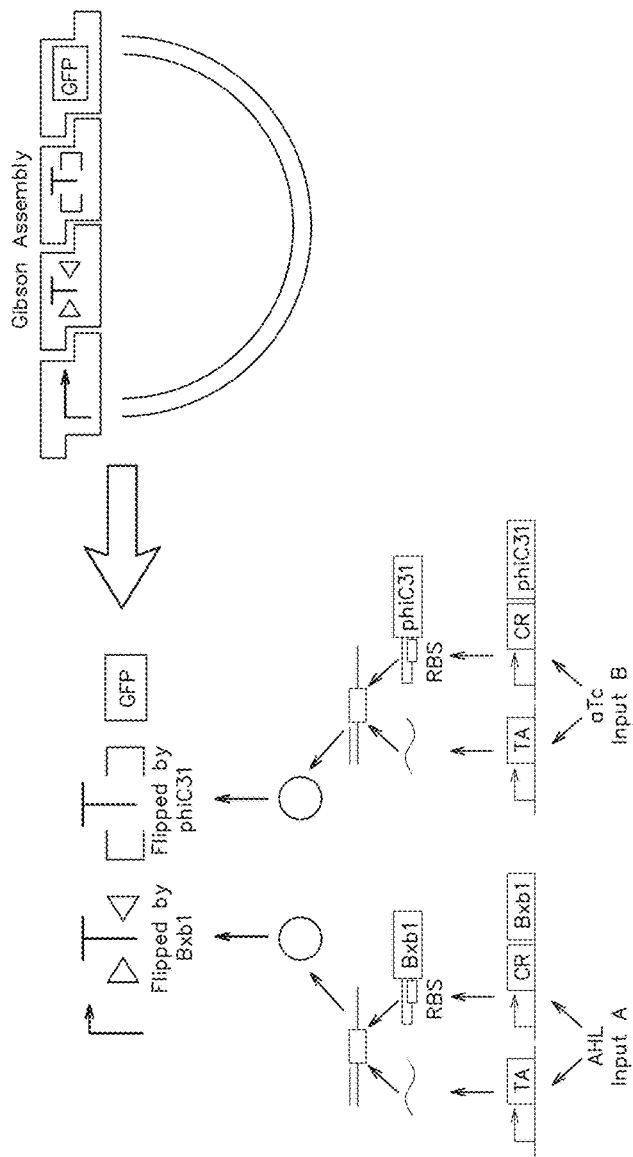
FIG. 2 shows schematics of the logic gates of the invention, which implement a complete set of Boolean logic gates without cascading multiple universal gates together. Cells were exposed to no inputs, AHL only, aTc only, or AHL and aTc simultaneously. The performance of each logic gate was characterized by the percentage of cells that were GFP positive, as assayed by flow cytometry. Measurements are from three independent experiments, and the error bars represent standard errors of the mean.

A set of logic gates is shown in FIG. 2. Each panel of FIG. 2 is representative of a synthetic logic and memory system (16 total systems/panels) and each system includes (a) a genetic construct containing an N-acyl homoserine lactone (AHL)-inducible promoter operably linked to a nucleic acid sequence encoding Bxb1 recombinase (not depicted), (b) a genetic construct containing an anhydrotetracycline (aTc)-inducible promoter operably linked to a nucleic acid sequence encoding phiC31 recombinase (not depicted), and (c) one of sixteen logic gates (depicted). Each panel of FIG. 2 includes one of sixteen logic gates: NOT, AND, OR, NOT, NOR, NAND, XOR, XNOR, A IMPLY B, B IMPLY A, A NIMPLY B, B NIMPLY A, A, B, FALSE or TRUE.

TABLE 1

Non-Limiting Examples of Genetic Elements of Synthetic Logic and Memory Systems

| Genetic Element | Symbol | Description |
| --- | --- | --- |
| Promoter | ▶ | Constitutively active promoter oriented in the 5' to 3' direction on the coding strand |
| Inverted promoter | ◀ | Constitutively active promoter oriented in the 5' to 3' direction on the non-coding strand |
| Flanked promoter I | ▶▶◀ | Constitutively active promoter oriented in the 5' to 3' direction on the coding strand and flanked by complementary recombination recognition sites Bxb1 attB and Bxb1 attP |
| Flanked promoter II | ▷▶◁ | Constitutively active promoter oriented in the 5' to 3' direction on the coding strand and flanked by complementary recombination recognition sites phiC31 attB and phiC31 attP |
| Inverter flanked promoter I | ▶◀◀ | Constitutively active promoter oriented in the 5' to 3' direction on the non-coding strand and flanked by Bxb1 attB and Bxb1 attP |

TABLE 1-continued

Non-Limiting Examples of Genetic Elements
of Synthetic Logic and Memory Systems

| Genetic Element | Symbol | Description |
| --- | --- | --- |
| Inverter flanked promoter II | | Constitutively active promoter oriented in the 5' to 3' direction on the non-coding strand and flanked by phiC31 attB and phiC31 attP |
| Inverted double flanked promoter | | Constitutively active promoter oriented in the 5' to 3' direction on the non-coding strand and flanked by Bxb1 attB and Bxb1 attP and phiC31 attB and phiC31 attP |
| Inverted flanked terminator I | | Transcriptional terminator oriented in the 5' to 3' direction on the non-coding strand and flanked by Bxb1 attB and Bxb1 attP |
| Inverted flanked terminator II | | Unidirectional transcriptional terminator oriented in the 5' to 3' direction on the non-coding strand and flanked phiC31 attB and phiC31 attP |
| Output nucleic acid | | Output nucleic acid oriented in the 5' to 3' direction on the coding strand |
| Flanked output nucleic acid | | Output nucleic acid oriented in the 5' to 3' direction on the coding strand and flanked by Bxb1 attB and Bxb1 attP |
| Inverted flanked output nucleic acid | | Output nucleic acid oriented in the 5' to 3' direction on the non-coding strand and flanked by Bxb1 attB and Bxb1 attP |
| Double flanked output nucleic acid | | Output nucleic acid oriented in the 5' to 3' direction on the coding strand and flanked by Bxb1 attB and Bxb1 attP and phiC31 attB and phiC31 attP |

The logic gates of FIG. 2 are described in terms of inputs A and B. In the exemplary embodiments described herein, input A represents the addition of AHL to the logic and memory system, which induces expression of Bxb1 recombinase, which in turn catalyzes recombination of complementary Bxb1 attB (forward) and Bxb1 attP (reverse) recombination recognition sites (schematized as triangles in FIG. 2). In the exemplary embodiments described herein, input B represents the addition of aTc to the system, which induces expression of phiC31 recombinase, which in turn catalyzes recombination of complementary phiC31 attB (forward) and phiC31 attP (reverse) recombination recognition sites (schematized as brackets in FIG. 2). It should be understood that AHL and aTc are examples of inputs for the logic gates described herein. The invention contemplates the use of other inputs, which may be chosen by the end-user and used interchangeably with or in place of AHL and aTc.

It should be understood that recombinases Bxb1 and phiC31 (and their cognate recognition sites) are examples of recombinases (and recognition sites) that may be used in accordance with the invention. The invention contemplates the use of other recombinases/recognition sites, which may be chosen by the end-user and used interchangeably with or in place of Bxb1 and/or phiC31 to catalyze inversion or excision of DNA. Examples of other recombinases/recognition sites are described below. Further, while the output nucleic acid sequence, gfp, depicted in FIG. 2 encodes the protein product green fluorescent protein (GFP), it should be understood that gfp may be substituted with any output nucleic acid sequence.

Figures 1, 2:
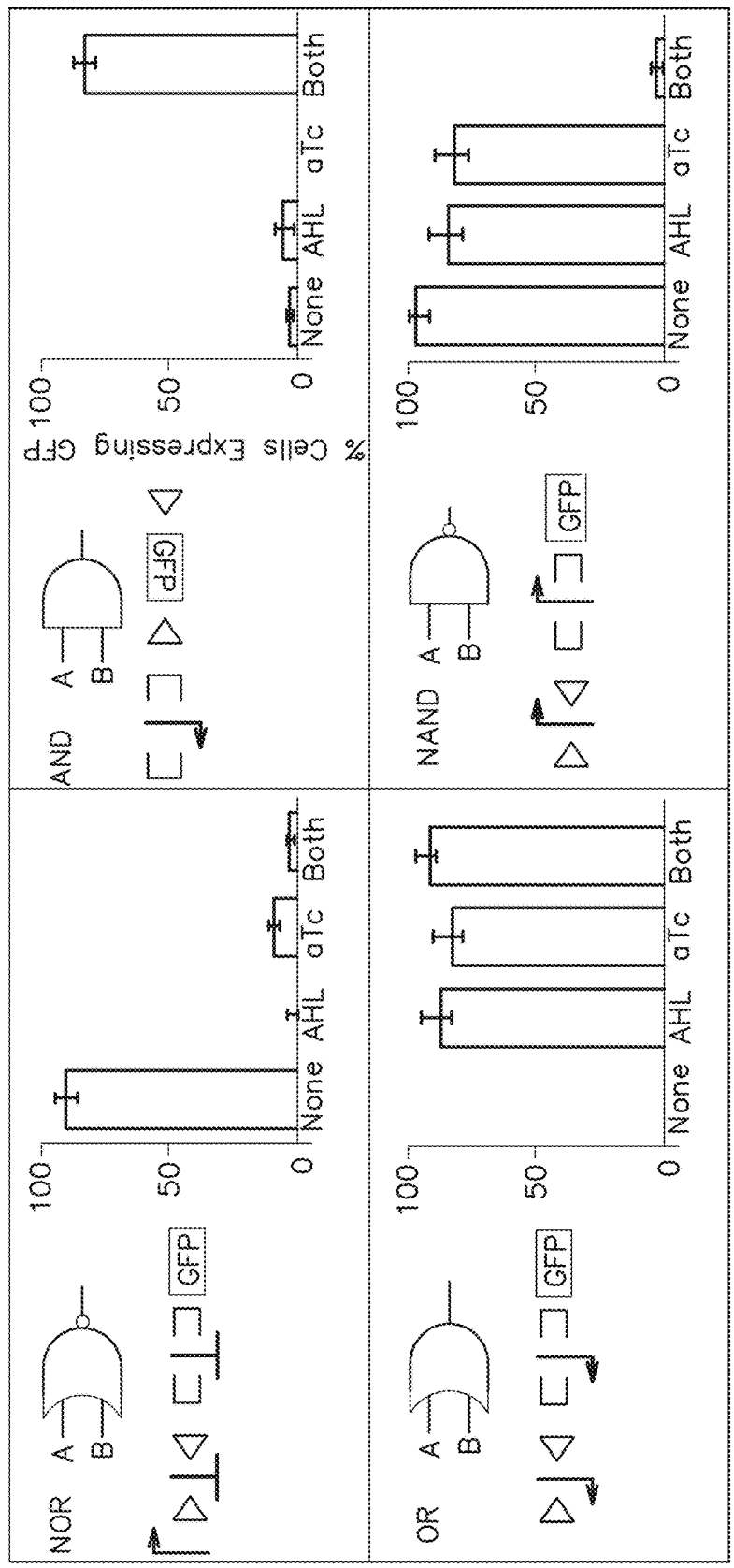
Figure 2:
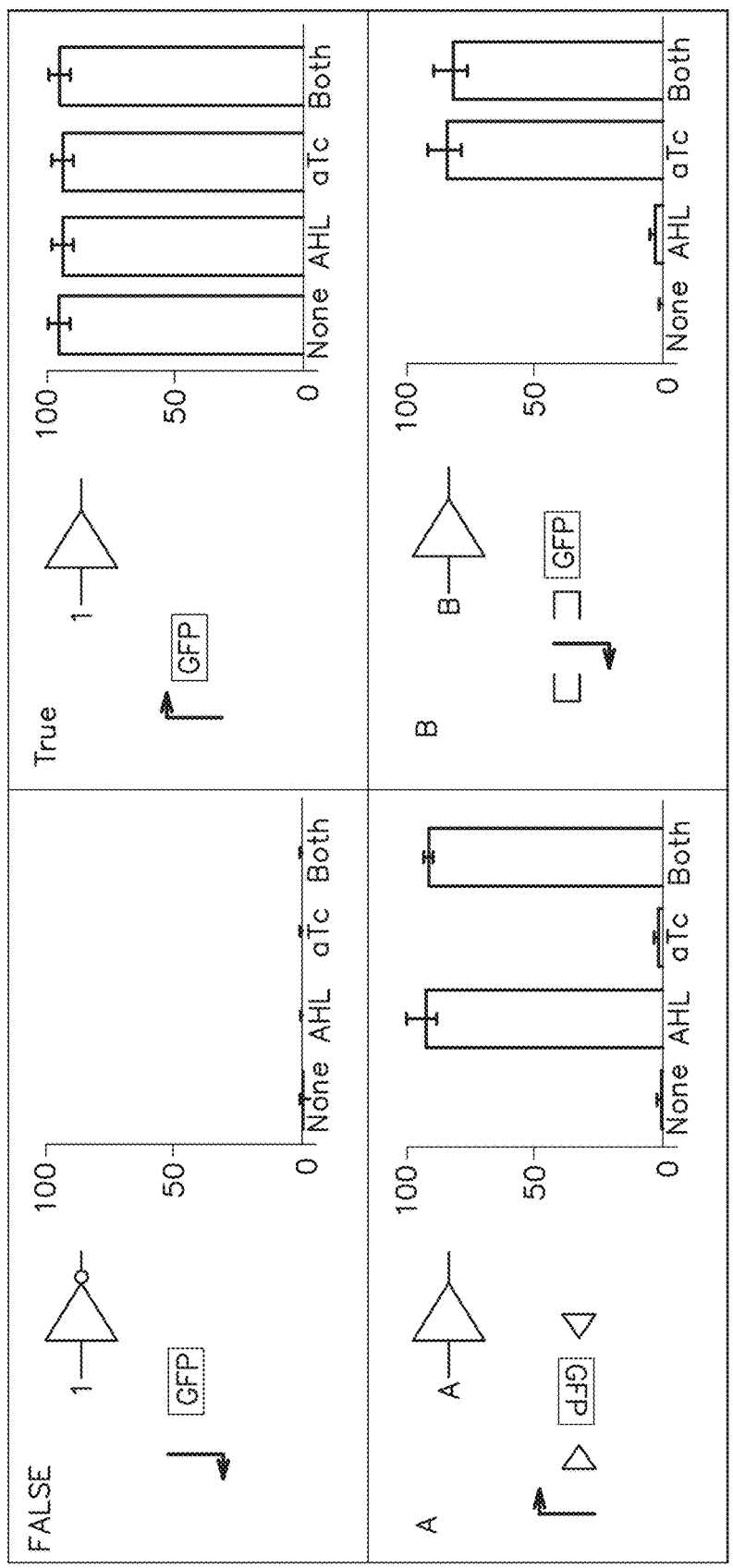
Figures 2, 3:
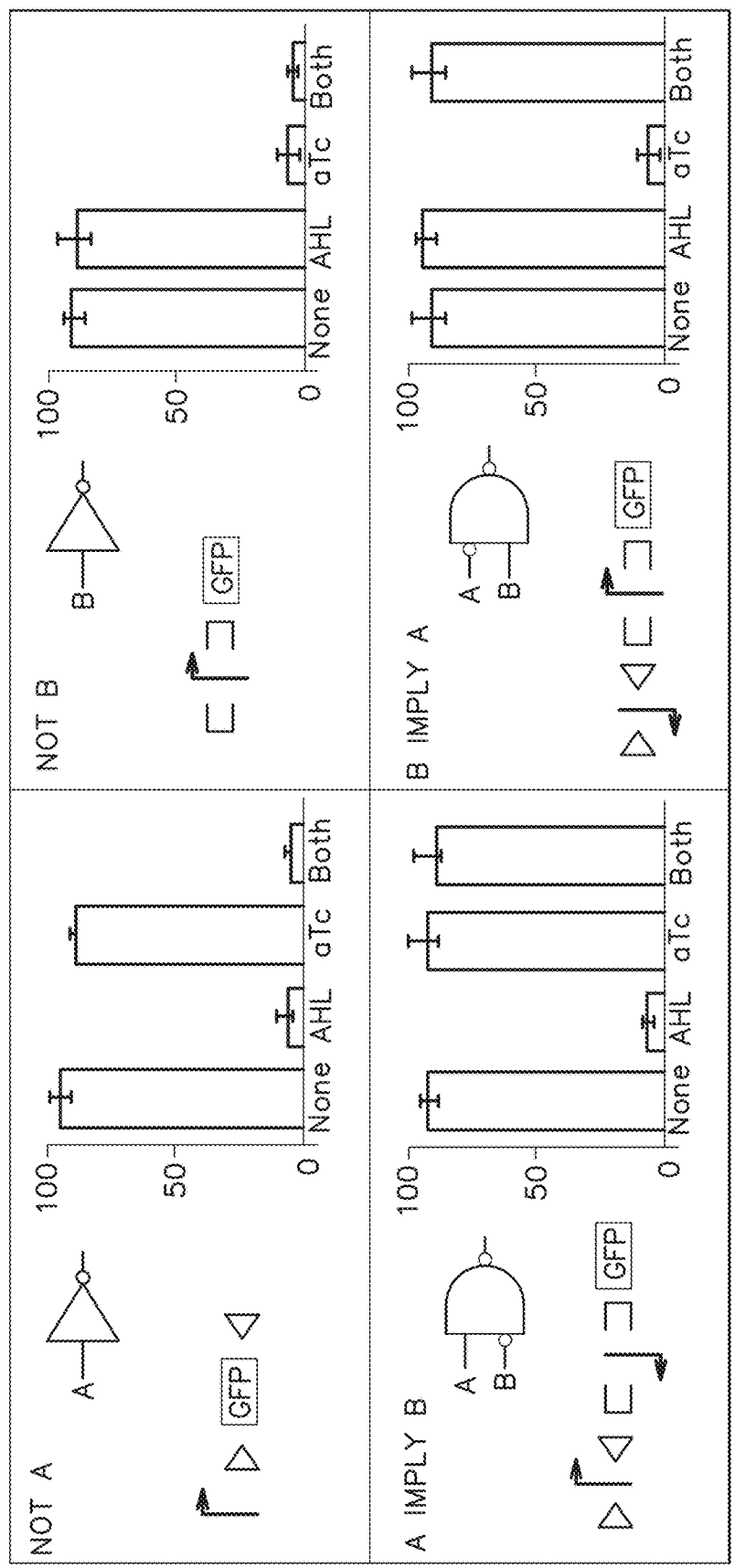
FIG. 3 shows schematics of simple programming rules in accordance with the invention, which govern the behavior of recombinase-based genetic circuits, enabling multiple instantiations of logic gates with different combinations of individual genetic elements. In addition to the designs in FIG. 1 and FIG. 2, unique implementations of (a) NOR, (b) AND and (c) XOR logic gates are described. Measurements are from three independent experiments, and the error bars represent standard errors of the mean.

Sixteen logic gates of the invention (AND, OR, NOT A, NOT B, NOR, NAND, XOR, XNOR, A IMPLY B, B IMPLY A, A NIMPLY B, B NIMPLY A, A, B, FALSE and TRUE) are described below, which provide for all two-input Boolean logic functions. Logic gates that include "two-input" Boolean logic functions include AND, OR, NOR, NAND, XOR, XNOR, A IMPLY B, B IMPLY A, A NIMPLY B and B NIMPLY A. Thus, a logic gate or a plurality of logic gates is considered to provide all two-input Boolean logic functions if the logic gates or the plurality of logic gates includes AND, OR, NOR, NAND, XOR, XNOR, A IMPLY B, B IMPLY A, A NIMPLY B and B NIMPLY A logic gates. The individual logic gates of the invention, however, are not limited to the genetic circuit constructs depicted in FIG. 2. Any number of the genetic elements of Table 1 may be arranged in a variety of locations and orientations in a given genetic circuit construct of a logic gate to achieve the desired output. For example, alternative genetic circuit constructs for logic gates NOR, AND and XOR are depicted in FIG. 3.

Herein, a promoter is considered to be "operably linked" when it is in a correct functional location and orientation in relation to a nucleic acid sequence it regulates to control ("drive") transcriptional initiation and/or expression of that sequence. A promoter is said to be "conditionally operably linked" when, upon a genetic recombination event, it is placed in a correct functional location and orientation in relation to a nucleic acid sequence it regulates.

An "inverted" genetic element (e.g., inverted promoter, inverted terminator, inverted output nucleic acid sequence) is one that is in the reverse orientation, such that what was the coding (sense) strand is now the non-coding (antisense) strand. In its inverted, reverse orientation, a genetic element is non-functional (e.g., not operably linked to another genetic element such as an output nucleic acid sequence). Function of the genetic element can be restored upon recombination of flanking complementary recognition sites and subsequent inversion of the genetic element back to its correct orientation. Thus, an inverted promoter flanked by recombination recognition sites may be considered to be "conditionally operably linked" to a downstream output nucleic acid sequence if, upon recombination of the flanking complementary recognition sites, the promoter is oriented such that what was the non-coding strand is now the coding strand, and the promoter is able to control transcriptional initiation and/or expression of the output nucleic acid sequence. Likewise, an inverted output nucleic acid sequence flanked by recombination recognition sites may be "conditionally operably linked" to an upstream promoter if, upon recombination of the flanking recognition sites, the output nucleic acid sequence is oriented such that what was the non-coding strand is now the coding strand, and the upstream promoter is able to control transcriptional initiation and/or expression of the output nucleic acid. Illustrative examples of a promoter operably linked to an output nucleic acid sequence are shown in the NOR, NAND, TRUE, NOT A, NOT B and XNOR logic gates of FIG. 2. Illustrative examples of a promoter conditionally operably linked to an output nucleic acid sequence are shown in the AND, OR, A, B, A NIMPLY B, B NIMPLY A and XOR logic gates of FIG. 2. Logic gates A IMPLY B and B IMPLY A contain both a promoter that is operably linked to an output nucleic acid sequence and a promoter that is conditionally operably linked to an output nucleic acid sequence.

Herein, an output nucleic acid sequence is considered to be downstream of a genetic element if the output nucleic acid sequence is located toward the 3' end and the genetic element is located toward the 5' end of the coding (sense) strand. One genetic element is considered to be "immediately downstream" of another genetic element the two are proximal to each other (e.g., no other genetic element, such as those listed in Table 1, is located between the two).

NOT Gates

The simplest Boolean logic gate is referred to as a NOT gate. It takes one input and produces as output its opposite. Disclosed herein are exemplary NOT A and NOT B logic gates, where A (AHL) and B (aTc) are inputs (FIG. 2). The NOT A gate in FIG. 2 includes a constitutive promoter (referred to herein for simplicity as a promoter) operably linked to an output nucleic acid sequence, gfp, flanked by complementary recombinase recognition sites, Bxb1 attB and Bxb1 attP. When AHL is added to the system, Bxb1 recombinase is expressed, and Bxb1 attB and Bxb1 attP recombine, resulting in inversion of gfp such that its transcription is no longer controlled by the promoter. Conversely, when aTc, and not AHL, is added to the system, Bxb1 recombinase is not expressed, Bxb1 attB and Bxb1 attP do not recombine, and the promoter controls gfp transcription. Thus, GFP is expressed only in the absence of AHL.

The NOT B gate in FIG. 2 includes a promoter flanked by complementary recombinase recognition sites phiC31 attB and phiC31 attP and operably linked to Op. When aTc is added to the system, phiC31 recombinase is expressed, and phiC31 attB and phiC31 attP recombine, resulting in inversion of the promoter such that it no longer controls transcription of gfp. Conversely, when AHL is added to the system, and not aTc, phiC31 recombinase is not expressed, phiC31 attB and phiC31 attP do not recombine, and the promoter controls gfp transcription. Thus, GFP is expressed only in the absence of aTc.

AND Gates

The AND gate is another simple Boolean logic gate. It performs a logical "and" operation on two inputs, A and B. The AND gate in FIG. 2 includes an inverted promoter flanked by phiC31 attB and phiC31 attP conditionally operably linked to inverted gfp flanked by Bxb1 attB and Bxb1 attP. When only AHL is added to the system, Bxb1 recombinase is expressed, and Bxb1 attB and Bxb1 attP recombine to orient gfp along the coding strand in the 5' to 3' direction; however, without aTc to activate recombination of phiC31 attB and phiC31 attP, the promoter remains inverted and cannot control gfp transcription. Similarly, when only aTC is added to the system, phiC31 recombinase is expressed, and phiC31 attB and phiC31 attP recombine to orient the promoter along the coding strand in the 5' to 3' direction; however without AHL to activate recombination of Bxb1 attB and Bxb1 attP, gfp remains inverted. Thus, GFP is expressed only in the presence of both AHL and aTc.

OR Gates

The OR gate performs a logical "or" operation on input A or input B. The OR gate in FIG. 2 includes an inverted promoter flanked by Bxb1 attB and Bxb1 attP upstream of an inverted promoter flanked by phiC31 attB and phiC31 attP, each inverted promoter conditionally operably linked to Op. When AHL is added to the system, Bxb1 recombinase is expressed, and Bxb1 attB and Bxb1 attP recombine to orient the promoter along the coding strand in the 5' to 3' direction to control gfp transcription. Similarly, when aTc is added to the system, phiC31 recombinase is expressed, and phiC31 attB and phiC31 attP recombine to orient the other promoter along the coding strand in the 5' to 3' direction to control gfp transcription. Thus, GFP is expressed in the presence of AHL or aTc or both.

NOR Gates

The NOR gate is a combination of an OR gate with a NOT gate. The NOR gate in FIG. 2 includes a promoter operably linked to gfp with two inverted terminators located therebetween, each terminator flanked by different complementary recombinase recognition sites. When AHL is added to the system, Bxb1 recombinase is expressed, and Bxb1 attB and Bxb1 attP recombine to orient the terminator along the coding strand in the 5' to 3' direction, thereby terminating gfp transcription. Similarly, when aTc is added to the system, phiC31 recombinase is expressed, and phiC31 attB and phiC31 attP recombine to orient the other terminator along the coding strand in the 5' to 3' direction, again, terminating gfp transcription. Thus, GFP is expressed only in the absence of both AHL and aTc.

NAND Gates

The NAND gate is a combination of an AND gate with a NOT gate. The NAND gate in FIG. 2 includes two promoters operably linked to gfp, each promoter flanked by different complementary recombinase recognition sites. When only AHL is added to the system, Bxb1 recombinase is expressed, and Bxb1 attB and Bxb1 attP recombine to invert the upstream promoter; however, without aTc to activate recombination of phiC31 attB and phiC31 attP, the downstream promoter remains operably linked and in control of gfp transcription. Similarly, when only aTc is added to the system, phiC31 recombinase is expressed, and phiC31 attB and phiC31 attP recombine to invert the downstream promoter; however, without AHL to activate recombination of Bxb1 attB and Bxb1 attP, the upstream promoter remains operably linked and in control of gfp transcription. When both AHL and aTC are added to the system, both promoters are inverted, and neither controls gfp transcription. Thus, GFP is expressed as long as AHL and aTc are not simultaneously present in the system.

XOR Gates

The XOR gate is an "exclusive or" gate. The XOR gate in FIG. 2 includes an inverted promoter conditionally operably linked to gfp and flanked by Bxb1 attB and Bxb1 attP and phiC31 attB and phiC31 attP. When only AHL is added to the system, Bxb1 recombinase is expressed, and Bxb1 attB and Bxb1 attP recombine to orient the promoter along the coding strand in the 5' to 3' direction to control gfp transcription. Similarly, when only aTc is added to the system, phiC31 recombinase is expressed, and phiC31 attB and phiC31 attP recombine to orient the promoter along the coding strand in the 5' to 3' direction to control gfp transcription. By contrast, when both AHL and aTC are added to the system, two recombination events occur: the first orients the promoter along the coding strand in the 5' to 3' direction, and the second inverts the promoter back to its inoperable position along the non-coding strand, unable to control gfp transcription. Thus, GFP is expressed only when AHL or aTc is present in the system, but not when both are present.

XNOR Gates

The XNOR gate is an "exclusive nor" gate. The XNOR gate in FIG. 2 includes a promoter operably linked to gfp, which is flanked by Bxb1 attB and Bxb1 attP and phiC31 attB and phiC31 attP. When only AHL is added to the system, Bxb1 recombinase is expressed, and Bxb1 attB and Bxb1 attP recombine to invert gfp along the non-coding strand where it is not controlled by the promoter. Similarly, when only aTc is added to the system, phiC31 recombinase is expressed, and phiC31 attB and phiC31 attP recombine to invert gfp along the non-coding strand. By contrast, when both AHL and aTC are added to the system, two recombination events occur: the first inverts gfp along the non-coding strand, and the second orients gfp back to its operable position along the coding strand, now controlled by the promoter. Thus, GFP is expressed when both AHL and aTc are present in the system, or when both are absent from the system.

IMPLY Gates

The invention also provides A IMPLY B gates (A AND NOT B) and B IMPLY A gates (B AND NOT A). The A IMPLY B gate in FIG. 2 includes a promoter (operably linked to gfp) flanked by Bxb1 attB and Bxb1 attP and an inverted promoter (conditionally operably linked to gfp) flanked by phiC31 attB and phiC31 attP positioned therebetween. When AHL is added to the system, the upstream promoter is inverted, and gfp is not transcribed. When aTc is added to the system, the downstream promoter is oriented along the coding strand in the 5' to 3' direction to control gfp transcription. Thus, GFP is expressed in the presence of aTc, in the presence of both AHL and aTc, or in the absence of both; however, GFP is not expressed in the presence of only AHL.

By contrast, the B IMPLY A gate in FIG. 2 includes an inverted promoter (conditionally operably linked to gfp) flanked by Bxb1 attB and Bxb1 attP located upstream of a promoter (operably linked to gfp) flanked by phiC31 attB and phiC31 attP. When AHL is added to the system, the upstream promoter is oriented along the coding strand in the 5' to 3' direction to control gfp transcription. When aTc is added to the system, the downstream promoter is inverted, and gfp is not transcribed. Thus, GFP is expressed in the presence of AHL, in the presence of both AHL and aTc, or in the absence of both; however, GFP is not expressed in the presence of only aTc.

NIMPLY Gates

The invention also provides A NIMPLY B and B NIMPLY A gates. The A NIMPLY B gate in FIG. 2 includes a promoter flanked by phiC31 attB and phiC31 attP and conditionally operably linked to inverted gfp, which is flanked by Bxb1 attB and Bxb1 attP. When aTc is added to the system, the upstream promoter is inverted, and gfp is not transcribed. When AHL is added to the system, gfp is oriented along the coding strand in the 5' to 3' direction and is transcribed. Thus, GFP is expressed in the presence of only AHL.

Conversely, the B NIMPLY A gate includes an inverted promoter flanked by phiC31 attB and phiC31 attP and conditionally operably linked to gfp, and an inverted terminator flanked by Bxb1 attB and Bxb1 attP positioned therebetween. When aTc is added to the system, the upstream promoter is oriented along the coding strand in the 5' to 3' direction, and gfp is transcribed. When AHL is added to the system, the terminator is oriented along the coding strand in the 5' to 3' direction, and gfp is not transcribed. Thus, GFP is expressed in the presence of only aTc.

A and B Gates

The invention also provides A and B gates. The A gate in FIG. 2 includes a promoter conditionally operably linked to inverted gfp, which is flanked by Bxb1 attB and Bxb1 attP. GFP is expressed when AHL is present in the system. The B gate in FIG. 2 includes an inverted promoter flanked by phiC31 attB and phiC31 attP and conditionally operably linked to gfp. GFP is expressed when aTc is added to the system.

TRUE and FALSE Gates

The invention also provides TRUE and FALSE gates. The TRUE gate in FIG. 2 includes a promoter operably linked to gfp. GFP is expressed independent of the input to the system. The FALSE gate of the invention includes gfp immediately downstream of (e.g., adjacent to) an inverted promoter. GFP is never expressed, and this is also independent of the input to the system.

Recombinases and Recombination Recognition Sequences

Provided herein are recombinases used to impart stable, DNA-base memory to the logic and memory systems of the invention. A "recombinase," as used herein, is a site-specific enzyme that recognizes short DNA sequence(s), which sequence(s) are typically between about 30 base pairs (bp) and 40 bp, and that mediates the recombination between these recombinase recognition sequences, which results in the excision, integration, inversion, or exchange of DNA fragments between the recombinase recognition sequences. A "genetic element," as used herein, refers to a sequence of DNA that has a role in gene expression. For example, a promoter, a transcriptional terminator, and a nucleic acid encoding a product (e.g., a protein product) is each considered to be a genetic element.

Recombinases can be classified into two distinct families: serine recombinases (e.g., resolvases and invertases) and tyrosine recombinases (e.g., integrases), based on distinct biochemical properties. Serine recombinases and tyrosine recombinases are further divided into bidirectional recombinases and unidirectional recombinases. Examples of bidirectional serine recombinases include, without limitation, β-six, CinH, ParA and γδ; and examples of unidirectional serine recombinases include, without limitation, Bxb1, φC31, TP901, TG1, φBT1, R4, φRV1, φFC1, MR11, A118, U153 and gp29. Examples of bidirectional tyrosine recombinases include, without limitation, Cre, FLP, and R; and unidirectional tyrosine recombinases include, without limitation, Lambda, HK101, HK022 and pSAM2. The serine and tyrosine recombinase names stem from the conserved nucleophilic amino acid residue that the recombinase uses to attack the DNA and which becomes covalently linked to the DNA during strand exchange. Recombinases have been used for numerous standard biological applications, including the creation of gene knockouts and the solving of sorting problems [35-38].

The outcome of recombination depends, in part, on the location and orientation of two short repeated DNA sequences that are to be recombined, typically less than 30 bp long. Recombinases bind to these repeated sequences, which are specific to each recombinase, and are herein referred to as "recombinase recognition sequences" or "recombinase recognition sites." Thus, as used herein, a recombinase is "specific for" a recombinase recognition site when the recombinase can mediate inversion or excision between the repeat DNA sequences. As used herein, a recombinase may also be said to recognize its "cognate recombinase recognition sites," which flank an intervening genetic element (e.g., promoter, terminator, or output nucleic acid sequence). A genetic element is said to be "flanked" by recombinase recognition sites when the element is located between and immediately adjacent to two repeated DNA sequences. In some embodiments, the recombinase recognition sites do not overlap each other. However, in other embodiments, recombinase recognition sites do overlap each other, such as described hereinbelow (see, for example, the circuits described in Example 5), which permits greatly increased combinatorial complexity.

Inversion recombination happens between two short, inverted, repeated DNA sequences. A DNA loop formation, assisted by DNA bending proteins, brings the two repeat sequences together, at which point DNA cleavage and ligation occur. This reaction is ATP independent and requires supercoiled DNA. The end result of such an inversion recombination event is that the stretch of DNA between the repeated site inverts (i.e., the stretch of DNA reverses orientation) such that what was the coding strand is now the non-coding strand and vice versa. In such reactions, the DNA is conserved with no net gain or no loss of DNA.

Conversely, integration (excision) recombination occurs between two short, repeated DNA sequences that are oriented in the same direction. In this case, the intervening DNA is excised/removed. For example, an AND gate can be assembled by placing a terminator between each of two different sets of recombinase sites oriented for excision, flanked by a promoter and an output such as a GFP-encoding sequence. In this example, both terminators must be excised by input-dependent action of the recombinase(s) to permit readthrough from the promoter to the GFP-encoding sequence. Thus two inputs are needed to excise both terminators to generate output.

Recombinases can also be classified as irreversible or reversible. As used herein, an "irreversible recombinase" refers to a recombinase that can catalyze recombination between two complementary recombination sites, but cannot catalyze recombination between the hybrid sites that are formed by this recombination without the assistance of an additional factor. Thus, an "irreversible recognition site" refers to a recombinase recognition site that can serve as the first of two DNA recognition sequences for an irreversible recombinase and that is modified to a hybrid recognition site following recombination at that site. A "complementary irreversible recognition site" refers to a recombinase recognition site that can serve as the second of two DNA recognition sequences for an irreversible recombinase and that is modified to a hybrid recombination site following homologous recombination at that site. For example, attB and attP, described below, are the irreversible recombination sites for Bxb1 and phiC31 recombinases—attB is the complementary irreversible recombination site of attP, and vice versa. Recently, it was shown that the attB/attP sites can be mutated to create orthogonal B/P pairs that only interact with each other but not the other mutants [72]. This allows a single recombinase to control the excision or integration or inversion of multiple orthogonal B/P pairs.

The phiC31 (φC31) integrase, for example, catalyzes only the attB×attP reaction in the absence of an additional factor not found in eukaryotic cells. The recombinase cannot mediate recombination between the attL and attR hybrid recombination sites that are formed upon recombination between attB and attP. Because recombinases such as the phiC31 integrase cannot alone catalyze the reverse reaction, the phiC31 attB×attP recombination is stable.

Irreversible recombinases, and nucleic acids that encode the irreversible recombinases, are described in the art and can be obtained using routine methods. Examples of irreversible recombinases include, without limitation, phiC31 (φC31) recombinase (SEQ ID NO:11), coliphage P4 recombinase [39], coliphage lambda integrase [40], *Listeria* A118 phage recombinase [41], and actinophage R4 Sre recombinase [42], HK101, HK022, pSAM2, Bxb1, TP901, TG1, φBT1, φRV1, φFC1, MR11, U153 and gp29.

Conversely, a "reversible recombinase" refers to a recombinase that can catalyze recombination between two complementary recombinase recognition sites and, without the assistance of an additional factor, can catalyze recombination between the sites that are formed by the initial recombination event, thereby reversing it. The product-sites generated by recombination are themselves substrates for subsequent recombination. Examples of reversible recombinase systems include, without limitation, the Cre-lox and the Flp-frt systems, R, β-six, CinH, ParA and γδ.

The recombinases provided herein are not meant to be exclusive examples of recombinases that can be used in embodiments of the invention. The complexity of logic and memory systems of the invention can be expanded by mining databases for new orthogonal recombinases or designing synthetic recombinases with defined DNA specificities [20,21]. Other examples of recombinases that are useful in the synthetic logic and memory systems described herein are known to those of skill in the art, and any new recombinase that is discovered or generated is expected to be able to be used in the different embodiments of the invention.

In some embodiments, the recombinase is serine recombinase. Thus, in some embodiments, the recombinase is considered to be irreversible. In some embodiments, the recombinase is a tyrosine recombinase. Thus, in some embodiments, the recombinase is considered to be reversible.

In some embodiments, the recombinase comprises the sequence of Bxb1 recombinase as set forth in SEQ ID NO:8 (Table 2), and the corresponding Bxb1 attB and Bxb1 attP recombinase recognition sequences as set forth in SEQ ID NO:9 and SEQ ID NO:10, respectively.

In some embodiments, the recombinase comprises the sequence of phiC31 (φC31) recombinase as set forth in SEQ ID NO:11 (Table 2), and the corresponding phiC31attB and phiC31attP recombinase recognition sequences as set forth in SEQ ID NO:12 and SEQ ID NO:13, respectively.

Promoters

Provided herein are promoter sequences ("promoters") for use in the recombinase-based synthetic logic and memory systems of the invention. As used herein, a "promoter" refers to a control region of a nucleic acid sequence at which initiation and rate of transcription of the remainder of a nucleic acid sequence are controlled. A promoter may also contain subregions at which regulatory proteins and molecules may bind, such as RNA polymerase and other transcription factors. Promoters may be constitutive, inducible, activatable, repressible, tissue-specific or any combination thereof.

A promoter drives expression or drives transcription of the nucleic acid sequence that it regulates. As used herein, "operably linked" and "under control" indicate that a promoter is in a correct functional location and/or orientation in relation to a nucleic acid sequence it regulates to control transcriptional initiation and/or expression of that sequence. An "inverted promoter," as described above, is a promoter in which the nucleic acid sequence is in the reverse orientation, such that what was the coding strand is now the non-coding strand, and vice versa. Inverted promoter sequences can be used in various embodiments of the invention to regulate the state of a logic gate (e.g., high output, "ON," or low/no output, "OFF"). Thus, in some embodiments, the promoter is an inverted promoter, flanked by complementary recombinase recognition sites that, upon recombination of the sites, inverts to the correct orientation and drives expression of an operably linked nucleic acid sequence. In some embodiments of the invention, a promoter may or may not be used in conjunction with an "enhancer," which refers to a cis-acting regulatory sequence involved in the transcriptional activation of a nucleic acid sequence downstream of the promoter. The enhancer may be located at any functional location before or after the promoter and/or the encoded nucleic acid.

A promoter is classified as strong or weak according to its affinity for RNA polymerase (and/or sigma factor); this is related to how closely the promoter sequence resembles the ideal consensus sequence for the polymerase. The strength of a promoter may depend on whether initiation of transcription occurs at that promoter with high or low frequency. Different promoters with different strengths may be used to construct logic gates with different digitally settable levels of gene output expression (e.g., the level of gene expression initiated from a weak promoter is lower than the level of gene expression initiated from a strong promoter). For example, the data shown in FIGS. 26A-26C demonstrate that various digital combinations of the input inducers result in multiple levels of analog gene expression outputs based on the varying strengths of the promoters used and the sum of their respective outputs.

A promoter may be one naturally associated with a gene or sequence, as may be obtained by isolating the 5' non-coding sequences located upstream of the coding segment and/or exon of a given gene or sequence. Such a promoter can be referred to as "endogenous." Similarly, an enhancer may be one naturally associated with a nucleic acid sequence, located either downstream or upstream of that sequence.

In some embodiments, a coding nucleic acid segment may be positioned under the control of a recombinant or heterologous promoter, which refers to a promoter that is not normally associated with the encoded nucleic acid sequence in its natural environment. A recombinant or heterologous enhancer refers to an enhancer not normally associated with a nucleic acid sequence in its natural environment. Such promoters or enhancers may include promoters or enhancers of other genes; promoters or enhancers isolated from any other prokaryotic, viral or eukaryotic cell; and synthetic promoters or enhancers that are not "naturally occurring" such as, for example, those that contain different elements of different transcriptional regulatory regions and/or mutations that alter expression through methods of genetic engineering that are known in the art. In addition to producing nucleic acid sequences of promoters and enhancers synthetically, sequences may be produced using recombinant cloning and/or nucleic acid amplification technology, including PCR, in connection with the logic gates disclosed herein (see U.S. Pat. No. 4,683,202 and U.S. Pat. No. 5,928,906). Furthermore, control sequences that direct transcription and/or expression of sequences within non-nuclear organelles such as mitochondria, chloroplasts and the like, may be used in accordance with the invention.

Inducible Promoters

As used herein, an "inducible promoter" is one that is characterized by initiating or enhancing transcriptional activity when in the presence of, influenced by or contacted by an inducer or inducing agent. An "inducer" or "inducing agent" may be endogenous or a normally exogenous compound or protein that is administered in such a way as to be active in inducing transcriptional activity from the inducible promoter.

Inducible promoters for use in accordance with the invention may function in both prokaryotic and eukaryotic host organisms. In some embodiments, mammalian inducible promoters are used. Examples of mammalian inducible promoters for use herein include, without limitation, promoter type $P_{Act}$:$P_{AIR}$, $P_{ART}$, $P_{BIT}$, $P_{CR5}$, $P_{CTA}$, $P_{ETR}$, $P_{NIC}$, $P_{PIP}$, $P_{ROP}$, $P_{SPA}$/$P_{SCA}$, $P_{TET}$, $P_{TtgR}$, promoter type $P_{Rep}$: $P_{CuO}$, $P_{ETR}$ ON8, $P_{NIC}$ $P_{PIR}$ ON, $P_{SCA}$ ON8, $P_{TetO}$, $P_{UREX8}$, promoter type $P_{Hyb}$:tetO$_7$-ETR$_8$-$P_{hCMVmin}$, tetO$_7$-PIR$_3$-ETR$_8$-$P_{hCMVmin}$, and scbR$_8$-PIR$_3$-$P_{hCMVmin}$. In some embodiments, inducible promoters from other organisms, as well as synthetic promoters designed to function in a prokaryotic or eukaryotic host may be used. Examples of non-mammalian inducible promoters for use herein include, without limitation, Lentivirus promoters (e.g., EFα, CMV, Human SynapsinI (hSynI), CaMKIIα, hGFAP and TPH-2) and Adeno-Associated Virus promoters (e.g., CaMKIIα (AAV5), hSynI (AAV2), hThy1 (AAV5), fSST (AAV1), hGFAP (AAV5, AAV8), MBP (AAV8), SST (AAV2)). One important functional characteristic of the inducible promoters of the present invention is their inducibility by exposure to an externally applied inducer.

The administration or removal of an inducer results in a switch between the "ON" or "OFF" states of the transcription of the operably linked nucleic acid sequence (e.g., nucleic acid encoding a recombinase). Thus, as used herein, the "ON" state of a promoter operably linked to a nucleic acid sequence refers to the state when the promoter is actively driving transcription of the nucleic acid sequence (i.e., the linked nucleic acid sequence is expressed). Conversely, the "OFF" state of a promoter operably linked, or conditionally operably linked, to a nucleic acid sequence refers to the state when the promoter is not actively driving transcription of the nucleic acid sequence (i.e., the linked nucleic acid sequence is not expressed).

An inducible promoter for use in accordance with the invention may be induced by (or repressed by) one or more physiological condition(s), such as changes in pH, temperature, radiation, osmotic pressure, saline gradients, cell surface binding, and the concentration of one or more extrinsic or intrinsic inducing agent(s). The extrinsic inducer or inducing agent may comprise, without limitation, amino acids and amino acid analogs, saccharides and polysaccharides, nucleic acids, protein transcriptional activators and repressors, cytokines, toxins, petroleum-based compounds, metal containing compounds, salts, ions, enzyme substrate analogs, hormones or combinations thereof. The condition(s) and/or agent(s) that induce or repress an inducible promoter can be input(s) of the logic gates described herein.

Inducible promoters for use in accordance with the invention include any inducible promoter described herein or known to one of ordinary skill in the art. Examples of inducible promoters include, without limitation, chemically/biochemically-regulated and physically-regulated promoters such as alcohol-regulated promoters, tetracycline-regulated promoters (e.g., anhydrotetracycline (aTc)-responsive promoters and other tetracycline-responsive promoter systems, which include a tetracycline repressor protein (tetR), a tetracycline operator sequence (tetO) and a tetracycline transactivator fusion protein (tTA)), steroid-regulated promoters (e.g., promoters based on the rat glucocorticoid receptor, human estrogen receptor, moth ecdysone receptors, and promoters from the steroid/retinoid/thyroid receptor superfamily), metal-regulated promoters (e.g., promoters derived from metallothionein (proteins that bind and sequester metal ions) genes from yeast, mouse and human), pathogenesis-regulated promoters (e.g., induced by salicylic acid, ethylene or benzothiadiazole (BTH)), temperature/heat-inducible promoters (e.g., heat shock promoters), and light-regulated promoters (e.g., light responsive promoters from plant cells).

In some embodiments, the inducer used in accordance with the invention is an N-acyl homoserine lactone (AHL), which is a class of signaling molecules involved in bacterial quorum sensing. Quorum sensing is a method of communication between bacteria that enables the coordination of group based behavior based on population density. AHL can diffuse across cell membranes and is stable in growth media over a range of pH values. AHL can bind to transcriptional activators such as LuxR and stimulate transcription from cognate promoters.

In some embodiments, the inducer used in accordance with the invention is anhydrotetracycline (aTc), which is a derivative of tetracycline that exhibits no antibiotic activity and is designed for use with tetracycline-controlled gene expression systems, for example, in bacteria.

Other inducible promoter systems may be used in accordance with the invention.

Terminators

Provided herein are terminator sequences for use in some embodiments of the invention. A "terminator" or "terminator sequence," as used herein, is a nucleic acid sequence that causes transcription to stop. A terminator may be unidirectional or bidirectional. It is comprised of a DNA sequence involved in specific termination of an RNA transcript by an RNA polymerase. A terminator sequence prevents transcriptional activation of downstream nucleic acid sequences by upstream promoters. Thus, in certain embodiments, a terminator that ends the production of an RNA transcript is contemplated. A terminator may be necessary in vivo to achieve desirable output expression levels (e.g., low output levels).

The most commonly used type of terminator is a forward terminator. When placed downstream of a nucleic acid sequence that is usually transcribed, a forward transcriptional terminator will cause transcription to abort. In some embodiments, bidirectional transcriptional terminators are provided, which usually cause transcription to terminate on both the forward and reverse strand. In some embodiments, reverse transcriptional terminators are provided, which usually terminate transcription on the reverse strand only.

In prokaryotic systems, terminators usually fall into two categories (1) rho-independent terminators and (2) rho-dependent terminators. Rho-independent terminators are generally composed of palindromic sequence that forms a stem loop rich in G-C base pairs followed by several T bases. Without wishing to be bound by theory, the conventional model of transcriptional termination is that the stem loop causes RNA polymerase to pause, and transcription of the poly-A tail causes the RNA:DNA duplex to unwind and dissociate from RNA polymerase.

In eukaryotic systems, the terminator region may comprise specific DNA sequences that permit site-specific cleavage of the new transcript so as to expose a polyadenylation site. This signals a specialized endogenous polymerase to add a stretch of about 200 A residues (polyA) to the 3' end of the transcript. RNA molecules modified with this polyA tail appear to more stable and are translated more efficiently. Thus, in some embodiments involving eukaryotes, a terminator may comprise a signal for the cleavage of the RNA. In some embodiments, the terminator signal promotes polyadenylation of the message. The terminator and/or polyadenylation site elements may serve to enhance output nucleic acid levels and/or to minimize read through between nucleic acids.

Terminators for use in accordance with the invention include any terminator of transcription described herein or known to one of ordinary skill in the art. Examples of terminators include, without limitation, the termination sequences of genes such as, for example, the bovine growth hormone terminator, and viral termination sequences such as, for example, the SV40 terminator, spy, yejM, secG-leuU, thrLABC, rrnB T1, hisLGDCBHAFI, metZWV, rrnC, xapR, aspA and arcA terminator. In some embodiments, the termination signal may be a sequence that cannot be transcribed or translated, such as those resulting from a sequence truncation.

Other inducible promoter systems may be used in accordance with the invention.

Output Nucleic Acid Sequences and Output Products

A variety of output nucleic acid sequences and output products are provided for use in accordance with the invention. As used herein, "output products" refer to gene products that may be used as markers of specific states of the logic gates and systems described herein. An output nucleic acid sequence of the invention can encode for a protein or RNA that is used to track or mark the state of the cell upon receiving a particular input. Such output products can be used to distinguish between various states (e.g., "ON" or "OFF") of a cell. Representative output products for the logic and memory systems of the invention include, without limitation, reporter proteins, transcriptional repressors, transcriptional activators, selection markers, enzymes, receptor proteins, ligand proteins, RNAs, riboswitches, short-hairpin RNAs and recombinases. Aspects of the invention relate to logic and memory systems that include a plurality of logic gates (e.g., at least two logic gates). It should be understood that in such systems, each logic gate may include one or more different output nucleic acid (e.g., that encode(s) different, or unique, output product(s)). Thus, a single cell or system may include at least 2, 3, 4, 5, 6, 7, 8, 9, 10 or more different output nucleic acids.

Reporter Output Products

In some embodiments, the output nucleic acid sequence of the invention may encode a "reporter." As used herein, a reporter refers to a protein that can be used to measure gene expression and generally produce a measurable signal such as fluorescence, luminescence or color. The presence of a reporter in a cell or organism is readily observed. For example, fluorescent proteins (e.g., GFP) cause a cell to fluoresce when excited with light of a particular wavelength, luciferases cause a cell to catalyze a reaction that produces light, and enzymes such as β-galactosidase convert a substrate to a colored product. In some embodiments, reporters may be used to quantify the strength or activity of the input received by the systems of the invention. In some embodiments, reporters can be fused in-frame to other protein coding sequences to identify where a protein is located in a cell or organism. Reporters for use in accordance with the invention include any reporter described herein or known to one of ordinary skill in the art.

There are several different ways to measure or quantify a reporter depending on the particular reporter and what kind of characterization data is desired. In some embodiments, microscopy can be a useful technique for obtaining both spatial and temporal information on reporter activity, particularly at the single cell level. In some embodiments, flow cytometers can be used for measuring the distribution in reporter activity across a large population of cells. In some embodiments, plate readers may be used for taking population average measurements of many different samples over time. In some embodiments, instruments that combine such various functions, may be used, such as multiplex plate readers designed for flow cytometers, and combination microscopy and flow cytometric instruments.

Fluorescent proteins may be used for visualizing or quantifying the output of logic gates/systems. Fluorescence can be readily quantified using a microscope, plate reader or flow cytometer equipped to excite the fluorescent protein with the appropriate wavelength of light. Several different fluorescent proteins are available, thus multiple gene expression measurements can be made in parallel. Examples of genes encoding fluorescent proteins that may be used in accordance with the invention include, without limitation, those proteins provided in U.S. Patent Application No. 2012/0003630 (see Table 59), incorporated herein by reference.

Luciferases may also be used for visualizing or quantifying the output of logic gates/systems, particularly for measuring low levels of gene expression, as cells tend to have little to no background luminescence in the absence of a luciferase. Luminescence can be readily quantified using a plate reader or luminescence counter. Examples of genes encoding luciferases for that may be used in accordance with the invention include, without limitation, dmMyD88-linker-Rluc, dmMyD88-linker-Rluc-linker-PEST191, and firefly luciferase (from *Photinus pyralis*).

Enzymes that produce colored substrates ("colorimetric enzymes") may also be used for visualizing or quantifying the output of logic gates/systems. Enzymatic products may be quantified using spectrophotometers or other instruments that can take absorbance measurements including plate readers. Like luciferases, enzymes such as β-galactosidase can be used for measuring low levels of gene expression because they tend to amplify low signals. Examples of genes encoding colorimetric enzymes that may be used in accordance with the invention include, without limitation, lacZ alpha fragment, lacZ (encoding beta-galactosidase, full-length), and xylE.

Transcriptional Outputs

In some embodiments, the output nucleic acid sequence of the invention may encode a transcriptional activator or repressor, the production of which by an output gene can result in a further change in state of the cell, and provide additional input signals to subsequent or additional logic gates. Transcriptional regulators either activate or repress transcription from cognate promoters. Transcriptional activators typically bind nearby to transcriptional promoters and recruit RNA polymerase to directly initiate transcription. Repressors bind to transcriptional promoters and sterically hinder transcriptional initiation by RNA polymerase. Other transcriptional regulators serve as either an activator or a repressor depending on where it binds and cellular conditions. Transcriptional regulators for use in accordance with the invention include any transcriptional regulator described herein or known to one of ordinary skill in the art. Examples of genes encoding transcriptional regulators that may be used in accordance with the invention include, without limitation, those regulators provided in U.S. Patent Application No. 2012/0003630 (see Table 63), incorporated herein by reference.

Selection Marker Outputs

In some embodiments, the output nucleic acid sequence of the invention may encode a selection marker. As used herein, a "selection marker" refers to protein coding sequence that confers a selective advantage or disadvantage to a biological unit, such as a cell. For example, a common type of prokaryotic selection marker is one that confers resistance to a particular antibiotic. Thus, cells that carry the selection marker can grow in media despite the presence of antibiotic. For example, most plasmids contain antibiotic selection markers so that it is ensured that the plasmid is maintained during cell replication and division, as cells that lose a copy of the plasmid will soon either die or fail to grow in media supplemented with antibiotic. A second common type of selection marker, often termed a positive selection marker, is toxic to the cell. Positive selection markers are frequently used during cloning to select against cells transformed with the cloning vector and ensure that only cells transformed with a plasmid containing the insert. Selection markers for use in accordance with the invention include any selection marker described herein or known to one of ordinary skill in the art. Examples of genes encoding selection markers that may be used in accordance with the invention include, without limitation, those markers provided in U.S. Patent Application No. 2012/0003630 (see Table 64), incorporated herein by reference.

Enzyme Outputs

In some embodiments, the output nucleic acid sequence of the invention may encode an enzyme. In some embodiments, an enzyme is used as a response to a particular input. For example, in response to a particular input received by a logic and memory system of the invention, such as a certain range of toxin concentration present in the environment, the system may turn "ON" a logic gate containing an output nucleic acid sequence that encodes an enzyme that can degrade or otherwise destroy the toxin.

In some embodiments, output products may be "biosynthetic enzymes" that catalyze the conversion of substrates to products. For example, such biosynthetic enzymes can be used in accordance with the invention to assemble pathways that produce or degrade useful chemicals and materials, in response to specific signals. These combinations of enzymes can reconstitute either natural or synthetic biosynthetic pathways. These enzymes have applications in specialty chemicals, biofuels and bioremediation. Enzymes for use in accordance with the invention include any enzyme described herein or known to one of ordinary skill in the art. Examples of genes encoding enzymes that may be used in accordance with the invention include, without limitation, those provided in U.S. Patent Application No. 2012/0003630, incorporated herein by reference.

Receptors, Ligands and Lytic Proteins

In some embodiments, the output nucleic acid sequence of the invention may encode a receptor, ligand or lytic protein. Receptors tend to have three domains: an extracellular domain for binding ligands such as proteins, peptides or small molecules, a transmembrane domain and an intracellular or cytoplasmic domain, which frequently can participate in some sort of signal transduction event such as phosphorylation. In some embodiments, transporters, channels or pumps are used as output products. Transporters are membrane proteins responsible for transport of substances across the cell membrane. Channels are made up of proteins that form transmembrane pores through which selected ions can diffuse. Pumps are membrane proteins that can move substances against their gradients in an energy-dependent process known as active transport. In some embodiments, nucleic acid sequences encoding proteins and protein domains whose primary purpose is to bind other proteins, ions, small molecules, and other ligands may be used in accordance with the invention. Receptors, ligands and lytic proteins for use in accordance with the invention include any receptor, ligand and lytic protein, described herein or known to one of ordinary skill in the art. Examples of genes encoding receptors, ligands and lytic proteins that may be used in accordance with the invention include, without limitation, those provided in U.S. Patent Application No. 2012/0003630 (see Table 73), incorporated herein by reference.

Genetic Engineering of Logic Gates and Systems

A cell to be engineered for use with the synthetic logic and memory systems of the invention may be any cell or host cell. As defined herein, a "cell" or "cellular system" is the basic structural and functional unit of all known independently living organisms. It is the smallest unit of life that is classified as a living thing. Some organisms, such as most bacteria, are unicellular (consist of a single cell). Other organisms, such as humans, are multicellular.

In some embodiments, a cell for use in accordance with the invention is a prokaryotic cell, which may comprise a cell envelope and a cytoplasmic region that contains the cell genome (DNA) and ribosomes and various sorts of inclusions. In some embodiments, the cells are bacterial cells. As used herein, the term "bacteria" encompasses all variants of bacteria, for example, prokaryotic organisms and cyanobacteria. Bacteria are small (typical linear dimensions of around 1 micron), non-compartmentalized, with circular DNA and ribosomes of 70S. The term bacteria also includes bacterial subdivisions of Eubacteria and Archaebacteria. Eubacteria can be further subdivided into gram-positive and gram-negative Eubacteria, which depend upon a difference in cell wall structure. Also included herein are those classified based on gross morphology alone (e.g., cocci, bacilli). In some embodiments, the bacterial cells are gram-negative cells, and in some embodiments, the bacterial cells are gram-positive cells. Examples of bacterial cells that may be used in accordance with the invention include, without limitation, cells from *Yersinia* spp., *Escherichia* spp., *Klebsiella* spp., *Bordetella* spp., *Neisseria* spp., *Aeromonas* spp., Franciesella spp., *Corynebacterium* spp., *Citrobacter* spp., *Chlamydia* spp., Hemophilus spp., *Brucella* spp., *Mycobacterium* spp., *Legionella* spp., *Rhodococcus* spp., *Pseudomonas* spp., *Helicobacter* spp., *Salmonella* spp., *Vibrio* spp., *Bacillus* spp., *Erysipelothrix* spp., *Salmonella* spp., *Stremtomyces* spp. In some embodiments, the bacterial cells are from *Staphylococcus aureus, Bacillus subtilis, Clostridium butyricum, Brevibacterium lactofermentum, Streptococcus agalactiae, Lactococcus lactis, Leuconostoc lactis, Streptomyces, Actinobacillus actinobycetemcomitans, Bacteroides, cyanobacteria, Escherichia coli, Helobacter pylori, Selnomonas ruminatium, Shigella sonnei, Zymomonas mobilis, Mycoplasma mycoides, Treponema denticola, Bacillus thuringiensis, Staphylococcus lugdunensis, Leuconostoc oenos, Corynebacterium xerosis, Lactobacillus planta rum, Streptococcus faecalis, Bacillus coagulans, Bacillus ceretus, Bacillus popillae, Synechocystis* strain PCC6803, *Bacillus liquefaciens, Pyrococcus abyssi, Selenomonas nominantium, Lactobacillus hilgardii, Streptococcus ferus, Lactobacillus pentosus, Bacteroides fragilis, Staphylococcus epidermidis, Zymomonas mobilis, Streptomyces phaechromogenes, Streptomyces ghanaensis, Halobacterium* strain GRB, or *Halobaferax* sp. strain Aa2.2.

In some embodiments, a cell for use in accordance with the invention is a eukaryotic cell, which comprises membrane-bound compartments in which specific metabolic activities take place, such as a nucleus. Examples of eukaryotic cells for use in accordance with the invention include, without limitation, mammalian cells, insect cells, yeast cells (e.g., *Saccharomyces cerevisiae*) and plant cells. In some embodiments, the eukaryotic cells are from a vertebrate animal. Examples of vertebrate cells for use in accordance with the invention include, without limitation, reproductive cells including sperm, ova and embryonic cells, and non-reproductive cells, including kidney, lung, spleen, lymphoid, cardiac, gastric, intestinal, pancreatic, muscle, bone, neural, brain and epithelial cells. Stem cells, including embryonic stem cells, can also be used.

In some embodiments, a non-cellular system such as a virus or phage may be used in accordance with the invention. For examples, any one or more component(s) of the synthetic logic and memory systems may be introduced, by direct integration of logic system nucleic acids, for example, into a viral genome. A virus for use as described herein may be a double-stranded DNA (dsDNA) virus (e.g., Adenoviruses, Herpesviruses, Poxviruses), a single-stranded DNA (ssDNA) viruses ((+)sense DNA) (e.g. Parvoviruses); a double-stranded RNA (dsRNA) virus (e.g., Reoviruses); a (+)ssRNA viruses ((+)sense RNA) (e.g. Picornaviruses, Togaviruses); (−)ssRNA virus ((−)sense RNA) (e.g., Orthomyxoviruses, Rhabdoviruses); a single-stranded RNA (ssRNA)-Reverse Transcriptase viruses ((+)sense RNA with DNA intermediate in life-cycle) (e.g., Retroviruses); or a dsDNA-Reverse Transcriptase virus (e.g., Hepadnaviruses).

Viruses may also include plant viruses and bacteriophages or phages. Examples of phage families that may be used in accordance with the invention include, without limitation, Myoviridae (T4-like viruses; P1-like viruses; P2-like viruses; Mu-like viruses; SPO1-like viruses; phiH-like viruses); Siphoviridae γ-like viruses (T1-like viruses; T5-like viruses; c2-like viruses; L5-like viruses; psi.M1-like viruses; phiC31-like viruses; N15-like viruses); Podoviridae (T7-like viruses; phi29-like viruses; P22-like viruses; N4-like viruses); Tectiviridae (Tectivirus); Corticoviridae (Corticovirus); Lipothrixviridae (Alphalipothrixvirus, Betalipothrixvirus, Gammalipothrixvirus, Deltalipothrixvirus); Plasmaviridae (Plasmavirus); Rudiviridae (Rudivirus); Fuselloviridae (Fusellovirus); Inoviridae (Inovirus, Plectrovirus); Microviridae (Microvirus, Spiromicrovirus, Bdellomicrovirus, Chlamydiamicrovirus); Leviviridae (Levivirus, Allolevivirus) and Cystoviridae (Cystovirus). Such phages may be naturally occurring or engineered phages.

In some embodiments, the cell or cellular system is a "natural cell" (e.g., found in nature; not artificial or synthetic). In some embodiments, the cell or cellular system is an artificial cell or synthetic cell. As used herein, an "artificial cell" or a "synthetic cell" is a minimal cell formed from artificial parts that can function in ways that a natural cell can function (e.g., transcribe and translate proteins and generate ATP).

A host cell in accordance with the invention includes any host cell that, upon transformation or transfection with one or more component(s) of the synthetic logic system (e.g., logic gates) is capable of supporting the activation and expression of the synthetic logic and memory system component(s).

In some embodiments, one or more component(s) of the synthetic logic and memory systems of the invention may be introduced into a cellular or non-cellular system using a vector or plasmid. As used herein, a "vector" is used interchangeably with "plasmid" to refer to a nucleic acid molecule capable of transporting another nucleic acid to which it has been linked. Vectors capable of directing the expression of genes and/or nucleic acid sequence to which they are operatively linked are referred to herein as "expression vectors." In general, expression vectors described herein are often in the form of plasmids, which are circular double-stranded DNA loops not bound to chromosome. Expression vectors may be vectors for stable or transient expression of the DNA. A vector may be either a self-replicating extrachromosomal vector or a vector which integrates into a host genome. Other expression vectors may be used in accordance with the invention including, without limitation, episomes, bacteriophages and viral vectors, and such vectors can integrate into the host's genome or replicate autonomously in the particular cellular system used. Other forms of expression vectors known by those skilled in the art which serve the equivalent functions may also be used.

Vectors comprising nucleic acid sequences of the invention (e.g., those encoding logic gates) may be "introduced" into cells as polynucleotides by techniques well-known in the art for introducing DNA and RNA into cells. As used herein, "transfection" refers to the introduction of genetic material (e.g., a vector comprising nucleic acid sequences) into a cell, tissue or organism. Transfection of a cell may be stable or transient. A host cell is considered to be transiently transfected when nucleic acid is introduced into the cell and does not integrate into the host cell's genome. Transient transfection may be detected by, for example, enzyme linked immunosorbent assay (ELISA), which detects the presence of a polypeptide encoded by the nucleic acid, or it may be detected by detecting the activity of a protein encoded by the nucleic acid. By contrast, a host cell is considered to be stably transfected when nucleic acid is introduced into the cell and does integrate into the host cell's genome. Stably transfected cells pass the introduced nucleic acid to their progeny (i.e., stable heritability through meiosis). Stable transfection of a cell may be detected by Southern blot hybridization of genomic DNA of the cell with nucleic acid sequences, which are capable of binding to one or more of the transgenes, or by polymerase chain reaction of genomic DNA of the cell to amplify transgene sequences.

In some embodiments, a synthetic RNA-processing platform may be used to process mRNAs to separate the 5'untranslated region (UTR) from the downstream gene. For example, a sequence encoding a self-cleaving ribozyme (e.g., RiboJ [68]; AGCTGTCACCGGATGTGCTTTCCG-GTCTGATGAGTCCGTGAGGACGAAACAGCCT CTA-CAAATAATTTTGTTTAA [SEQ ID NO:16]) may be inserted upstream (e.g., directly upstream) of the output nucleic acid to improve expression of the gene. RiboJ, for example, self-cleaves to reduce the impact of the upstream RRSs on translation of the downstream gene. In some embodiments, the bacterial clustered regularly interspaced short palindromic repeat (CRISPR) pathway may be used to process mRNAs to separate the 5' UTR from the downstream gene [70]. In some embodiments, a coupled translational system with an upstream "throwaway" open reading frame (ORF) and downstream ORF may be used to generate mRNAs with more reliable and programmable translation of the downstream [71]. Other synthetic RNA-processing platforms are also contemplated herein.

Uses of Synthetic Logic and Memory Systems

The recombinase-based synthetic logic and memory systems of the invention are useful for, inter alia, engineering complex behavioral phenotypes in cellular systems, such as prokaryotic, eukaryotic and synthetic cells, or in non-cellular systems, including test tubes, viruses and phages. The logic and memory systems described herein combine the power of nucleic acid-based engineering methods with computational and systems biology approaches for programming cellular, or biological, state machines, behaviors and pathways for therapeutic, diagnostic and basic science applications. As used herein, a "state machine" refers to any tool that stores the status (or state) of something at a given time and can operate on input(s) to change the status and/or cause an action(s) or output(s) to take place for any given change. Typically, a state machine includes a set of input events, a set of output events, a set of states, a function that maps states and input(s) to output(s), a function that maps states and inputs to new states (which is referred to as a state transition function), and a description of the initial state.

The synthetic logic and memory systems of the invention may be used for a variety of applications and in many different types of methods, including, but not limited to, bioremediation, biosensing and biomedical therapeutics. In some embodiments, the logic and memory systems may be used to build multiplexed cellular switches for gene expression or synthetic differentiation cascades. Cellular signals can be integrated as inputs to the logic and memory systems by linking the signals to recombinase expression. Multicellular systems endowed with logic and memory systems of the invention may also implement distributed computation or synthetic cellular consortia [23-26].

In some embodiments, the synthetic logic and memory systems of the invention may also be used to build "digital-to-analog converters," which translate digital representations back into analog outputs. Such systems may be used to reliably set internal system states. For example, instead of fine-tuning transcriptional activity with varying amounts of chemical inducers, a digital-to-analog converter, composed of a bank of genetic switches (different recombinases and logic gates), each of which is sensitive to a different inducer, provides better control. By enabling, through each activated switch, transcription from promoters of varying strengths (e.g., $P_{output,3} > P_{output,2} > P_{output,1}$), digital combinations of inducers may be used to program defined levels of transcriptional activities. Such a circuit may be used in biotechnology applications, where reliable expression of different pathways is needed for programming different modes of operation in engineered cells. In addition, digital-to-analog converters are useful for providing a multiplexed method for probing synthetic circuits. For example, because each analog level is associated with a distinct digital state, a single analog output can allow one to infer the internal digital state of a synthetic gene network.

Further, in some embodiments, the synthetic logic and memory systems of the invention may be used for detection of arsenic in drinking water and/or a range of toxins and/or heavy metals. The systems may be coupled to genetically engineered bacteria, which are capable of digesting and neutralizing toxins and heavy metals. This may be achieved, for example, by the bacteria sensing a specific toxin or heavy metal, and the sensor being directly linked as input for an inducible promoter that controls recombinase expression, which in turn activates the logic/memory system by flipping (e.g., activating or de-activating) the gene, promoter or terminator. As a result, the pathway that controls digesting and neutralizing toxins and heavy metals is turned on.

The methods and uses of the synthetic logic and memory systems of the invention may involve in vivo, ex vivo, or in vitro systems. The term "in vivo" refers to assays or processes that occur in or within an organism, such as a multicellular animal. In some embodiments, a method or use can be said to occur in vivo when a unicellular organism, such as a bacteria, is used. The term "ex vivo" refers to methods and uses that are performed using a living cell with an intact membrane that is outside of the body of a multicellular animal or plant (e.g., explants, cultured cells, including primary cells and cell lines, transformed cell lines, and extracted tissue or cells, including blood cells, among others). The term "in vitro" refers to assays and methods that do not require the presence of a cell with an intact membrane, such as cellular extracts, and may refer to introducing an engineered genetic counter in a non-cellular system, such as a media not comprising cells or cellular systems, such as cellular extracts.

EXAMPLES

Example 1. Recombinase-Based Logic and Memory Systems

Serine recombinases, Bxb1 and phiC31, which target non-identical recognition sites known as attB and attP, were used to irreversibly invert or excise DNA based on the orientation of the surrounding pair of recognition sites [11]. To ensure low leakage in the absence of inputs, Bxb1 [12] and phiC31 [13] were cloned under the control of N-Acyl homoserine lactone (AHL) and anhydrotetracycline (aTc) inducible riboregulators [14], respectively. All cells contained both of these recombinase expression constructs. Herein, Bxb1 expression via AHL is referred to as input A and phiC31 expression via aTc is referred to as input B. The output of the logic and memory systems of the invention were assayed by using green fluorescent protein (gfp) as a reporter gene. The data presented herein demonstrate that Bxb1 and phiC31 operate orthogonally with respect to each other (see the "A" and "B" gates in FIG. 2).

Recombinase-catalyzed inversion of cascaded promoters (recombinase-promoter logic) can implement OR and NAND logic, depending on the initial orientation of the promoters (FIG. 2). When both promoters are inverted with respect to the downstream output gene, flipping (i.e., inversion) of either promoter by inputs A or B results in a high GFP output (OUT=A OR B). When both promoters are upright with respect to the downstream output gene, the inversion of both promoters by inputs A and B is required to produce a low output (OUT=A NAND B).

Recombinase-catalyzed inversion of cascaded unidirectional terminators (recombinase-terminator logic) can implement AND and NOR logic, depending on the initial orientation of the terminators (FIG. 1 and FIG. 2). When two terminators are upright and located between a promoter and an output gene, inversion of both terminators by input A and B results in a high output (OUT=A AND B). When two unidirectional terminators are initially inverted, the inversion of either terminator by inputs A or B results in a low output (OUT=A NOR B).

NOR and NAND gates are universal logic operations and can be assembled together to implement more complex functions [15-17], as is often done in electrical systems. However, biological systems are resource-constrained environments with much fewer parts that are available for synthetic circuit design. Thus, in some embodiments, direct and efficient encoding of complex logic functions, without the need to cascade multiple universal gates together, is implemented.

By building different combinations of recombinase-invertible promoters, terminators, and output nucleic acid sequences, all two-input Boolean logic functions were created in individual cells without requiring multi-logic-gate cascades (FIG. 1 and FIG. 2). This was performed with a modular one-step Gibson assembly strategy using reusable recombinase-invertible components [18]. A simple programming language defines the logic function implemented by a given design in the [promoter(s)]-[terminator(s)]-[output] structure (FIG. 2). Specifically, output nucleic acid expression can only occur when: (at least one upstream promoter is upright) AND (no terminators are upright) AND (the output nucleic acid is upright).

Using these straightforward programming rules, a given logic function can be implemented using different combinations of the recombinase-invertible modules, thus giving flexibility for design (FIG. 2 and FIG. 3). For example, B NIMPLY A is equivalent to B AND NOT A; this logic function can be built by cascading an inverted promoter, which is flipped by phiC31 (due to expression of input B), with a downstream inverted terminator, which is flipped by Bxb1 (due to expression of input A), and a downstream upright gfp output gene (FIG. 2). In this configuration, gene expression only occurs when B is TRUE and A is FALSE.

Moreover, complex XOR and XNOR gates can be implemented with the simplicity of the other logic gates by positioning components between the recombinase-recognition sites of both recombinases (FIG. 2 and FIG. 3). In the XOR gate of FIG. 2, the promoter is initially inverted. Any single inversion of the promoter, due to either AHL or aTc, results in GFP expression whereas no inversion of the promoter, due to the absence of AHL and aTc, or double inversion of the promoter, due to the presence of both AHL and aTc, results in the absence of GFP expression (FIG. 2). In the XOR gate of FIG. 3, a gfp gene is initially inverted and only single inversions of this gene due to single inputs result in GFP expression. In the XNOR gate, the gfp gene is initially upright (FIG. 2). Thus, the presence of single inputs inverts the gfp gene and abolishes GFP expression, which would otherwise be present (FIG. 2).

Figure 4A:
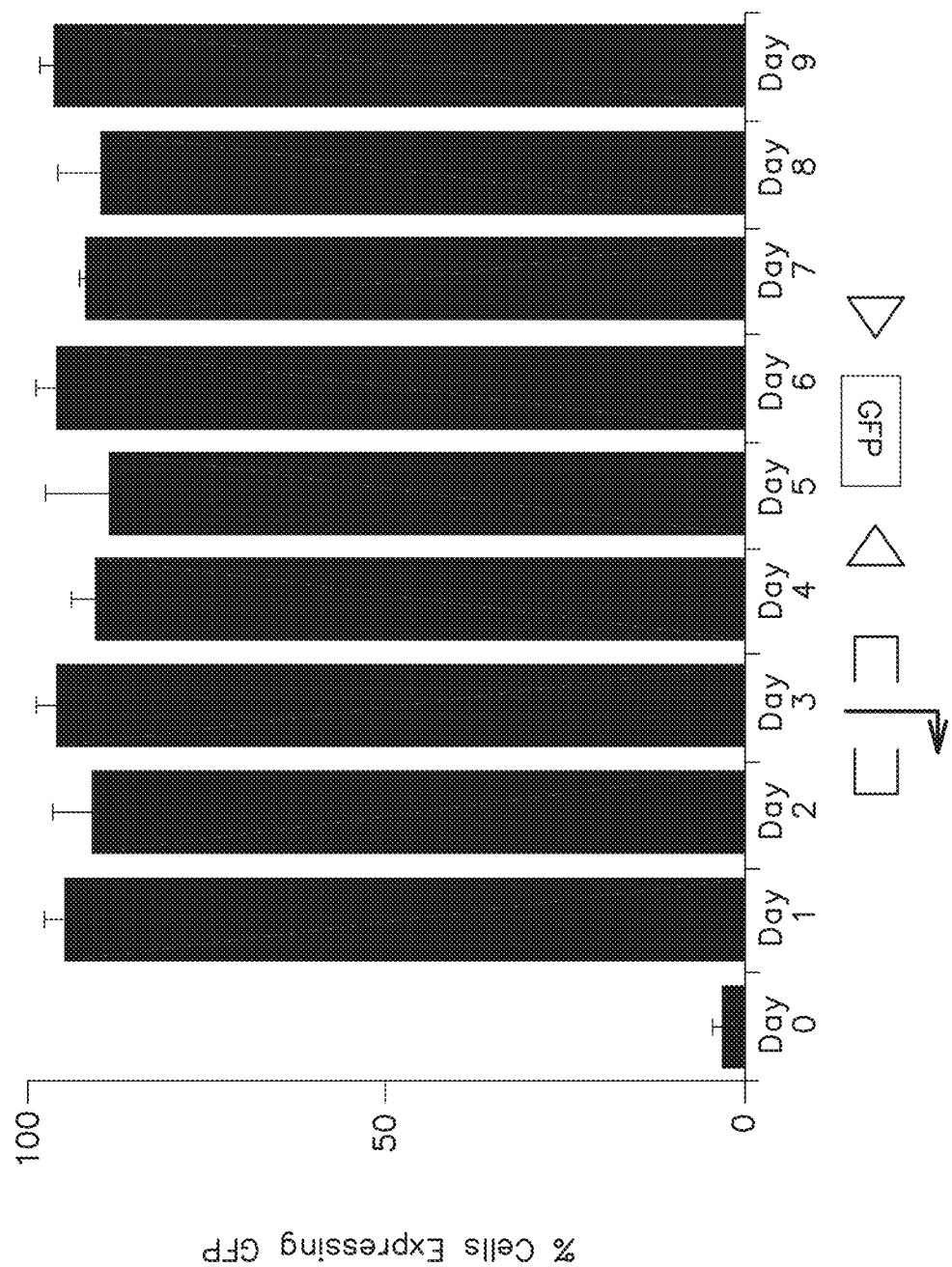
FIG. 4A shows a graph of data demonstrating memory maintenance over multiple cellular generations. Cells containing an AND gate were induced to the ON state (positive for GFP expression/GFP positive) after Day 0 and were continuously diluted and grown without input signals for 9 days thereafter. The percentage of cells maintaining GFP expression was assayed by flow cytometry. Measurements are from three independent experiments, and the error bars represent standard errors of the mean.
Figure 4B:
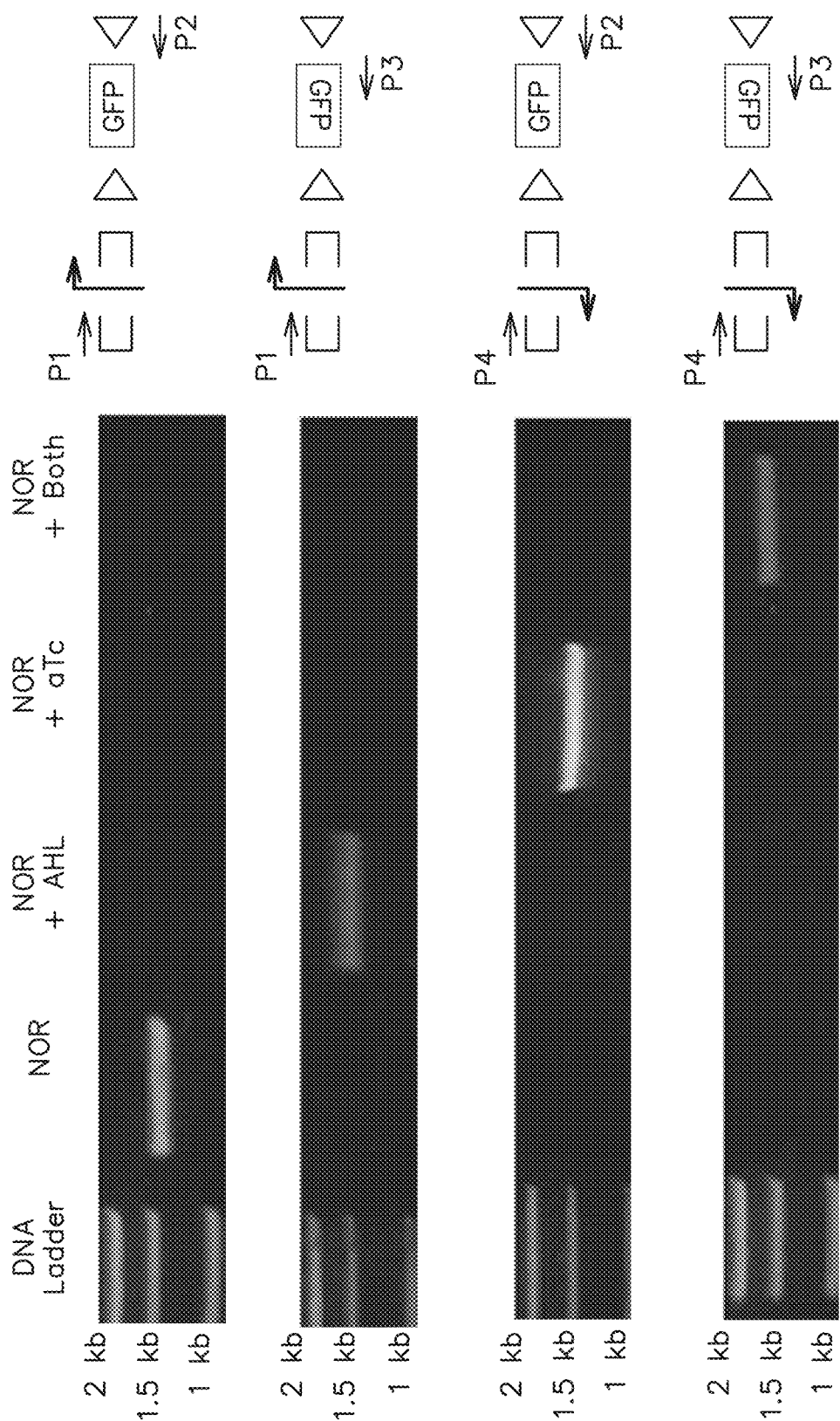
FIG. 4B shows an electrophoretic gel image (right) of polymerase chain reaction (PCR) products and accompanying logic gate schematics (left). The state of a NOR gate was detected by PCR (primers indicated by small arrows) after cell death. PCR products were analyzed by electrophoresis on a 1% agarose gel.
Figure 5A:
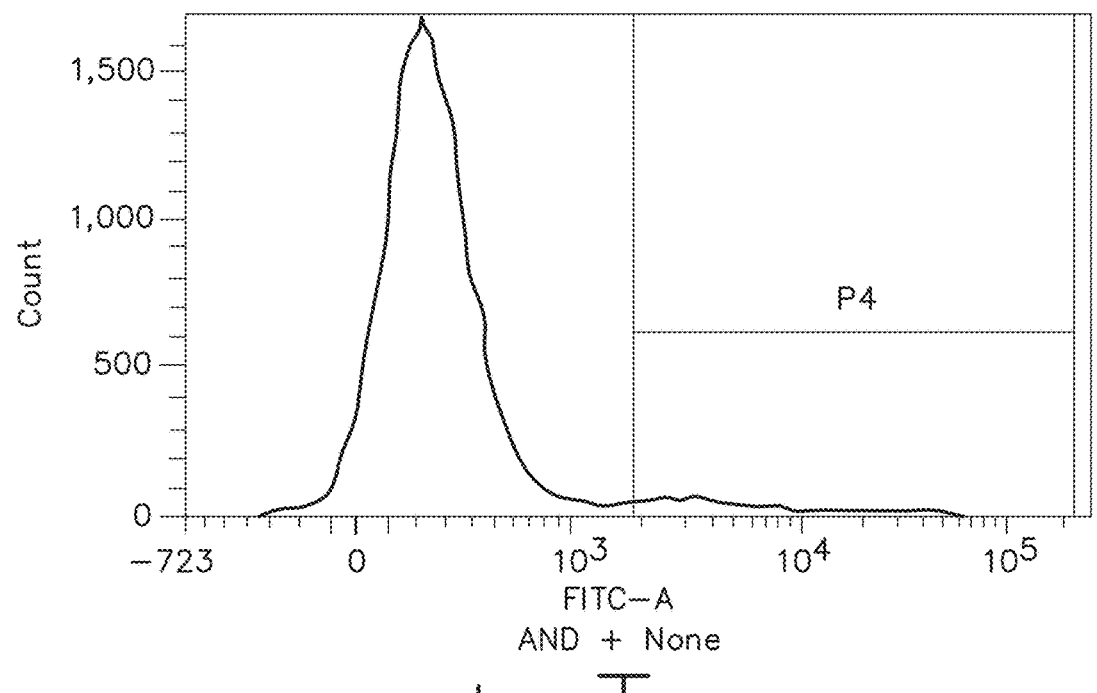
FIG. 5 shows graphs of flow cytometry data. Flow cytometry was used to assay output of recombinase-based logic and memory systems. A fluorescence threshold was applied uniformly for all systems to determine the percentage of cells that was deemed GFP positive (ON state) or GFP negative (OFF state). Representative flow cytometry data for the AND gate is shown in the absence of any inputs, with AHL alone, with aTc alone, and with both AHL and aTc simultaneously applied.
Figure 5B:
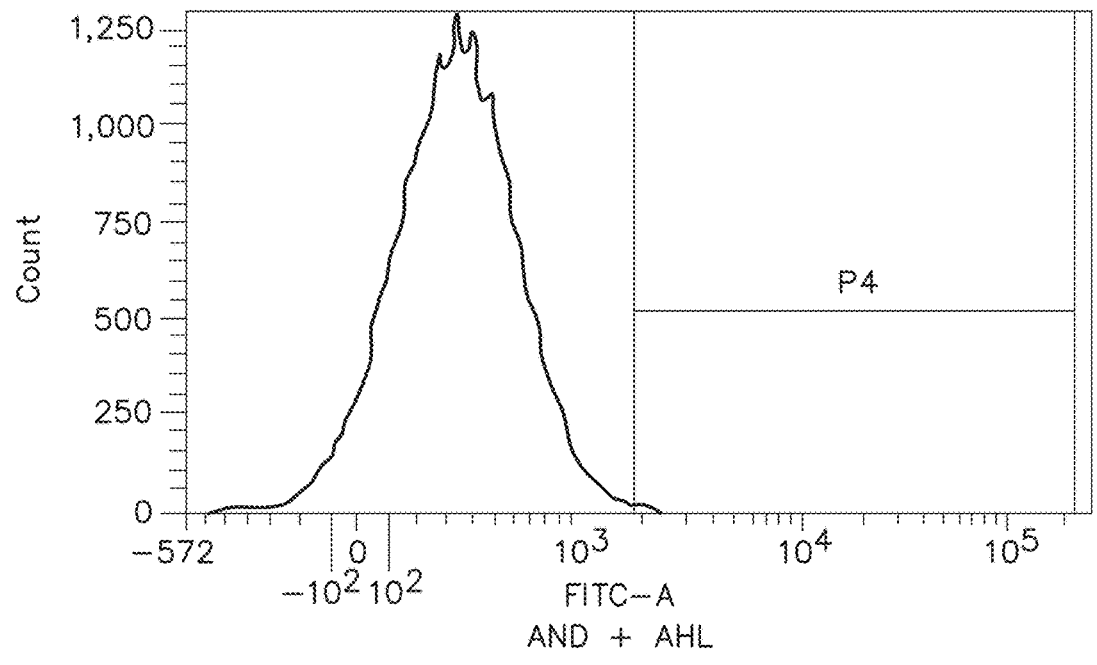
Figure 5C:
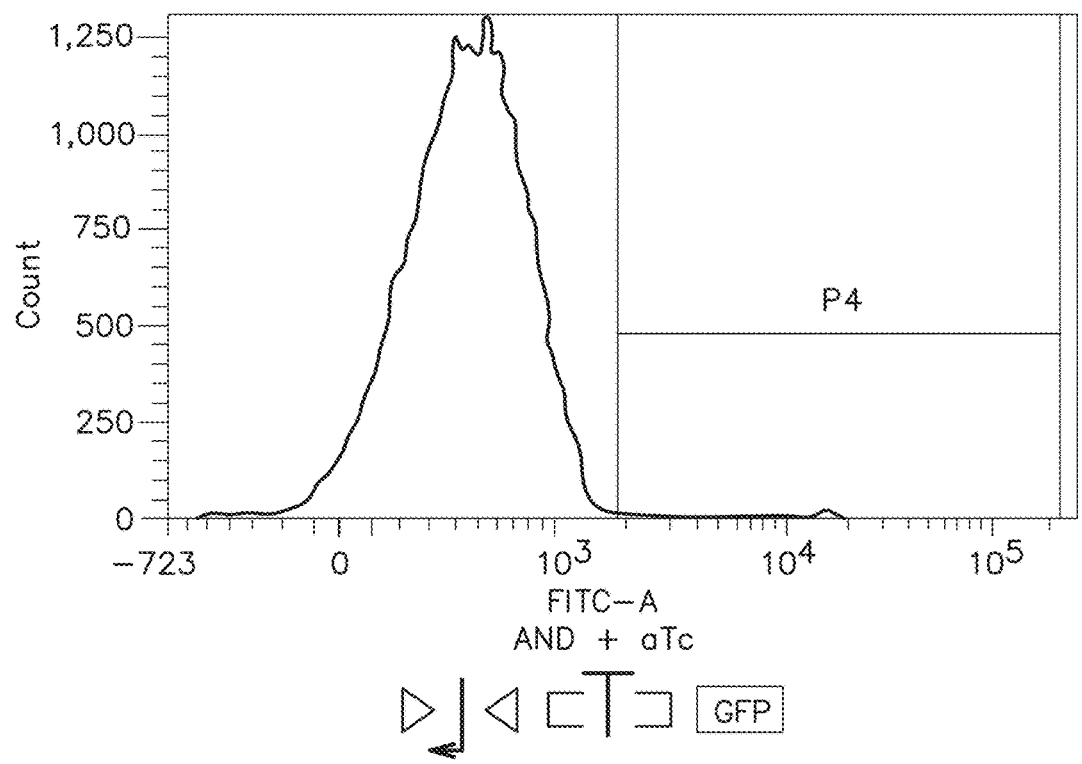
Figure 5D:
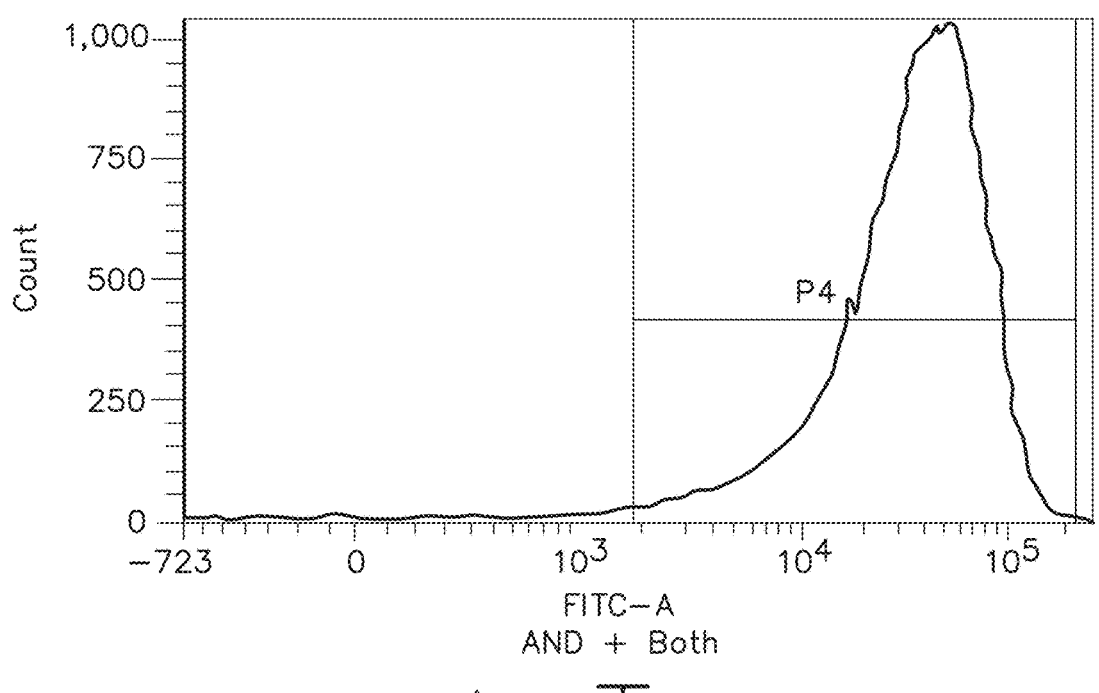
Figure 6:
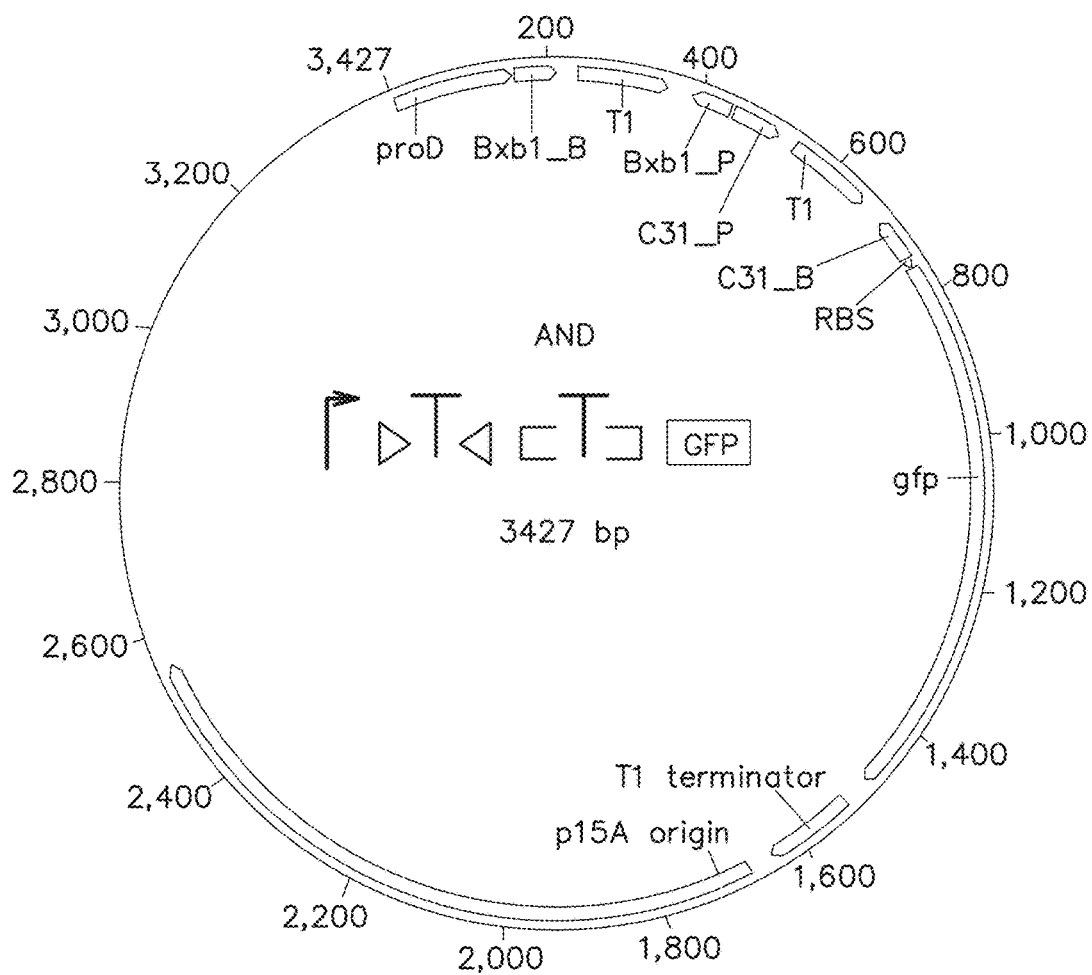
FIG. 6 shows a plasmid map of an AND logic gate of the invention.
Figure 7:
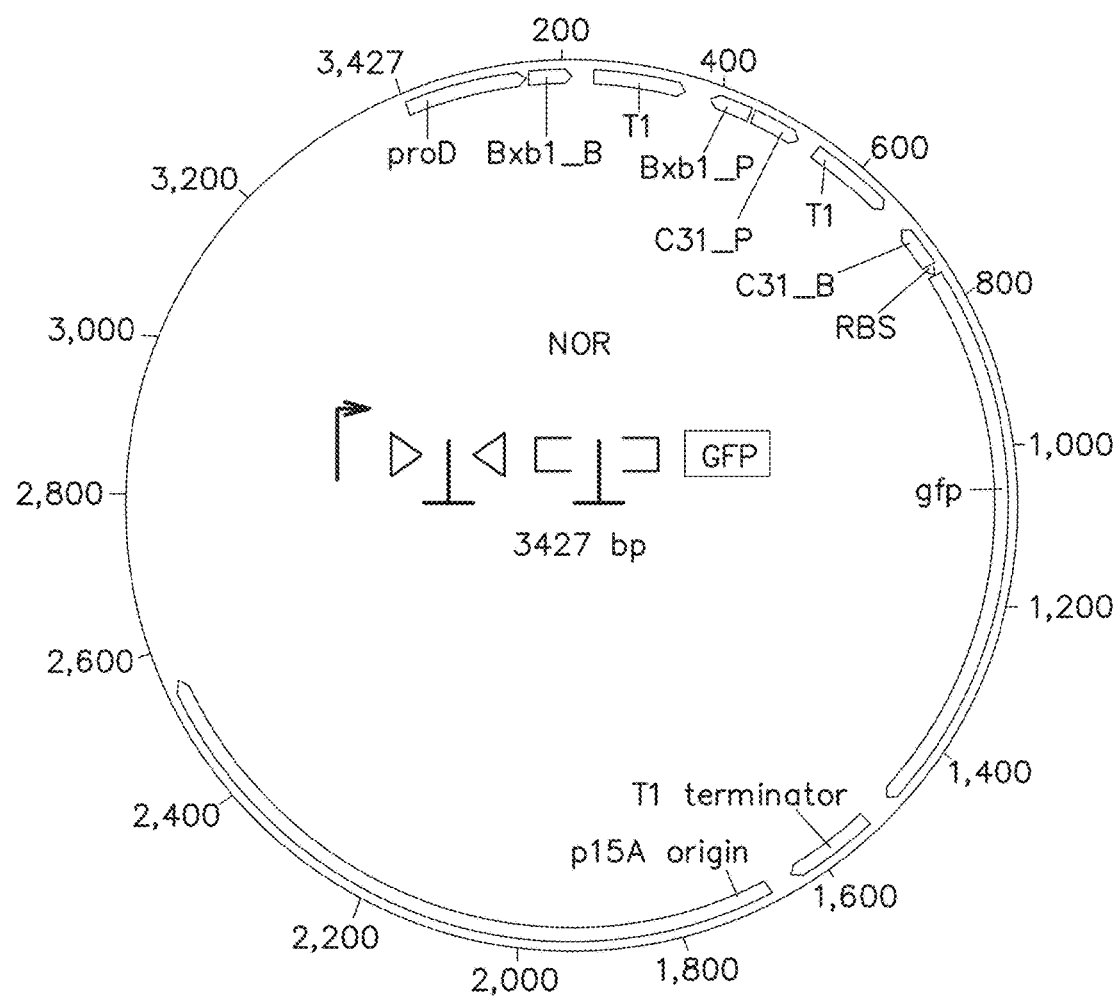
FIG. 7 shows a plasmid map of a NOR logic gate of the invention.
Figure 8:
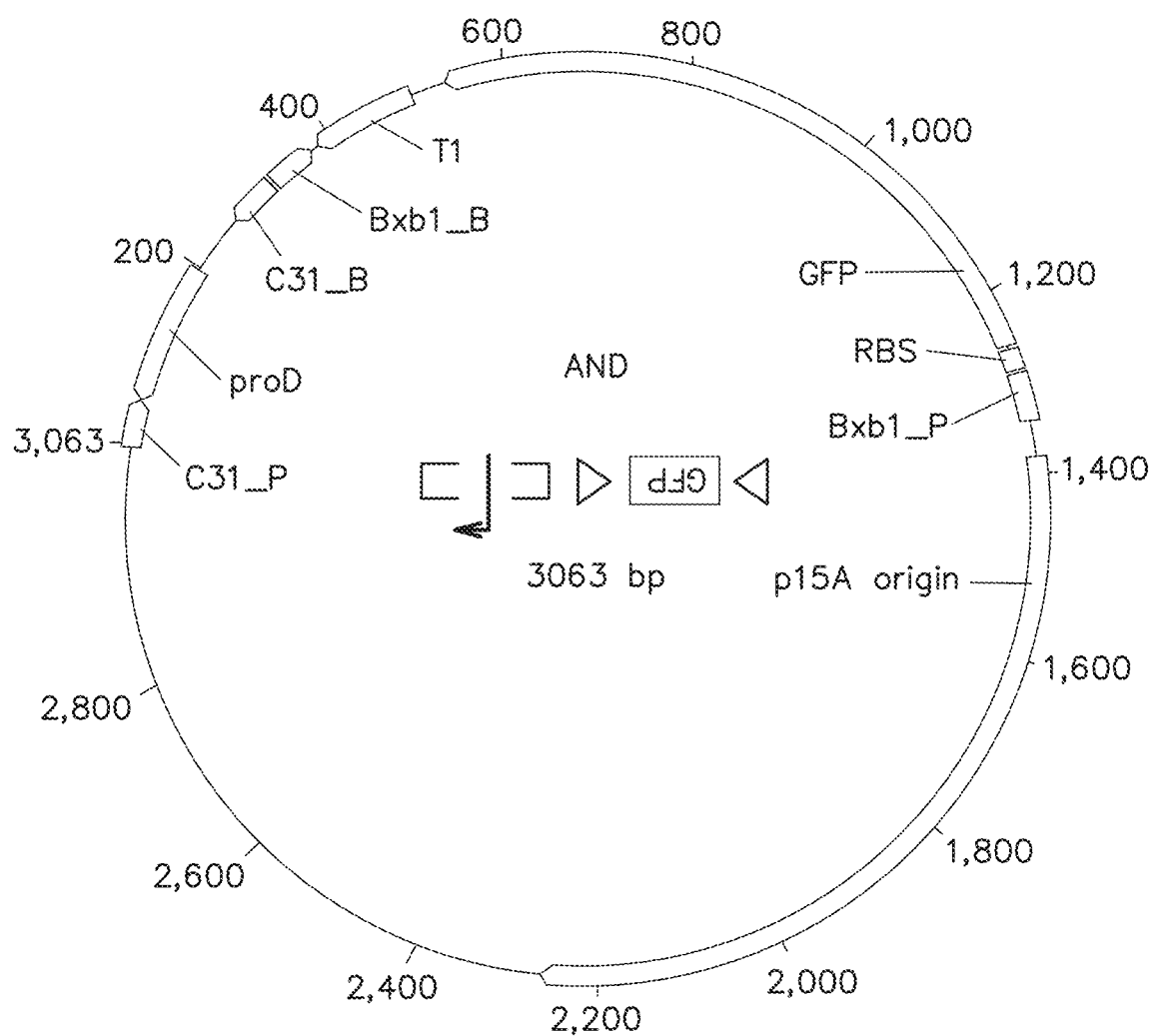
FIG. 8 shows a plasmid map of an AND logic gate of the invention.
Figure 9:
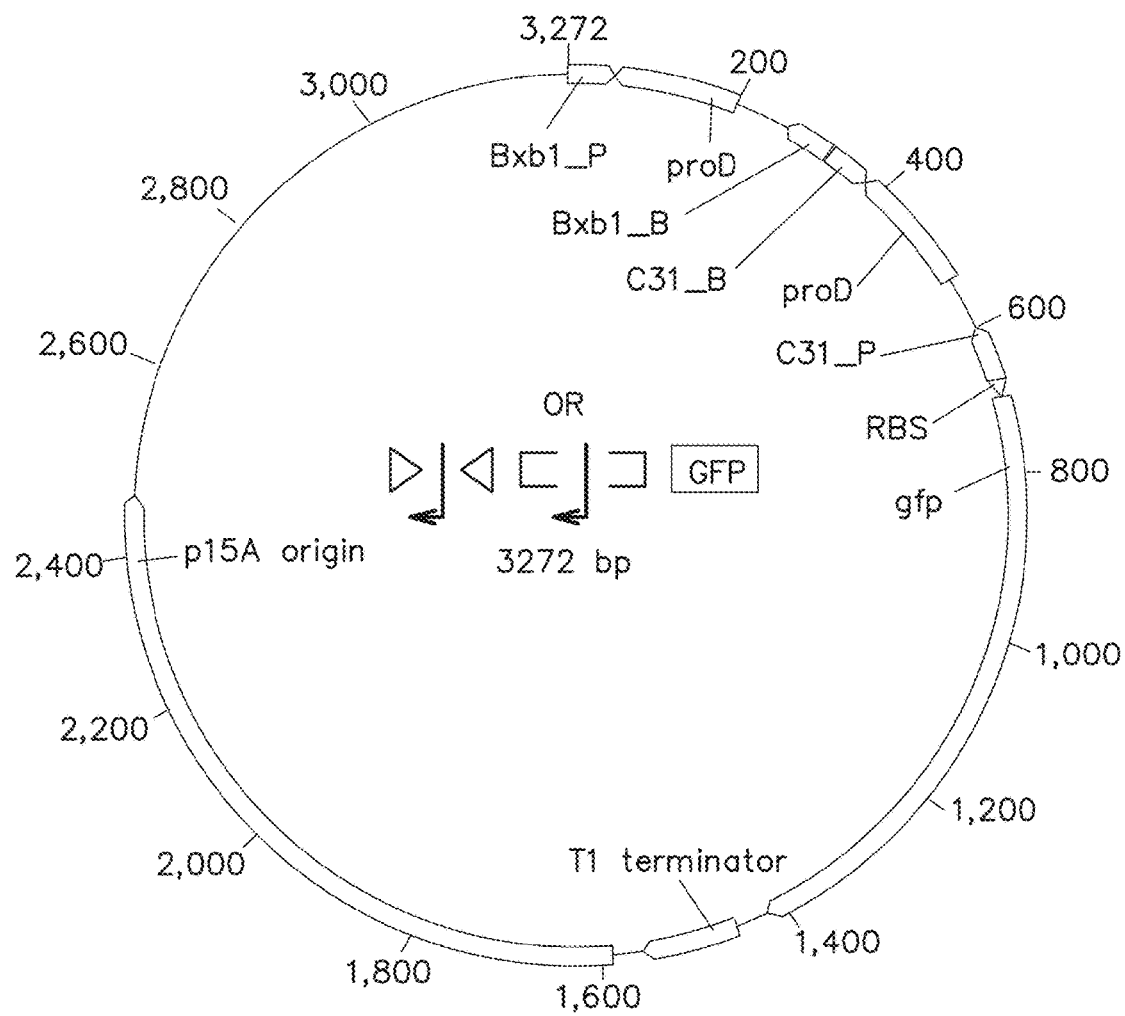
FIG. 9 shows a plasmid map of an OR logic gate of the invention.
Figure 10:
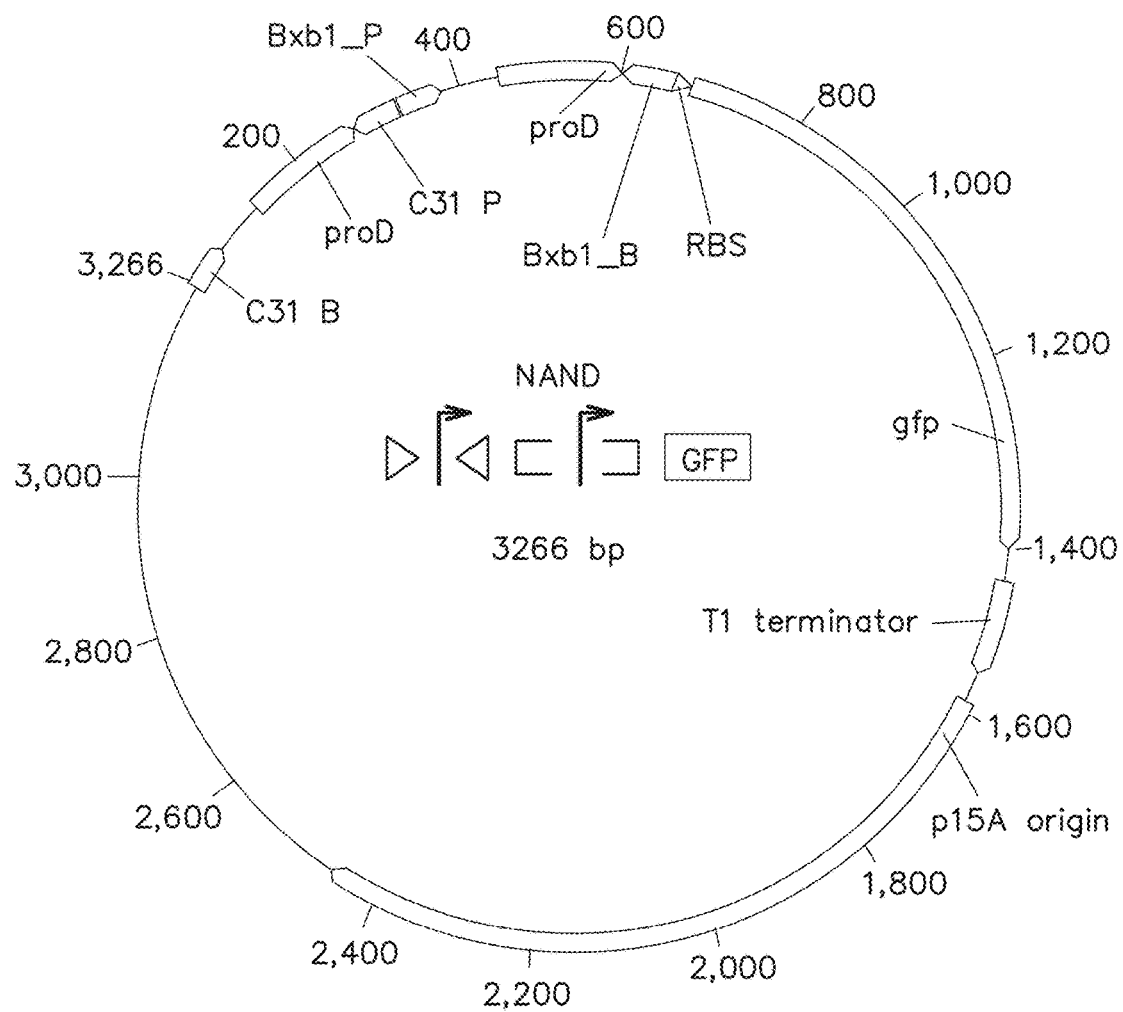
FIG. 10 shows a plasmid map of a NAND logic gate of the invention.
Figure 11:
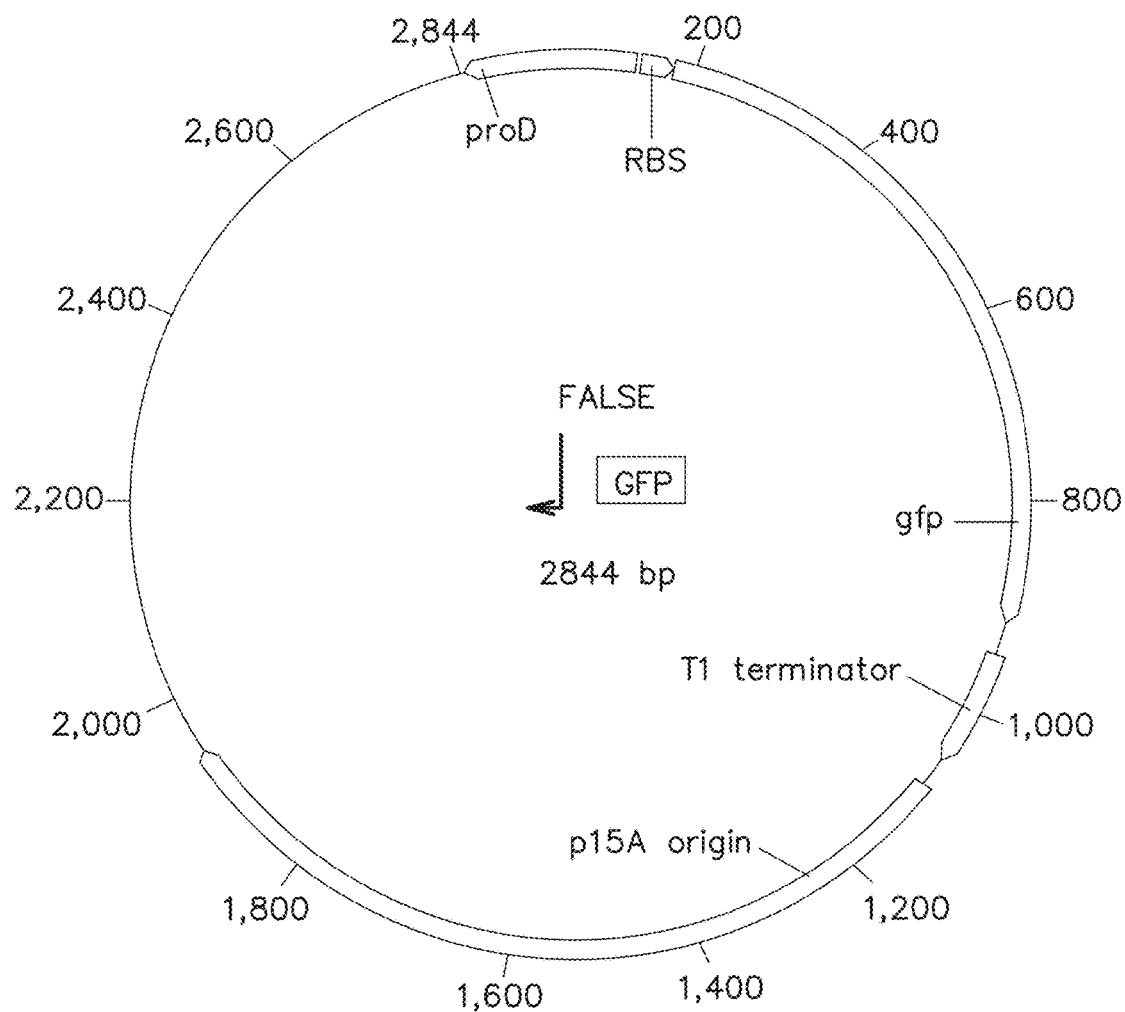
FIG. 11 shows a plasmid map of a FALSE logic gate of the invention.
Figure 12:
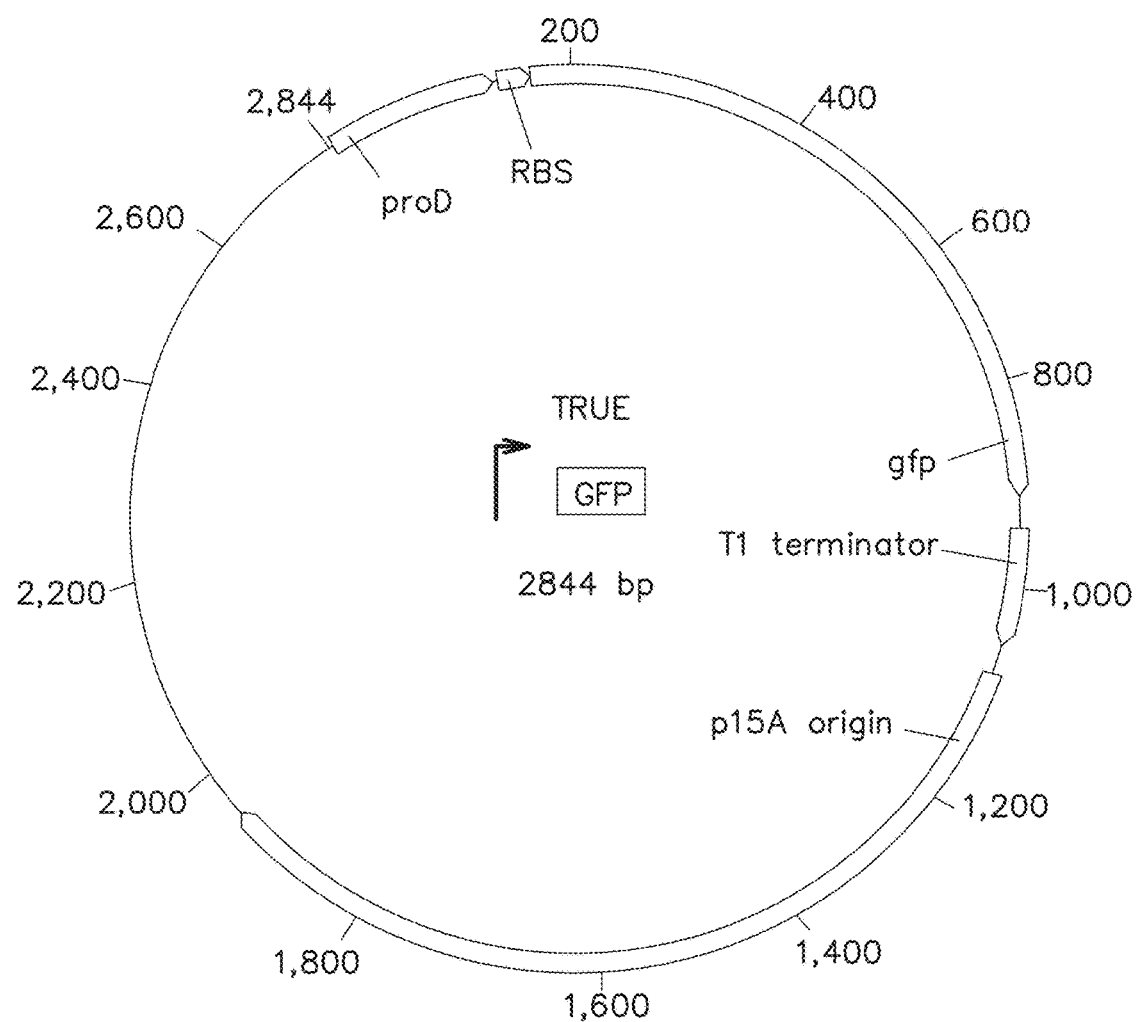
FIG. 12 shows a plasmid map of a TRUE logic gate of the invention.
Figure 13:
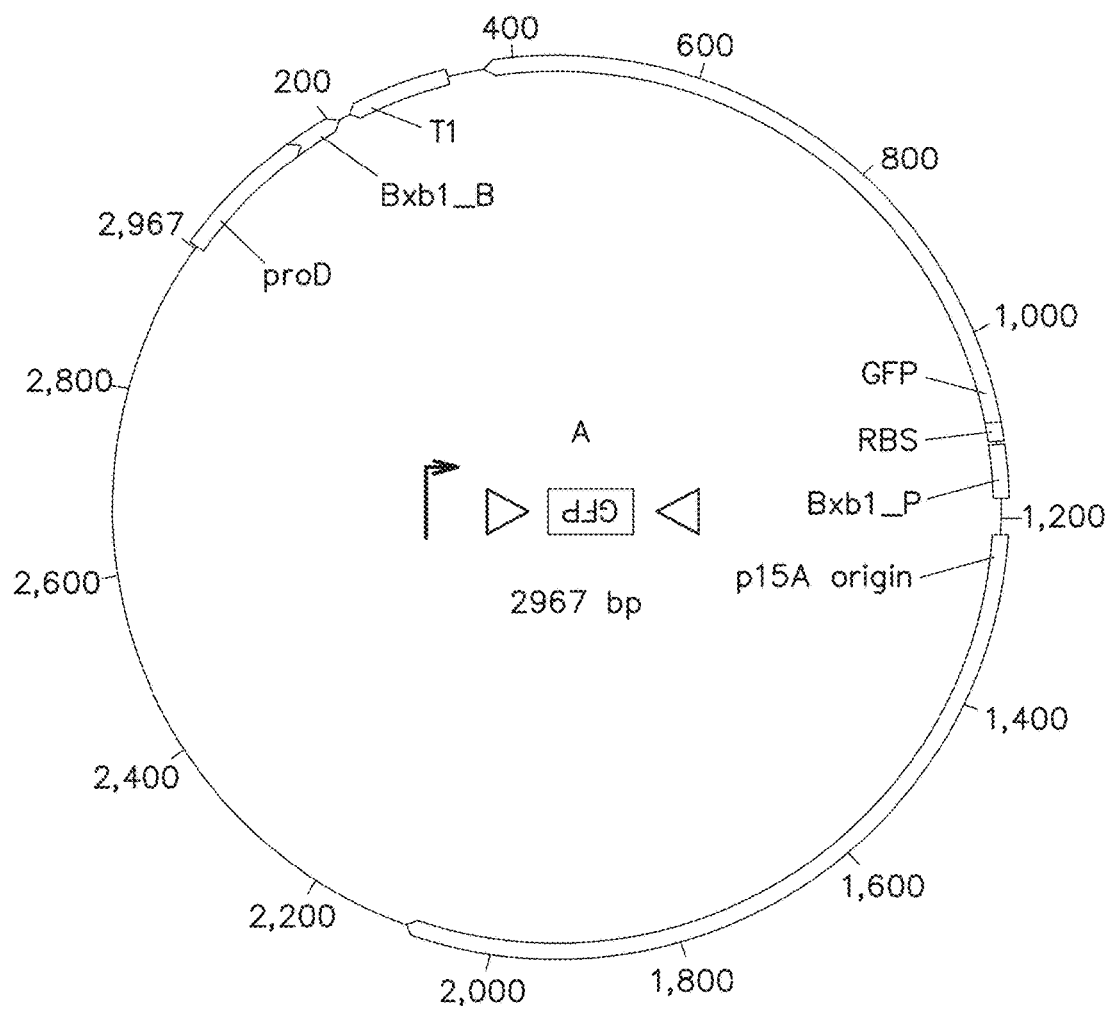
FIG. 13 shows a plasmid map of an A logic gate of the invention.
Figure 14:
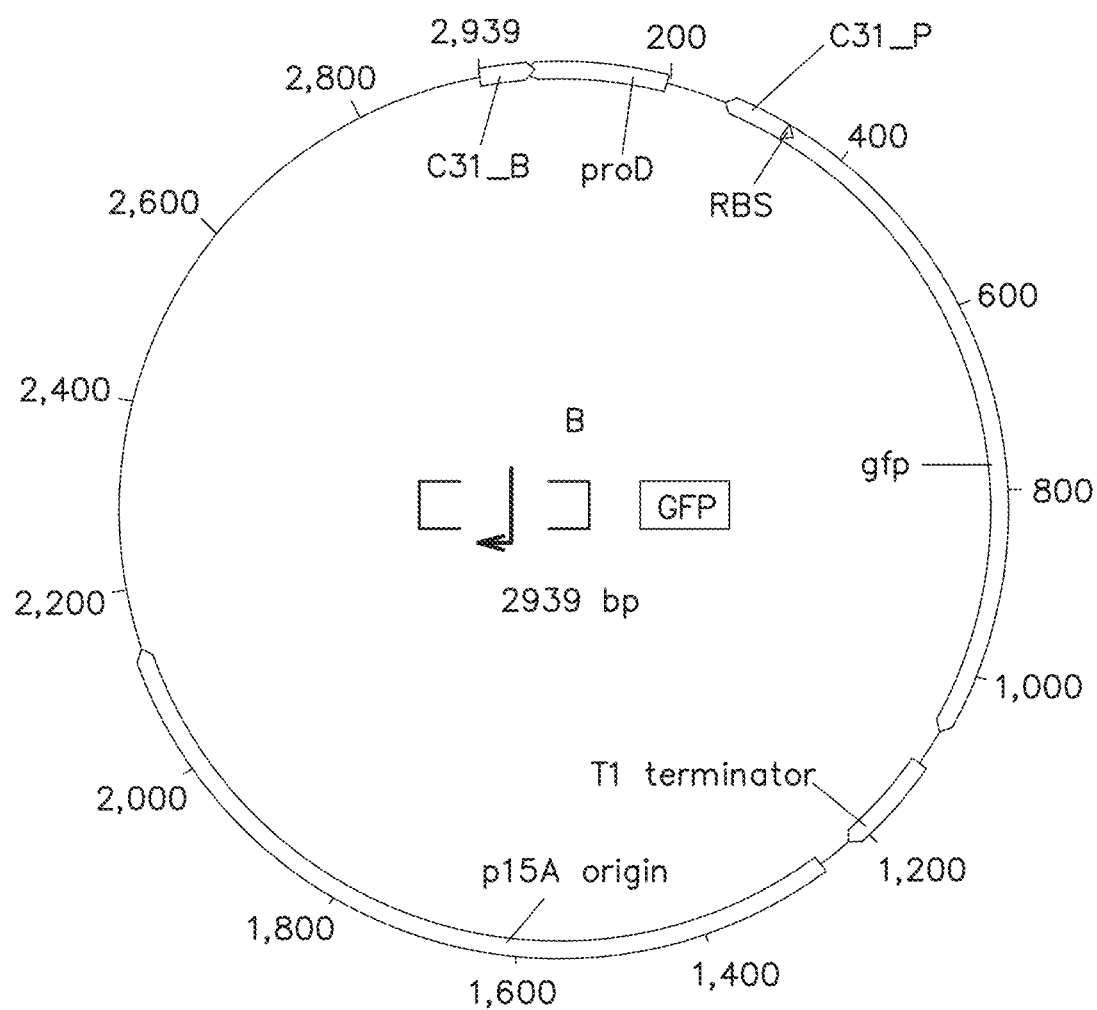
FIG. 14 shows a plasmid map of a B logic gate of the invention.
Figure 15:
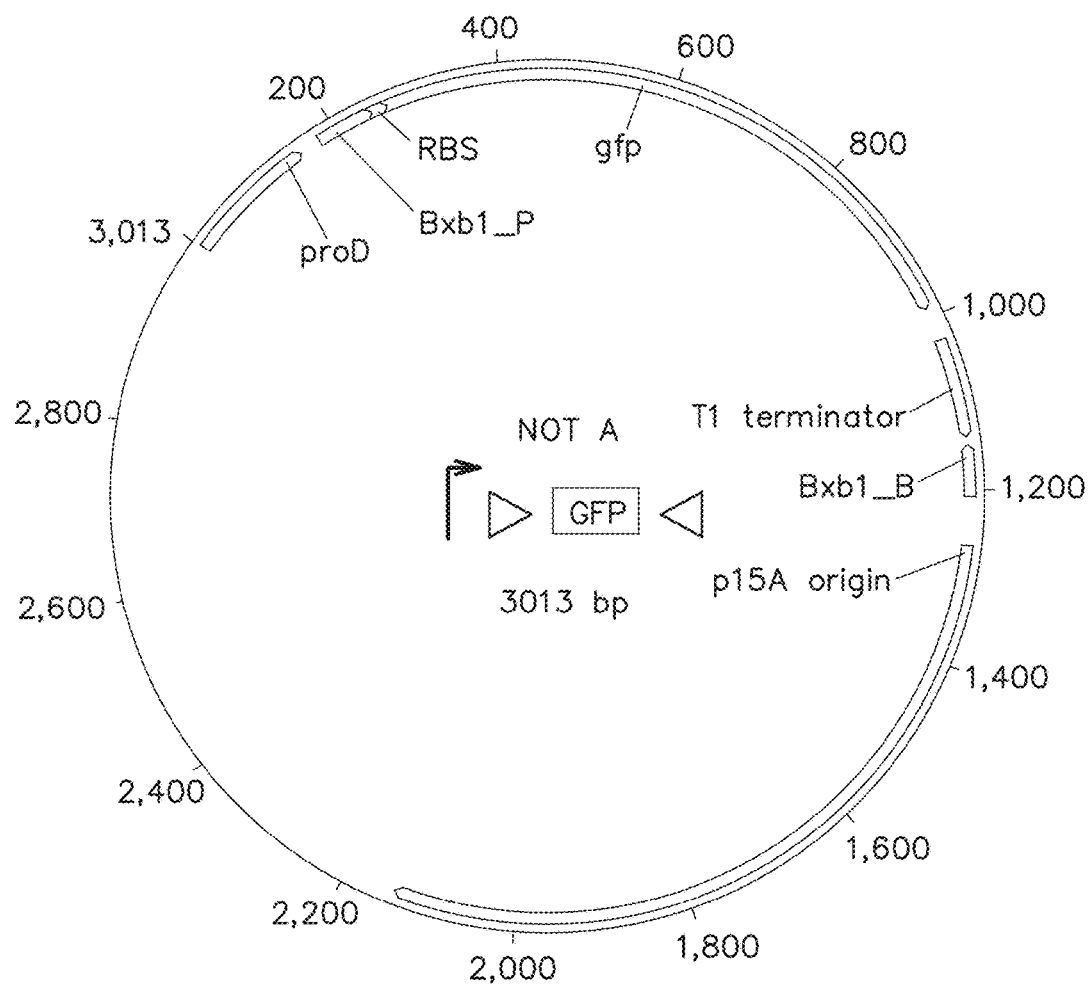
FIG. 15 shows a plasmid map of a NOT A logic gate of the invention.
Figure 16:
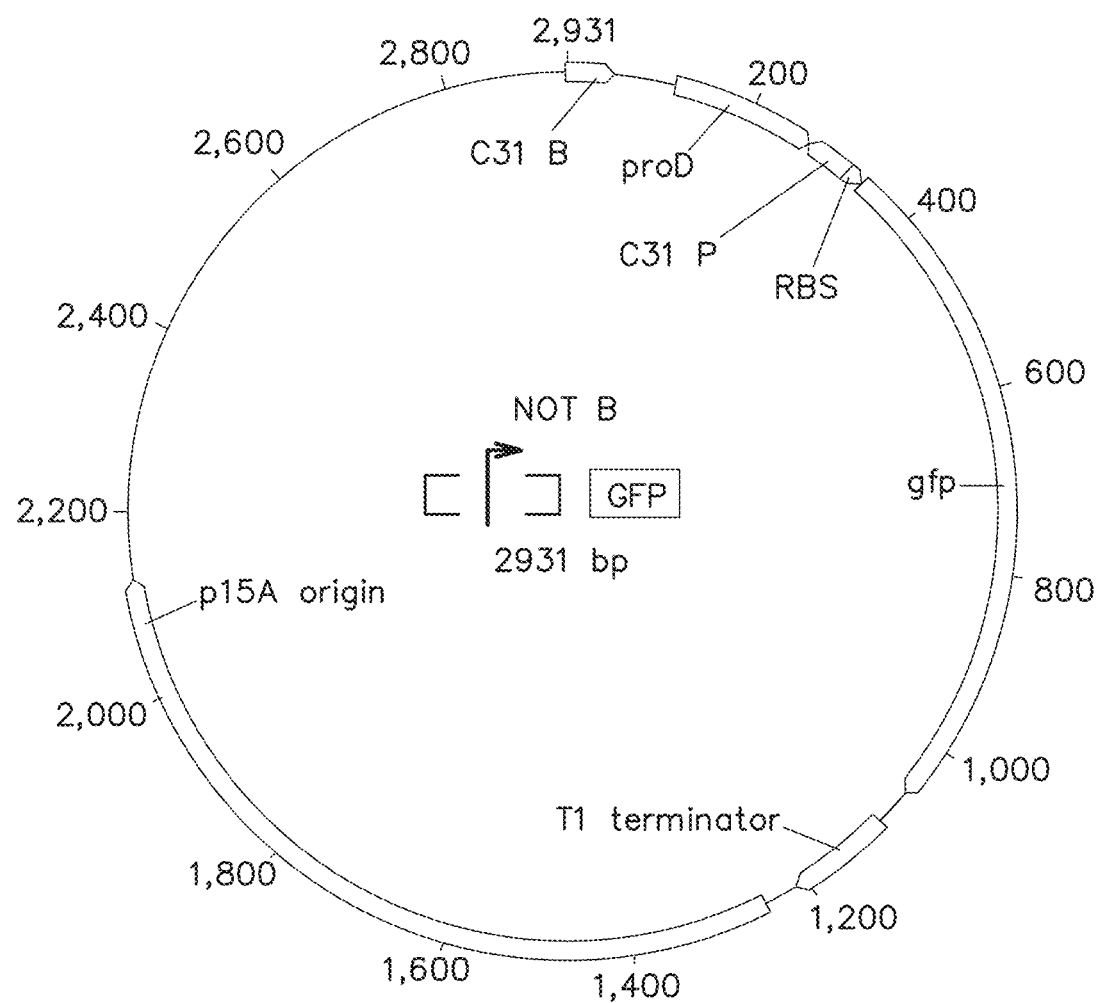
FIG. 16 shows a plasmid map of a NOT B logic gate of the invention.
Figure 17:
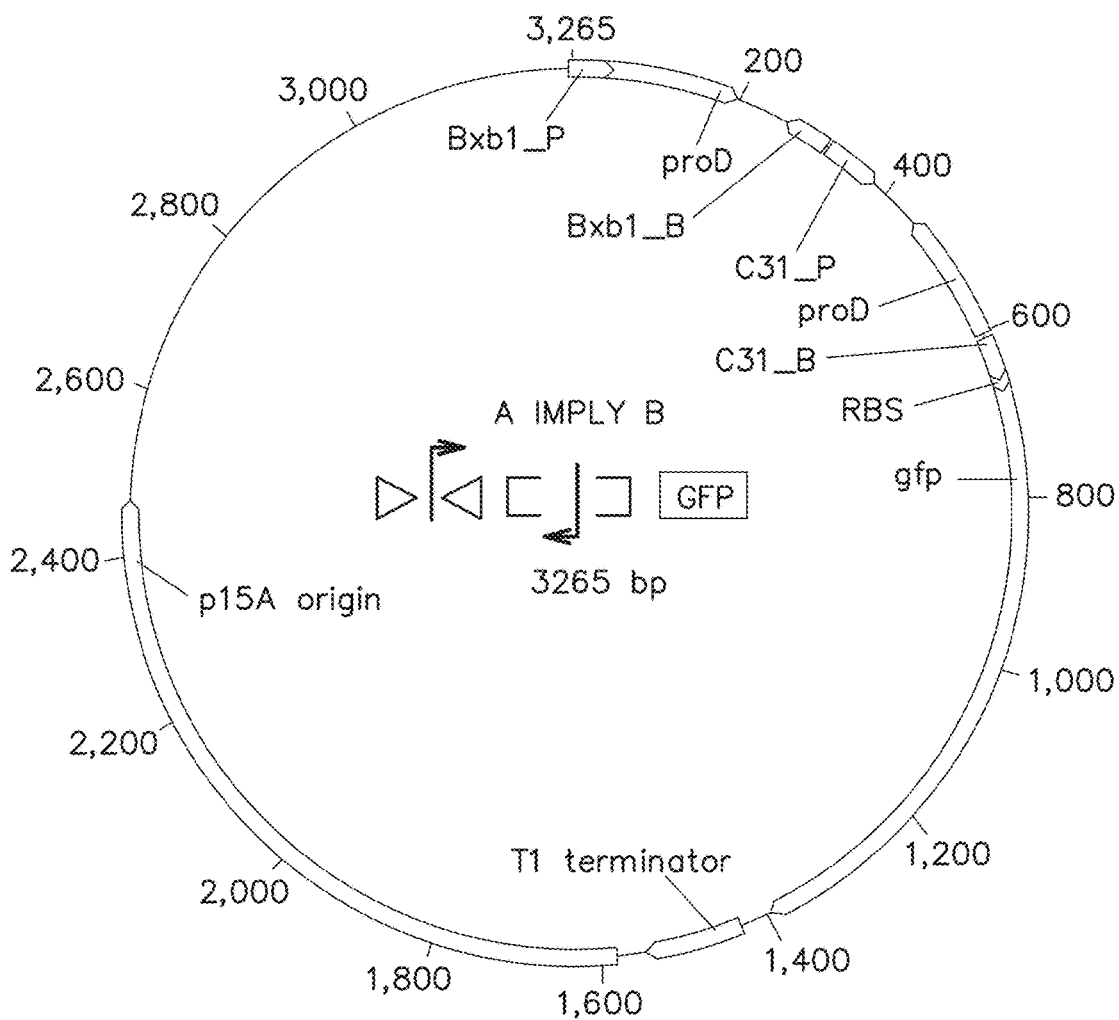
FIG. 17 shows a plasmid map of an A IMPLY B logic gate of the invention.
Figure 18:
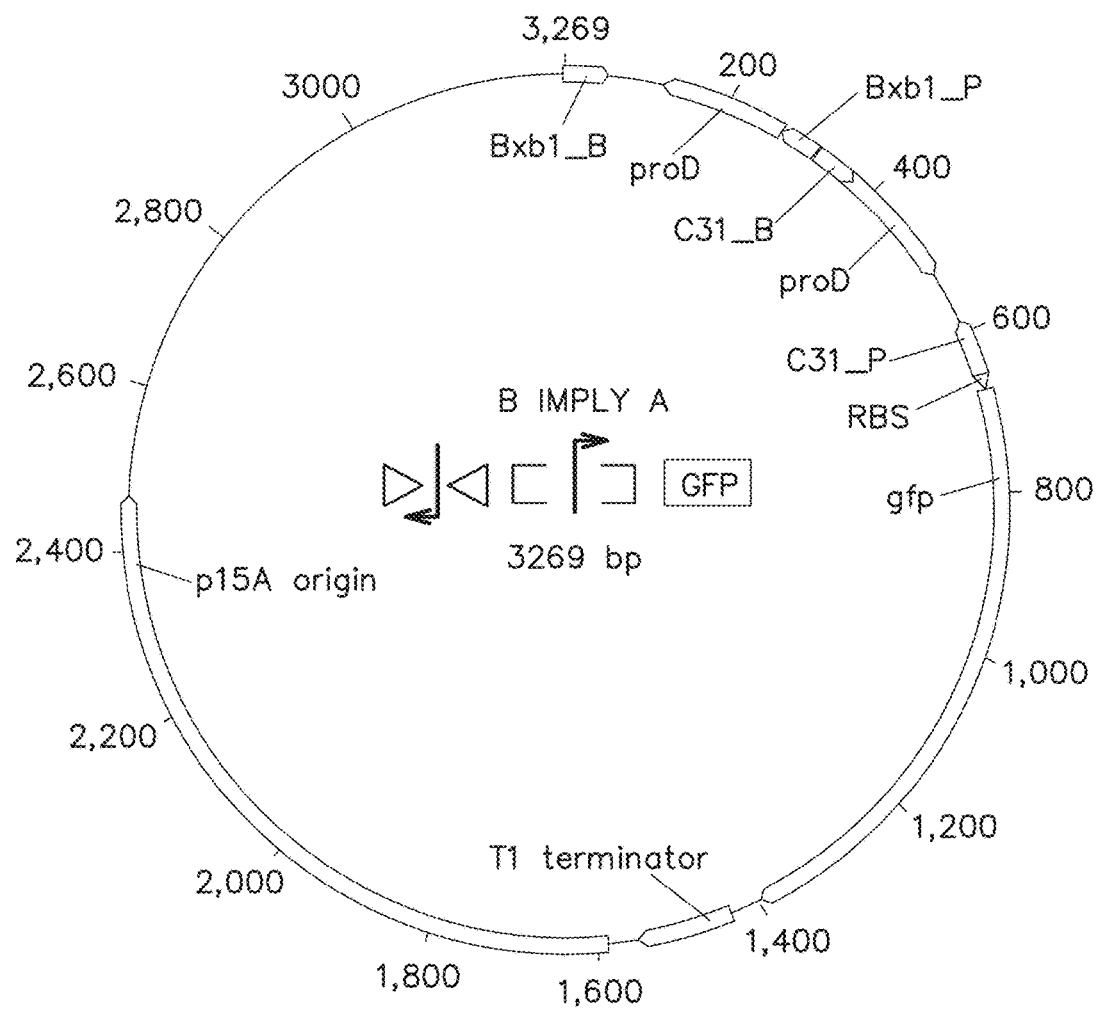
FIG. 18 shows a plasmid map of a B IMPLY A logic gate of the invention.
Figure 19:
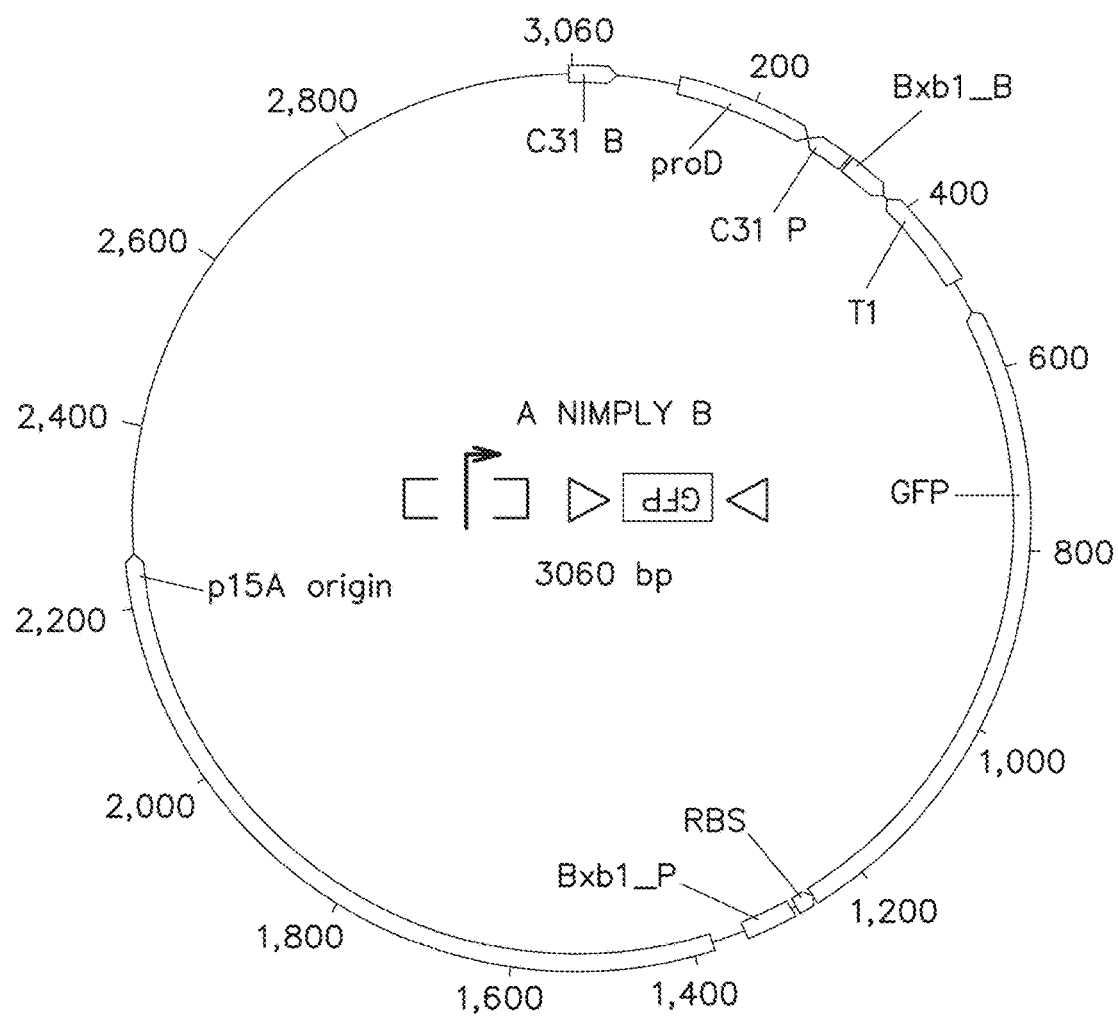
FIG. 19 shows a plasmid map of an A NIMPLY B logic gate of the invention.
Figure 20:
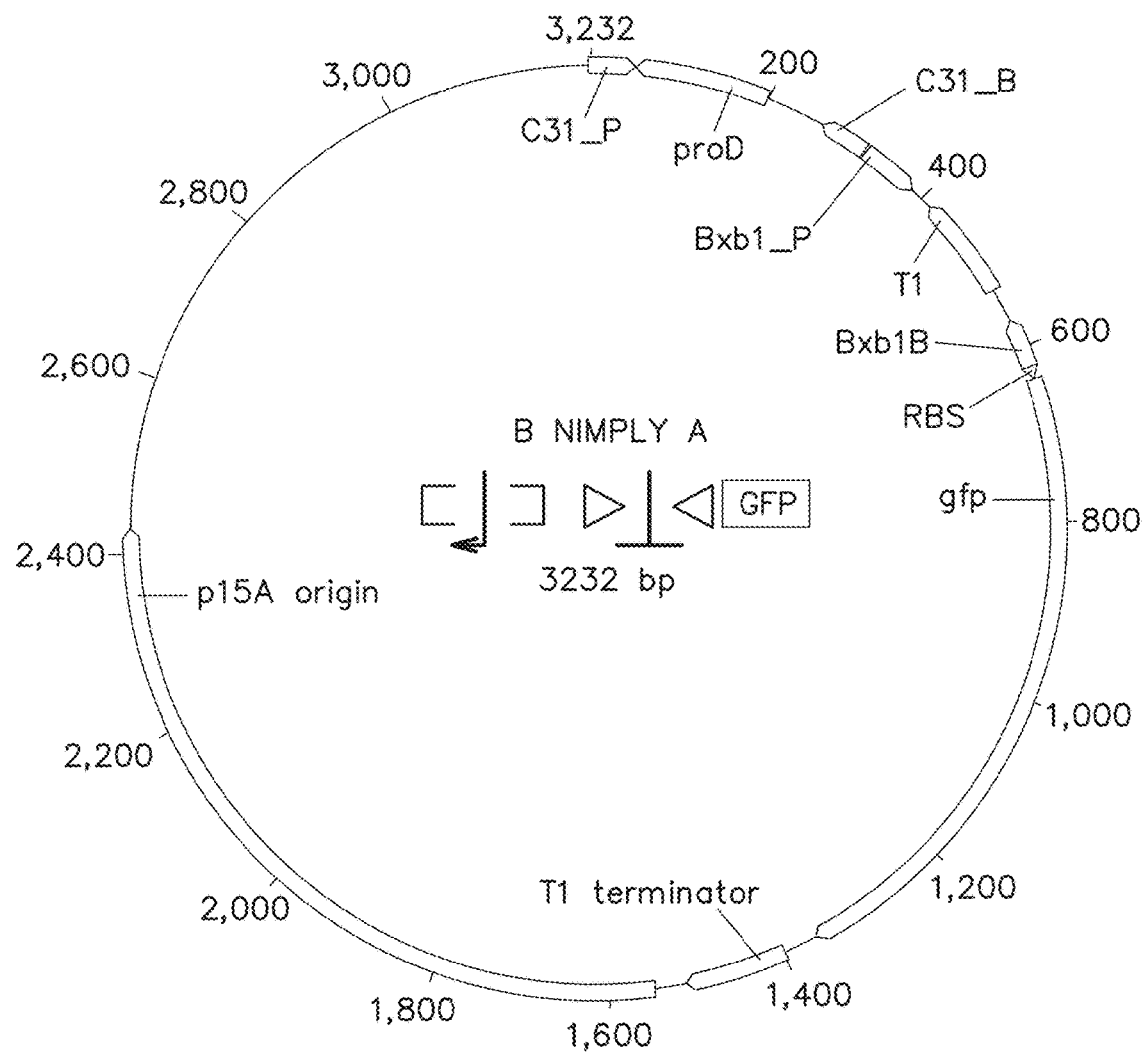
FIG. 20 shows a plasmid map of a B NIMPLY A logic gate of the invention.
Figure 21:
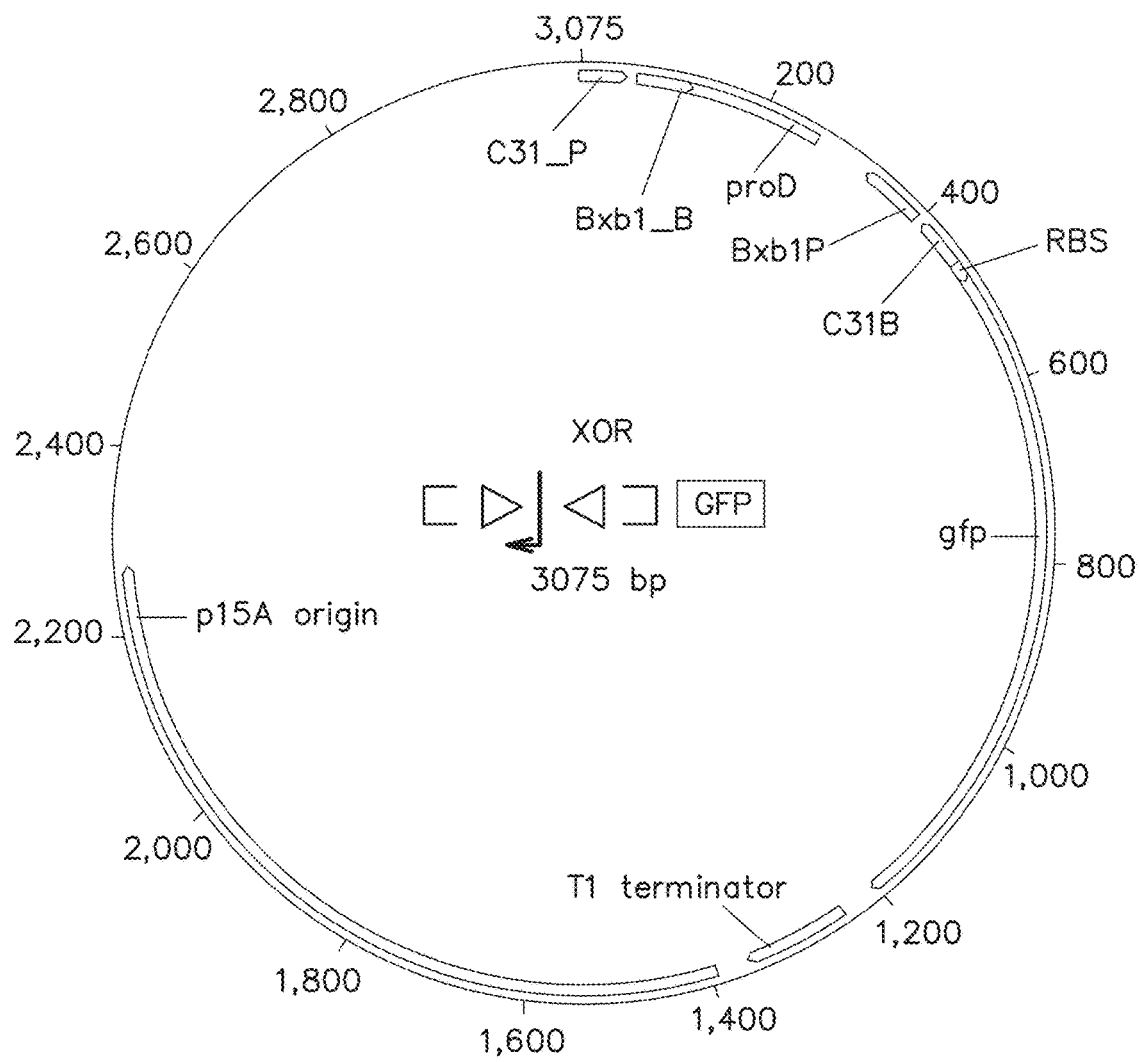
FIG. 21 shows a plasmid map of an XOR logic gate of the invention.
Figure 22:
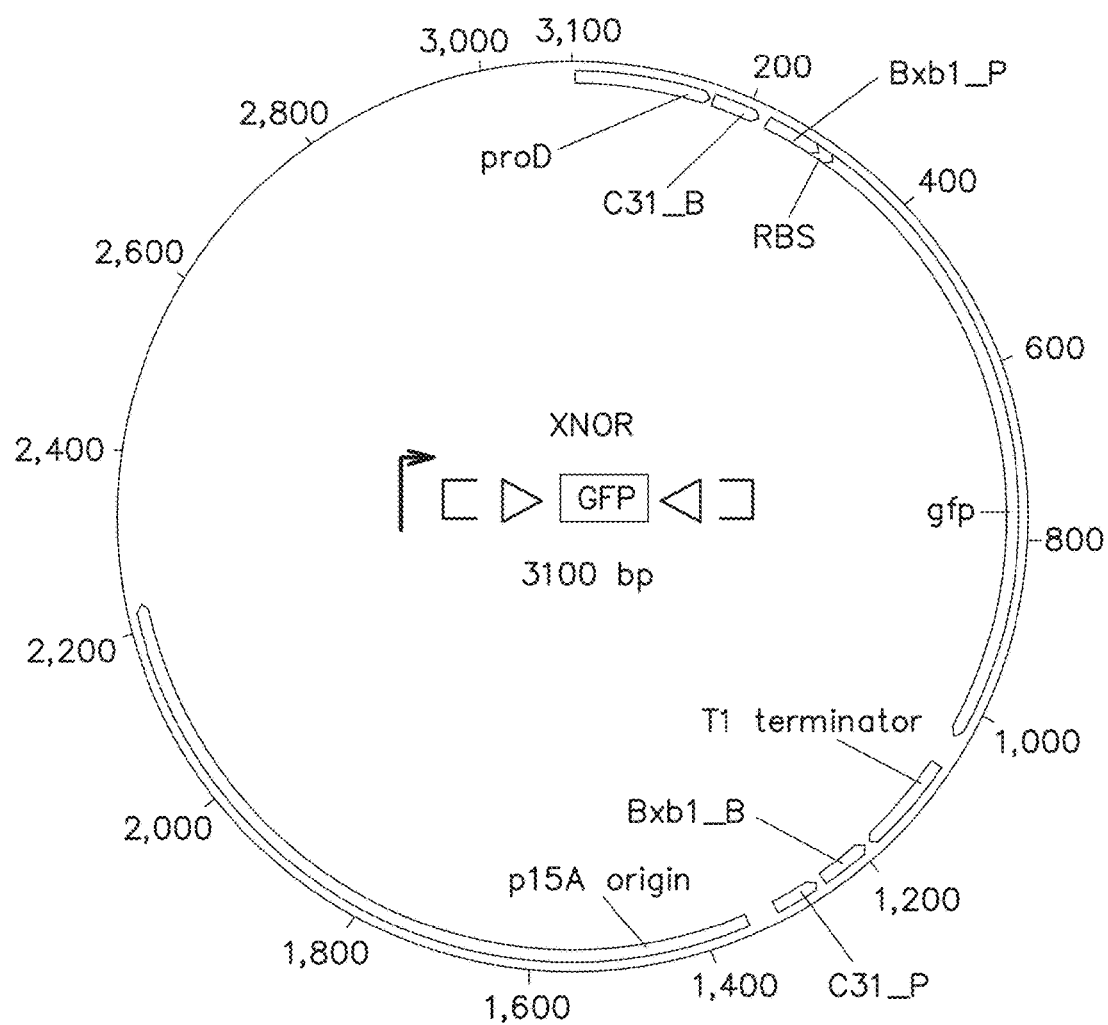
FIG. 22 shows a plasmid map of an XNOR logic gate of the invention.
Figure 23:
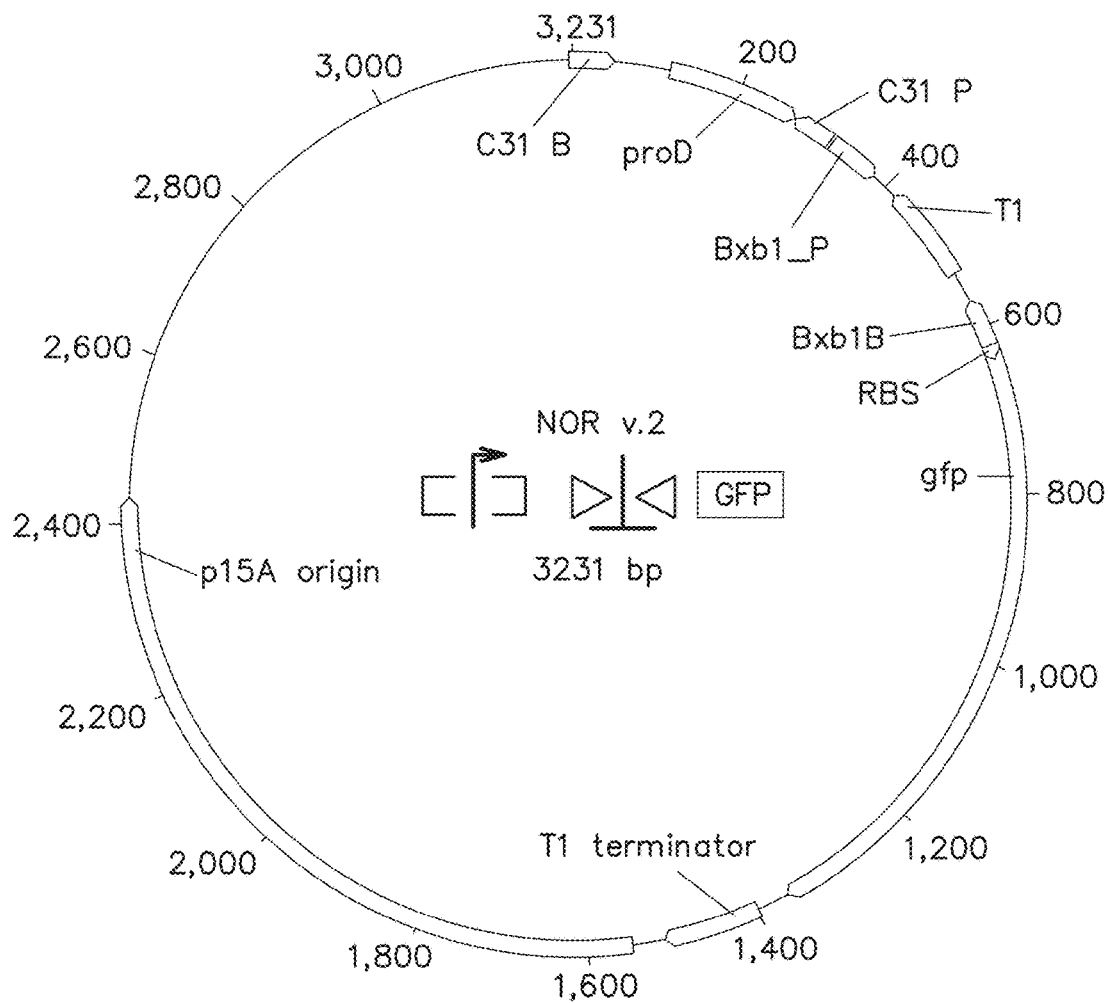
FIG. 23 shows a plasmid map of a NOR v.2 (version 2) logic gate of the invention.
Figure 24:
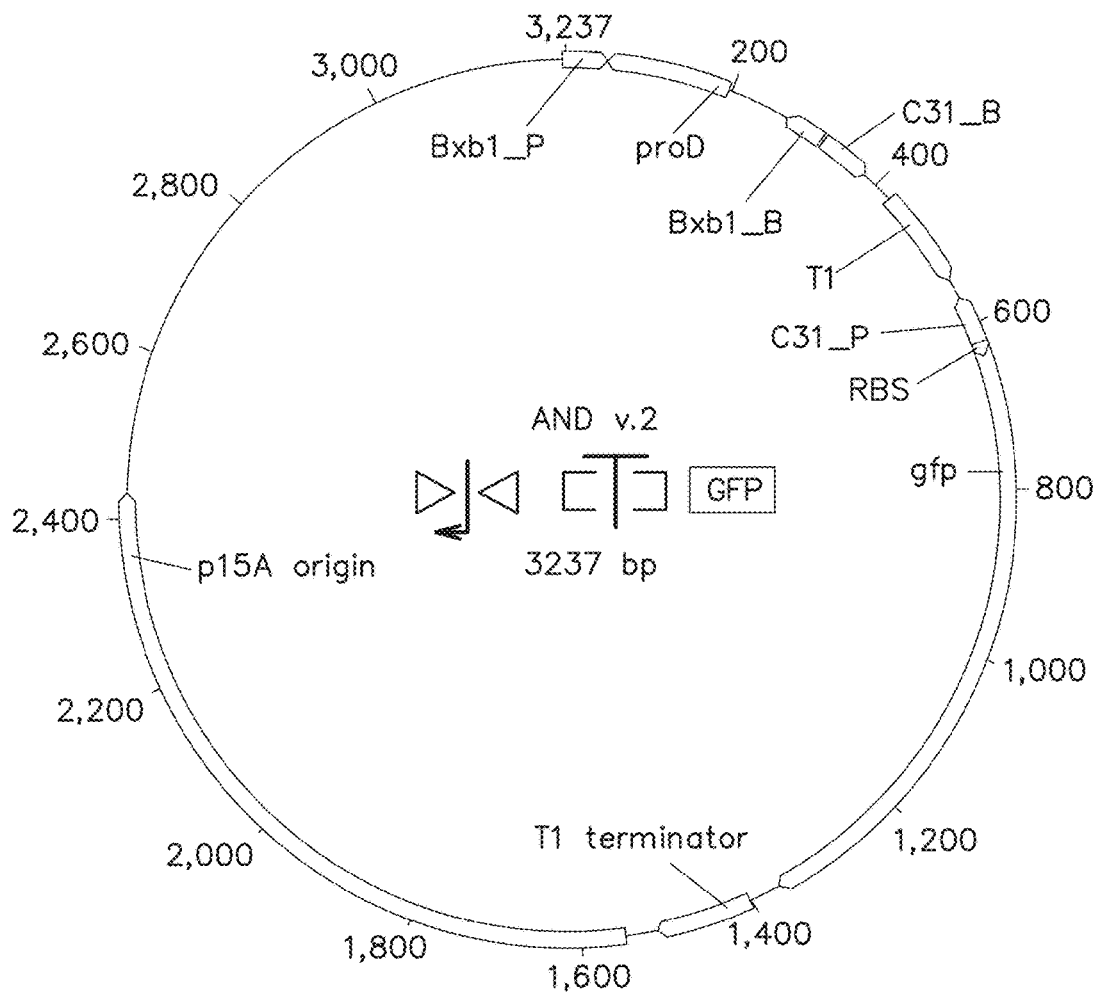
FIG. 24 shows a plasmid map of an AND v.2 logic gate of the invention.
Figure 25:
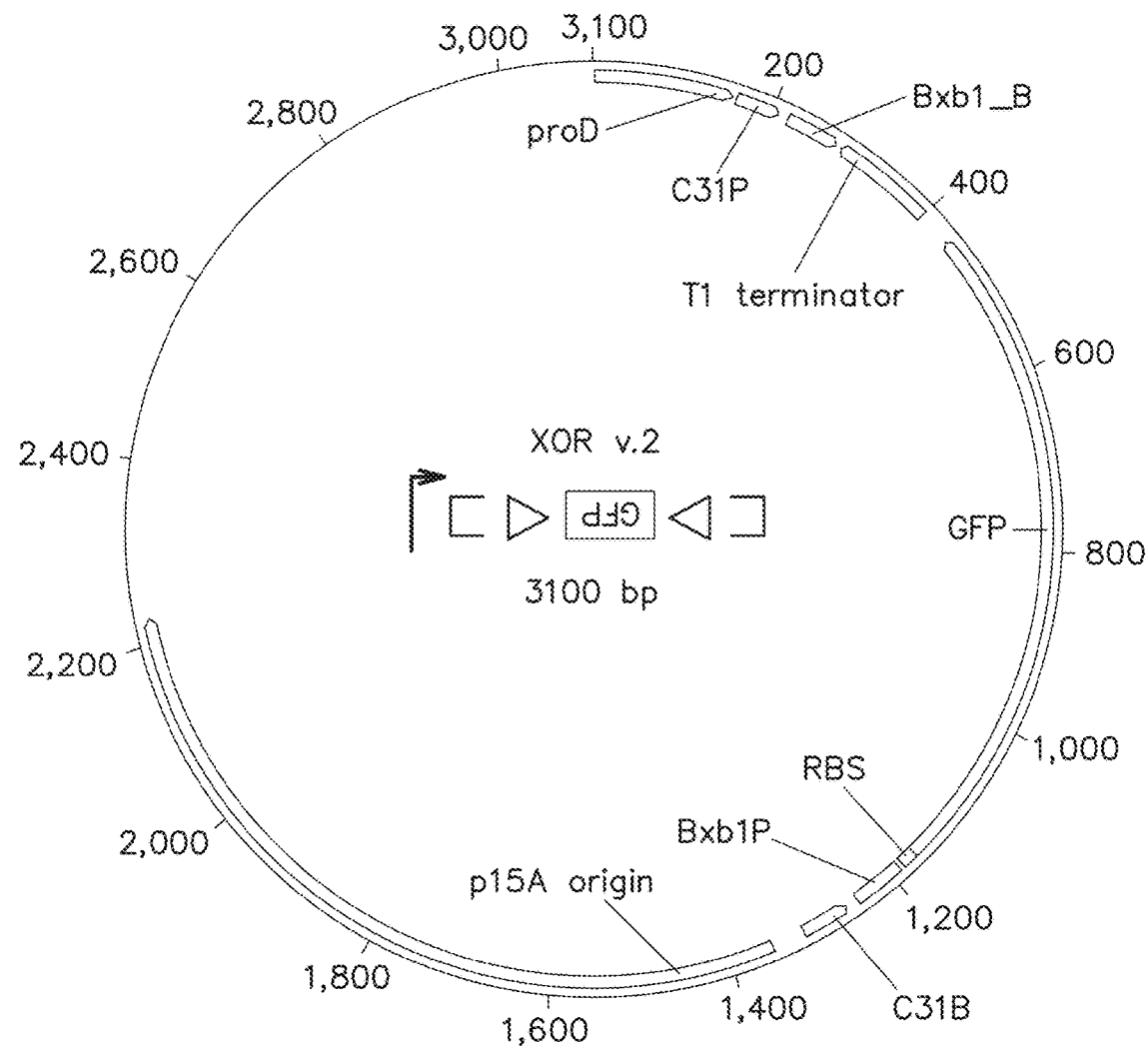
FIG. 25 shows a plasmid map of an XOR v.2 logic gate of the invention.

A key feature of this computational paradigm is that these logic gates maintain stable output memory after inputs are withdrawn. This was demonstrated by allowing an AND gate to be induced to its ON state with both inputs and then repeatedly sub-diluting and growing these cells for 9 days (>90 generations) without the inputs present (FIG. 4B). This circuit maintained a high output throughout the entire post-induction period. This property will enable the creation of complex, state-dependent synthetic circuits. Furthermore, unlike transcriptional or post-transcriptional logic, the state of the computations can be detected using PCR even after cell death (FIG. 4B). This feature may be used to create cellular biosensors whose states can be interrogated in a multiplexed fashion using high-throughput sequencing techniques.

Figure 26A:
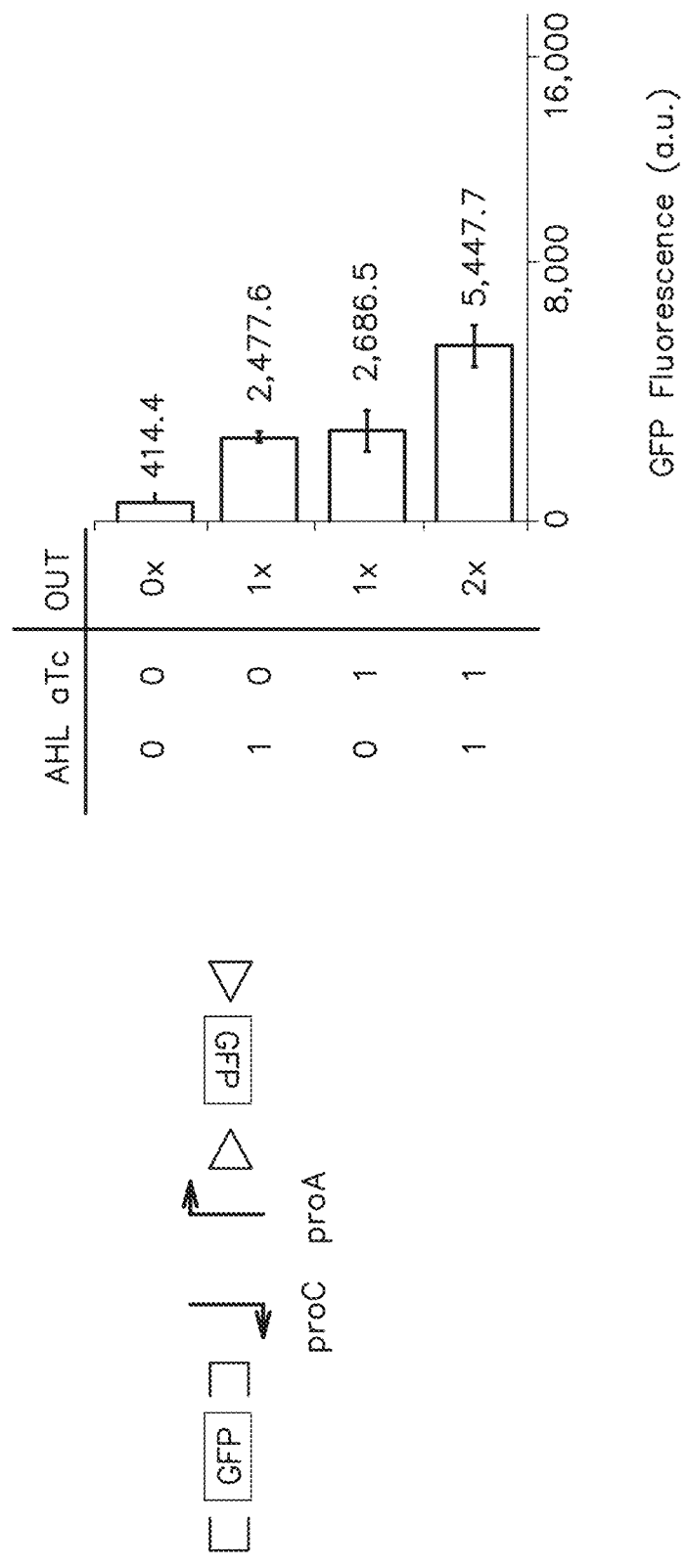
FIG. 26A shows a schematic (left) of a logic gate containing inverted Promoter C (proC) and Promoter A (proA) used to implement a digital-to-analog converter and an accompanying graph (right) of GFP expression output. Cells were exposed to no inputs, AHL only, aTc only, or AHL and aTc simultaneously. Non-normalized mean expression levels are given to the right of each bar in arbitrary units (a.u.) of fluorescence, and normalized expression levels are listed under OUT, where they are rounded to the nearest integer and 1× corresponds to ~2700 a.u.
Figure 26B:
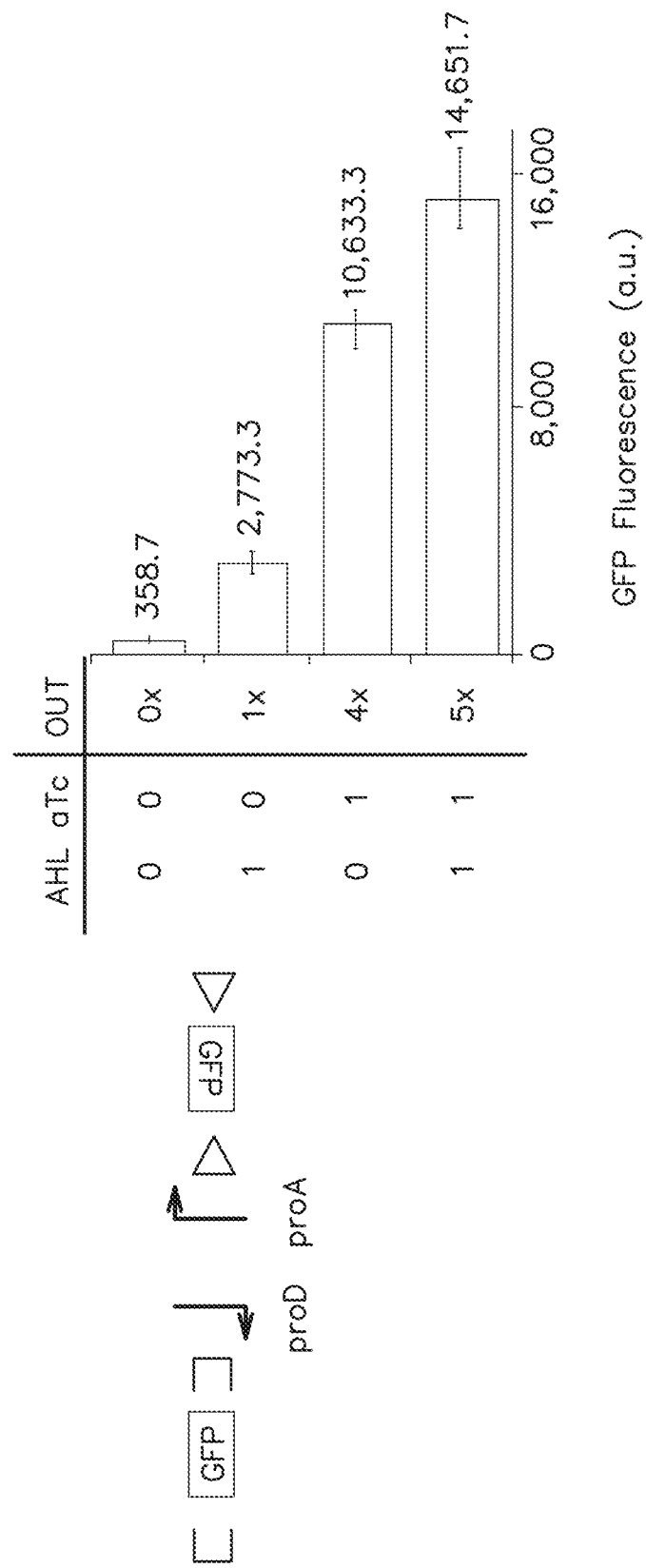
FIG. 26B shows a schematic (left) of a logic gate containing inverted Promoter D (proD) and Promoter A (proA) used to implement a digital-to-analog converter and an accompanying graph (right) of GFP expression output. Cells were exposed to no inputs, AHL only, aTc only, or AHL and aTc simultaneously. Non-normalized mean expression levels are given to the right of each bar in arbitrary units (a.u.) of fluorescence, and normalized expression levels are listed under OUT, where they are rounded to the nearest integer and 1× corresponds to ~2700 a.u.
Figure 26C:
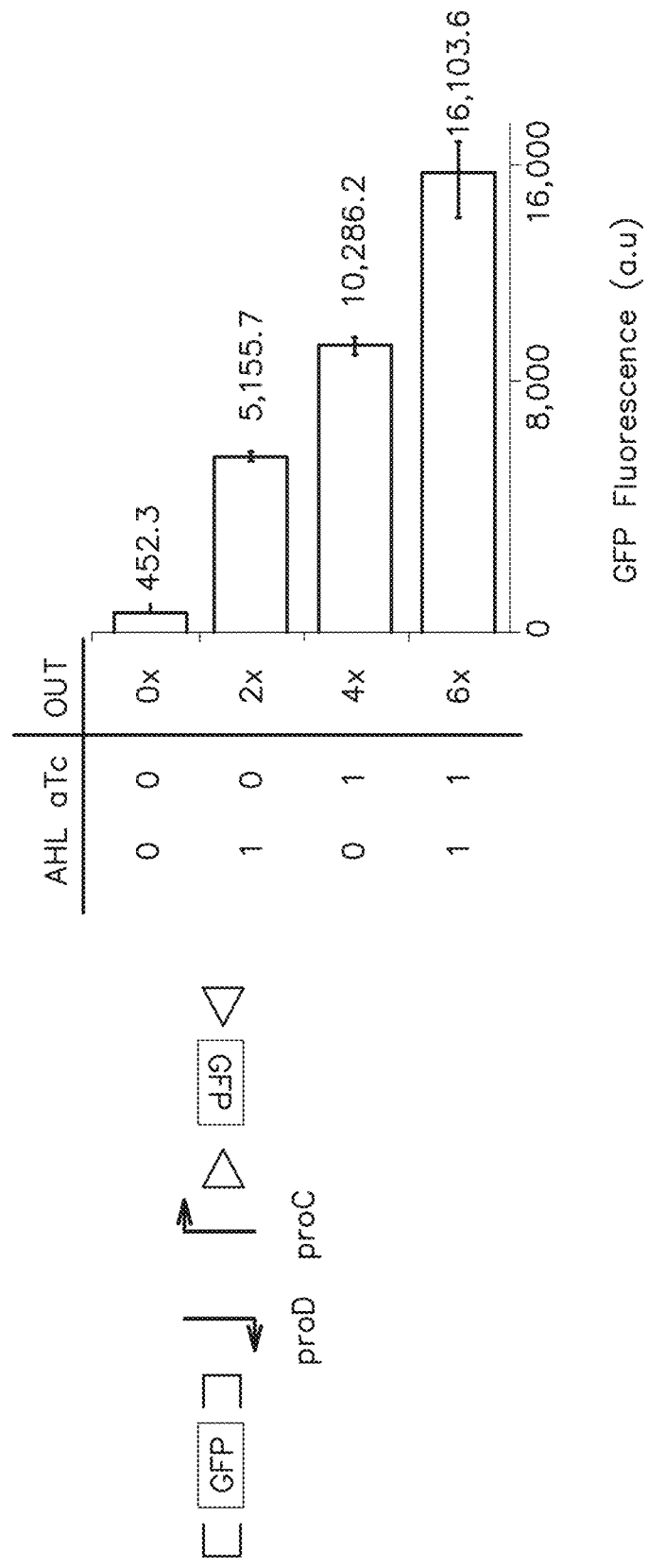
FIG. 26C shows a schematic (left) of a logic gate containing inverted Promoter D (proD) and Promoter C (proC) used to implement a digital-to-analog converter and an accompanying graph (right) of GFP expression output. Cells were exposed to no inputs, AHL only, aTc only, or AHL and aTc simultaneously. Non-normalized mean expression levels are given to the right of each bar in arbitrary units (a.u.) of fluorescence, and normalized expression levels are listed under OUT, where they are rounded to the nearest integer and 1× corresponds to ~2700 a.u.
Figure 27:
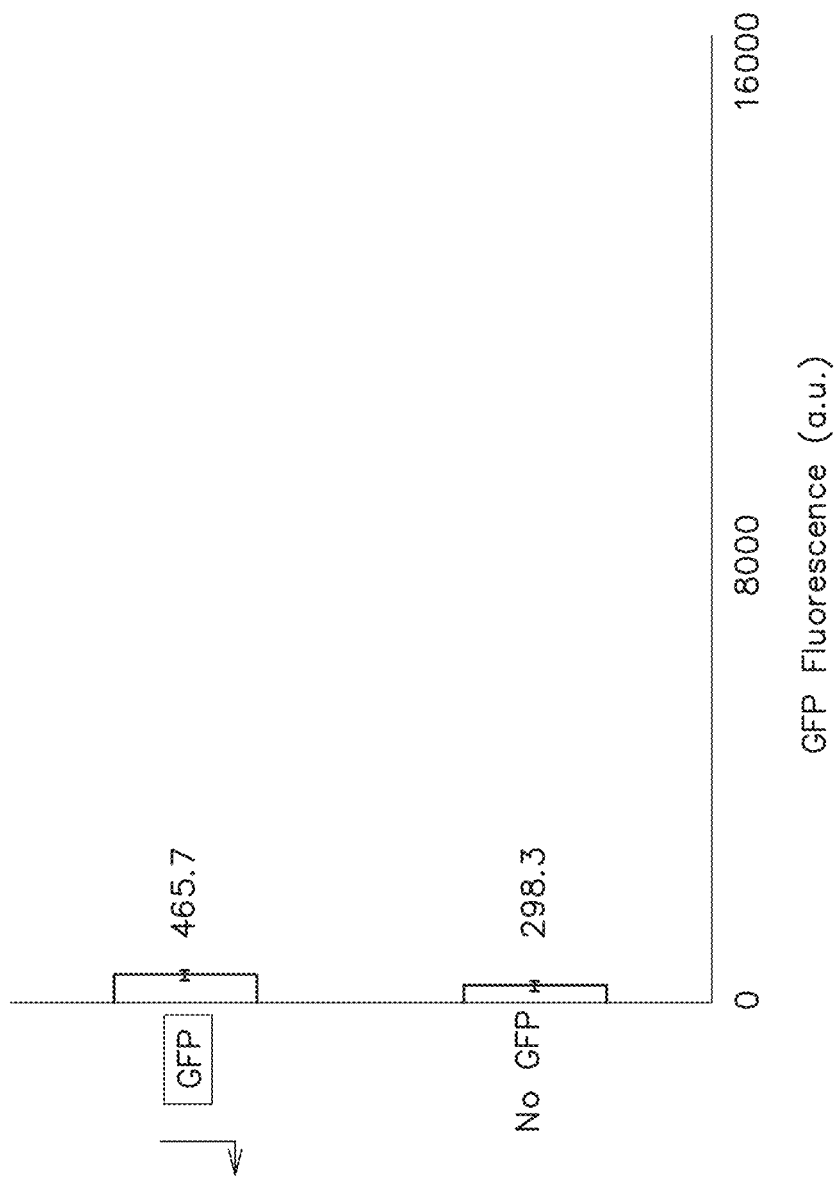
FIG. 27 shows a graph of GFP fluorescence of control constructs for digital-to-analog converters. *E. coli* cells containing gfp with an inverted promoter (proD) and *E. coli* cells containing no gfp exhibit analog output gene expression levels comparable to the Ox outputs in FIGS. 26A-26C in the absence of both inputs (when AHL and aTc inputs are both '0')
Figure 28:
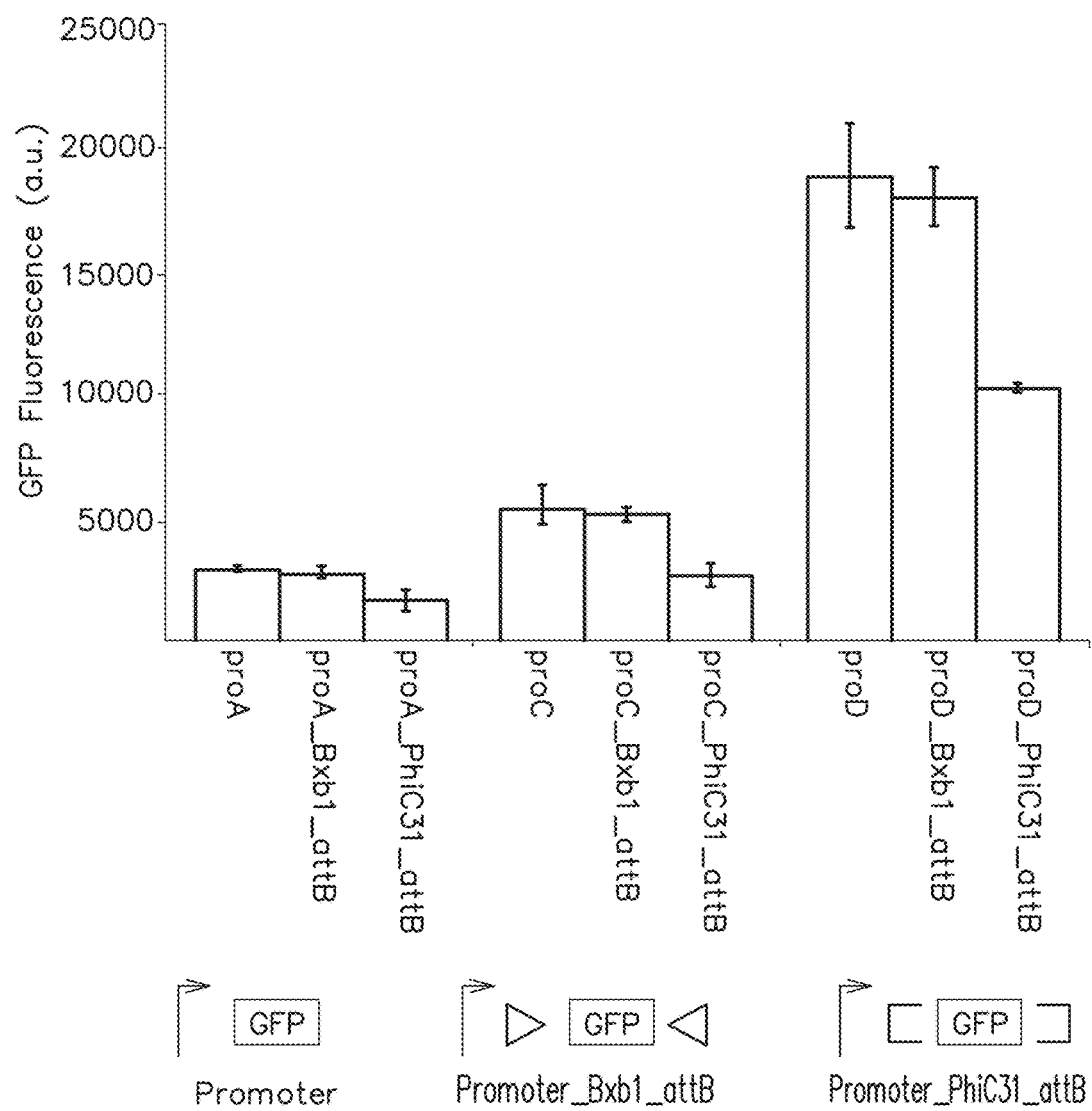
FIG. 28 shows graphs of GFP fluorescence characterized by flow cytometry after gating by forward and reverse scatter to test the effects of variant promoters and recombinase recognition sites on gfp expression. Measurements of fluorescence values are based on geometric means from three independent experiments and the error bars represent standard errors of the mean.
Figure 29:
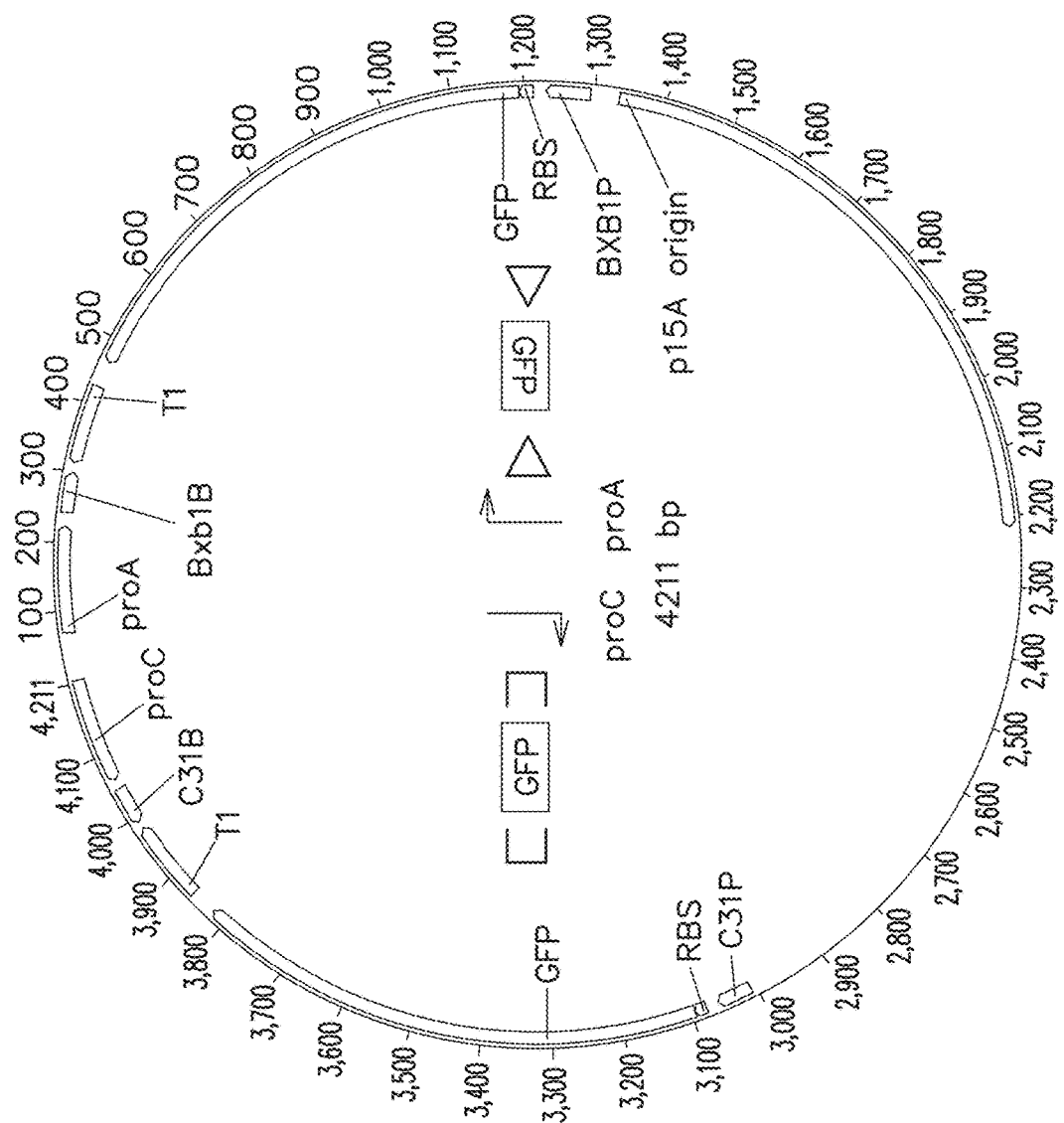
FIG. 29 shows a plasmid map of logic gate of the invention.
Figure 30:
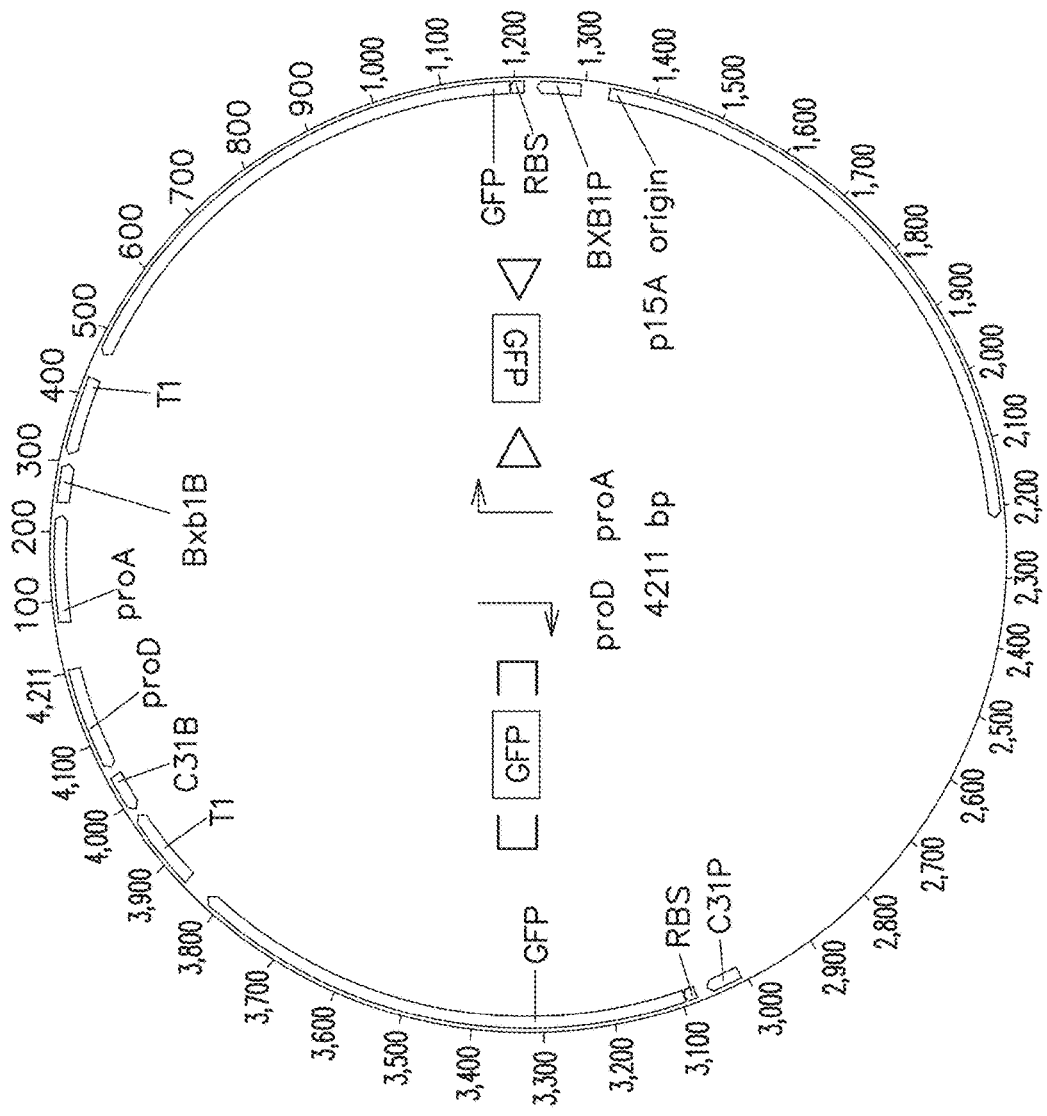
FIG. 30 shows a plasmid map of logic gate of the invention.
Figure 31:
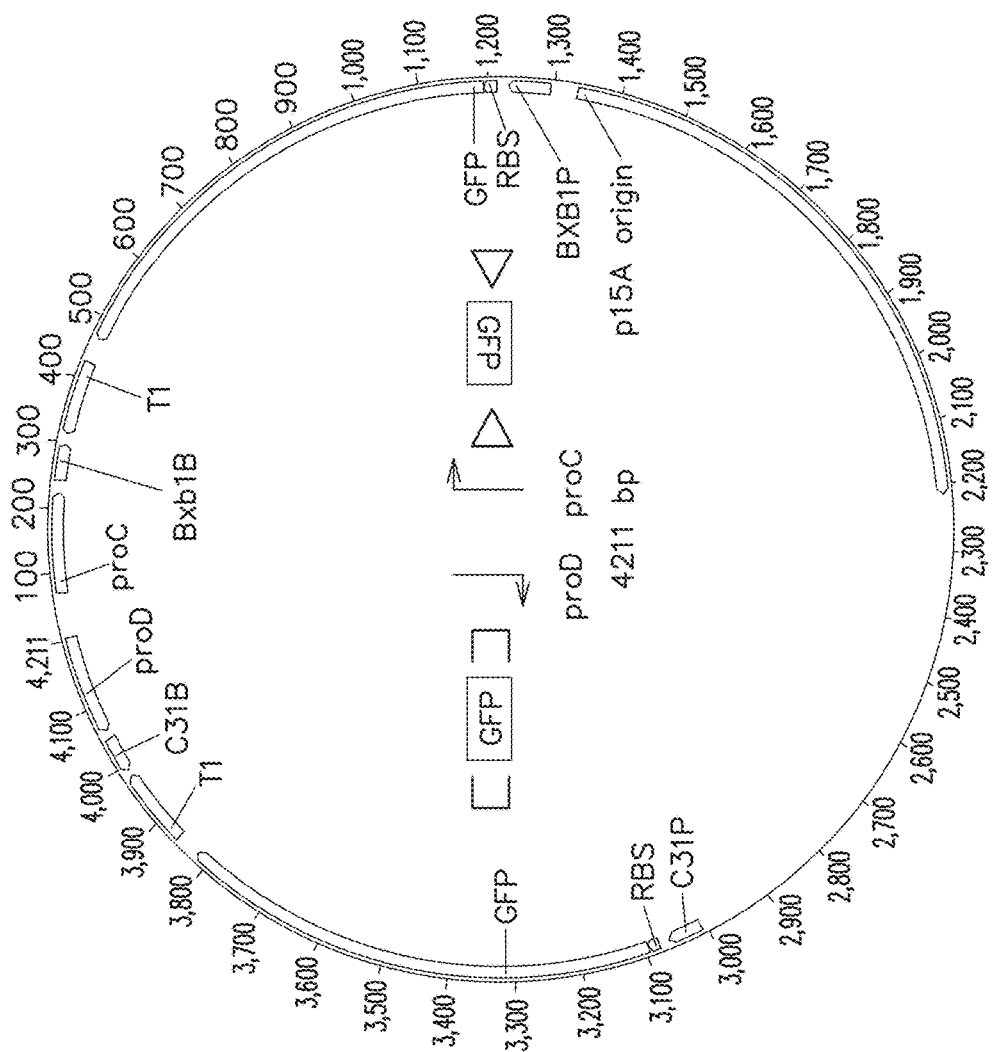
FIG. 31 shows a plasmid map of logic gate of the invention.

One of the main goals of synthetic biology is to use synthetic gene circuits to develop higher-order networks with programmable functionality [43]. To demonstrate the ability to achieve this goal, digital-to-analog converters, which translate digital inducer inputs into stable analog gene expression outputs, were built [44]. These digital-to-analog converter circuits accept two digital inducer inputs (AHL and aTc) and produce four stable analog gene expression output levels based on recombinase invertible toggling of gene expression from constitutive promoters with different strengths (FIGS. 26A-26C). Three constitutive promoters (proA, proC, and proD[31]) were used to build three distinct digital-to-analog converters with different digitally settable (programmable) levels. The relative strengths of the variant promoters with downstream Bxb1 and phiC31 recombinase-recognition sites were determined by assaying GFP fluorescence by flow cytometry (FIG. 27). These results showed that the phiC31 attB site reduced GFP expression from all promoters compared with the Bxb1 attB site or no intervening recombinase-recognition site.

Each digital-to-analog circuit contains a pair of these variant constitutive promoters, each of which drives the expression of GFP only after inducible recombinase-mediated inversion. The total GFP output of the circuit when exposed to both inputs is about equal to the GFP level when only AHL is present plus the GFP level when only aTc is present (FIGS. 26A-26C). When the individual analog output levels of each recombinase-invertible gfp expression cassette were designed to vary by two-fold with each other, the digital-to-analog circuit output was determined by the inputs based on a simple binary code. For example, in FIG. 26C, the digital AHL input can be represented as the least-significant bit and the digital aTc input can be represented as the most-significant bit in a binary integer that is scaled to yield the ultimate analog gene expression output.

In biotechnology processes, constitutive promoters are useful for stable gene expression but are not typically able to dynamically tune gene expression levels or induce gene expression at defined time points [45]. By contrast, inducible promoters provide adjustable gene expression but rely on inducers that can be expensive or difficult to scale into higher volumes [45]. Digital-to-analog converters in accordance with the invention provide an advantageous compromise between constitutive and inducible promoters and can be extended to enable the scalable programming of $2^n$ constitutive output expression levels by the application of n input inducers. Cells containing these circuits only need to be induced transiently to lock them into a defined constitutive level of expression, thus mitigating issues associated with inducer scalability. Digital-to-analog circuits of the invention are also useful for multiplexed reporting of digital events with a single analog output. For example, as shown in FIG. 26C, distinct analog expression levels can be uniquely mapped back to their digital input combinations by a simple binary code.

In summary, the invention provides an efficient platform for integrated logic and memory within single cells. This modular DNA assembly strategy enables straightforward plug-and-play encoding of logic functions with concomitant memory arising from the ability of recombinases to "write" information in DNA. Because unidirectional recombinases are used, the logic gates of the invention maintain memory of their inputs over time and are not solely conditional on their inputs at a given time. This property enables the construction of biological state machines that implement sequential logic and stable cellular states.

Example 2. Integrated Logic and Memory in *Saccharomyces cerevisiae*

Figure 32:
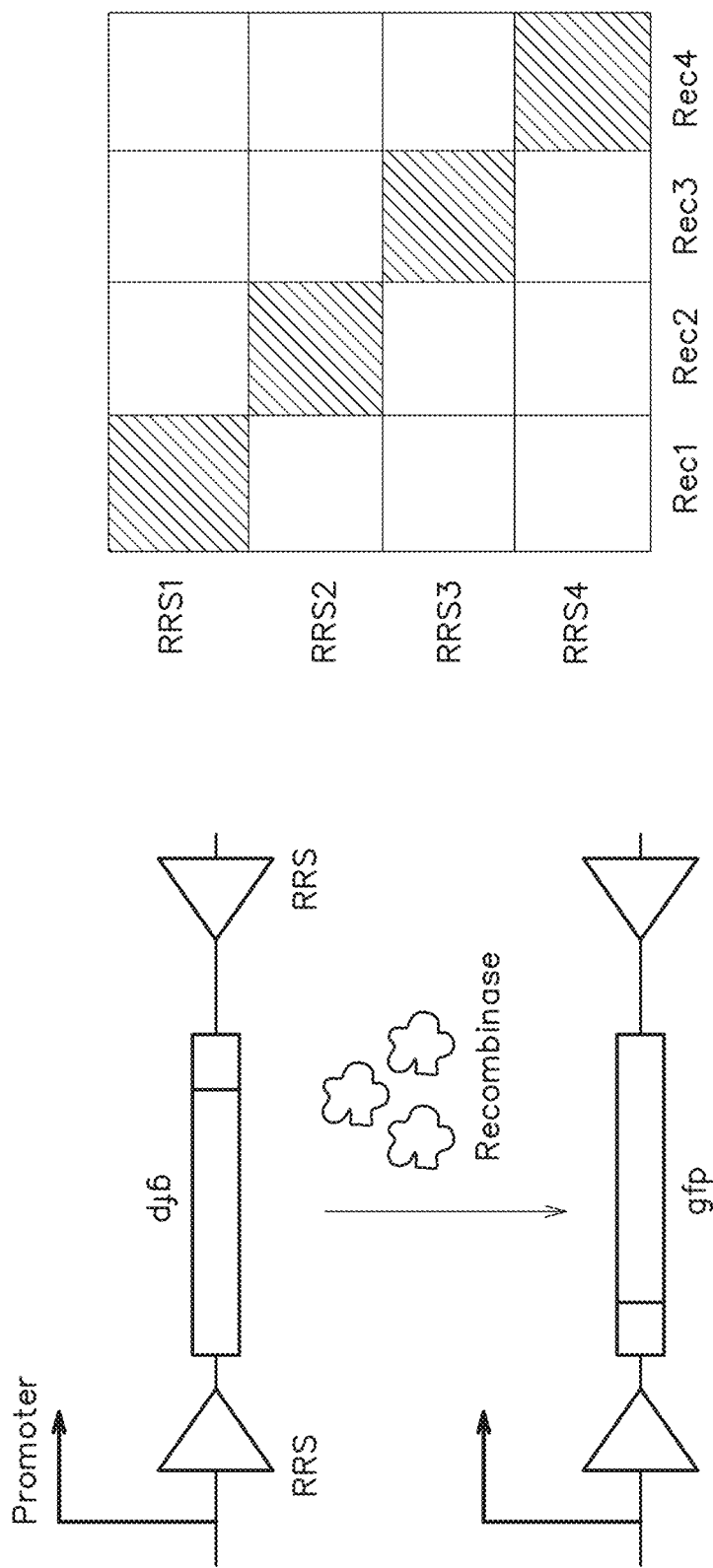
FIG. 32 shows one example of a scheme for characterizing recombinase orthogonality with respect to recombinase recognition sites (RRSs)
Figure 33:
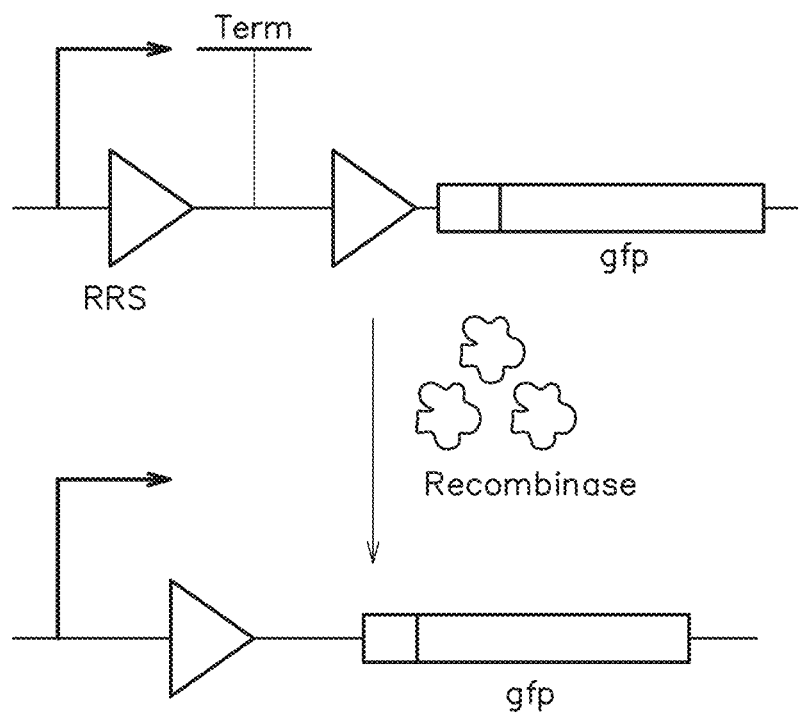
FIG. 33 shows one example of a scheme for testing excision efficiency and orthogonality of recombinases.

Recombinases are placed under the control of inducible promoters in *S. cerevisiae*, including, e.g., those that can be controlled by aTc, IPTG, copper and galactose. Recombinases used include phiC31, Bxb1, TP901-1, A118 and U15353. Recombinase activity is tested with reporter constructs containing a promoter (e.g., pCYC1, pADH1, pPGK1) and a downstream inverted gene, such as yeast-enhanced gfp (yEGFP), which is positioned between a pair of inverted recombinase recognition sites (RRSs) (FIG. 32, left). Upon gene inversion due to the recognition of RRSs by cognate recombinases, yEGFP is expressed. Recombinase efficiency is monitored over time with flow cytometry and the measurements confirmed with PCR (e.g., using specific primers that only amplify when the gene is initially inverted as well as primers that only amplify after the gene is flipped) and DNA sequencing. Recombinase inversion efficiencies may be greater than 90% [46]. Recombinase orthogonality with respect to each other's RRSs is characterized by crossing all recombinases with all reporter constructs (FIG. 32, right). These recombinases are typically highly specific, given the sequence differences between their RRSs. In addition to inversion, the excision efficiency and orthogonality of the recombinases are tested. A terminator is placed between a constitutive promoter and a downstream yegfp gene (FIG. 33). This terminator is placed between two RRSs oriented in the same direction, thus leading to excision. Examples of yeast terminators include, without limitation, the CYC1 and ADH1 terminators. After validating the inversion/excision activity and orthogonality of recombinases, integrated logic and memory circuits are constructed. Logic gates such as AND, OR, NAND, NOR, XOR, and XNOR are built using strategies similar to those depicted in FIG. 2. This is accomplished by placing recombinases under independent inducible control and targeting circuits that contain different invertible or excisable combinations of promoters, terminators and genes. The behavior of these circuits is characterized based on fluorescence outputs with different combinations of inducer inputs using flow cytometry.

Synthetic cassettes containing recombinases, promoters and reporters are integrated into genomic loci, including HIS3, TRP1, LEU2, URA3, and HO [47,48] that have been identified as suitable targets for heterologous gene expression. In some instances, where integration of synthetic components poses a challenge, insulator elements are introduced into the constructs [49] or yeast artificial chromosomes (YACs) are used.

For recombinases that are not efficient in *S. cerevisiae* (e.g., due to temperature or other factors), the genes are codon-optimized and directed evolution is performed to identify recombinase mutants with elevated activity. Recombinase expression can also be tuned, in some instances, by adding degradation tags to the recombinases [50], tuning synthetic upstream open reading frames [51], modifying 5'UTR sequences [52], or mutagenizing promoters [53] to minimize issues with unwanted activity from leakage and poor degradation.

Example 3. Computational Algorithms for Automated Design of Biological State Machines Recombinase-based circuits for integrated logic and memory can be described by straightforward design rules. For example, when RRSs do not overlap one another and the genetic construct has a straightforward [promoter(s)]-[terminator(s)]-[output] structure (FIG. 1), then gene expression can only occur when: (at least one upstream promoter is upright) AND (no terminators are upright) AND (the output gene is upright). With more complex genetic constructs, such as those with overlapping RRSs, the complexity of the potential permutations increases very rapidly but can still be decomposed into distinct state transitions through simple rules, e.g., recombinase expression leads to inversion of DNA between a pair of inverted RRSs and excision of DNA between a pair of RRSs oriented in the same direction.

To address the bottleneck of design, computational algorithms that can directly convert a desired state diagram (e.g., the HSC differentiation network, FIG. 37) into biological implementations with synthetic parts (FIG. 34) are created and implemented in, for example, Matlab. The basic software framework is described below.

The software program provides a state-diagram-to-circuit design process that minimizes the input required for a researcher to develop a state-dependent system wherein a given number of genes are active in a specific pattern or sequence of events. Algorithms are validated by creating constructs to match differentiation diagrams where outputs are defined by gene expression at each node. To do so, the software applies a specific set of parts, such as serine recombinases (e.g., focusing on unidirectional recombinases for simplicity) and RRSs, promoters, terminators, and gene modules. Nodes in the differentiation network are states with specific configurations of these parts to yield the desired gene expression output at each state. These states are linked through recombinase logic, such that a single inversion or excision event causes a transition between states.

Figures 1, 34:
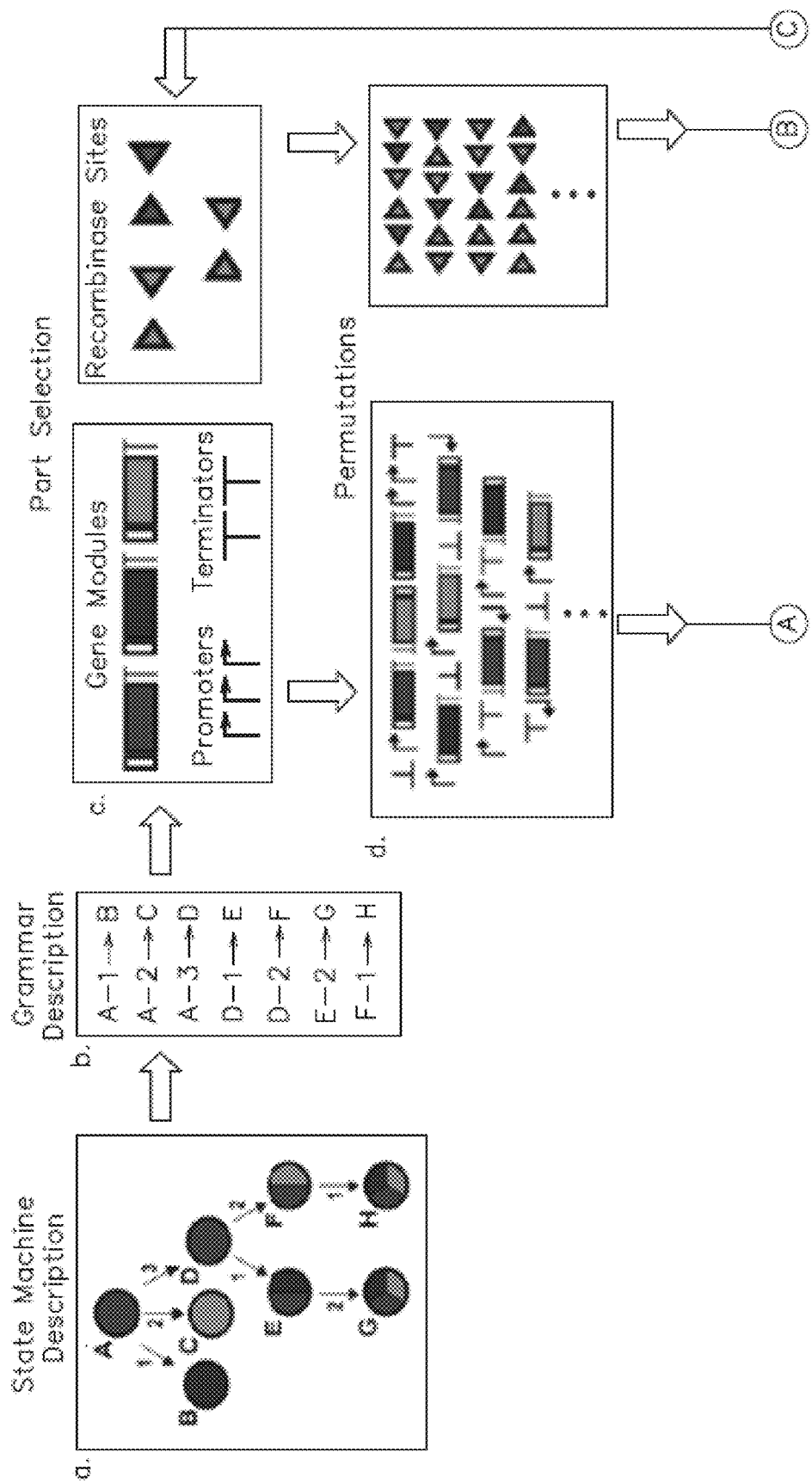
FIG. 34 shows one example of an outline of automated design algorithms for biological state machines.
Figures 2, 34:
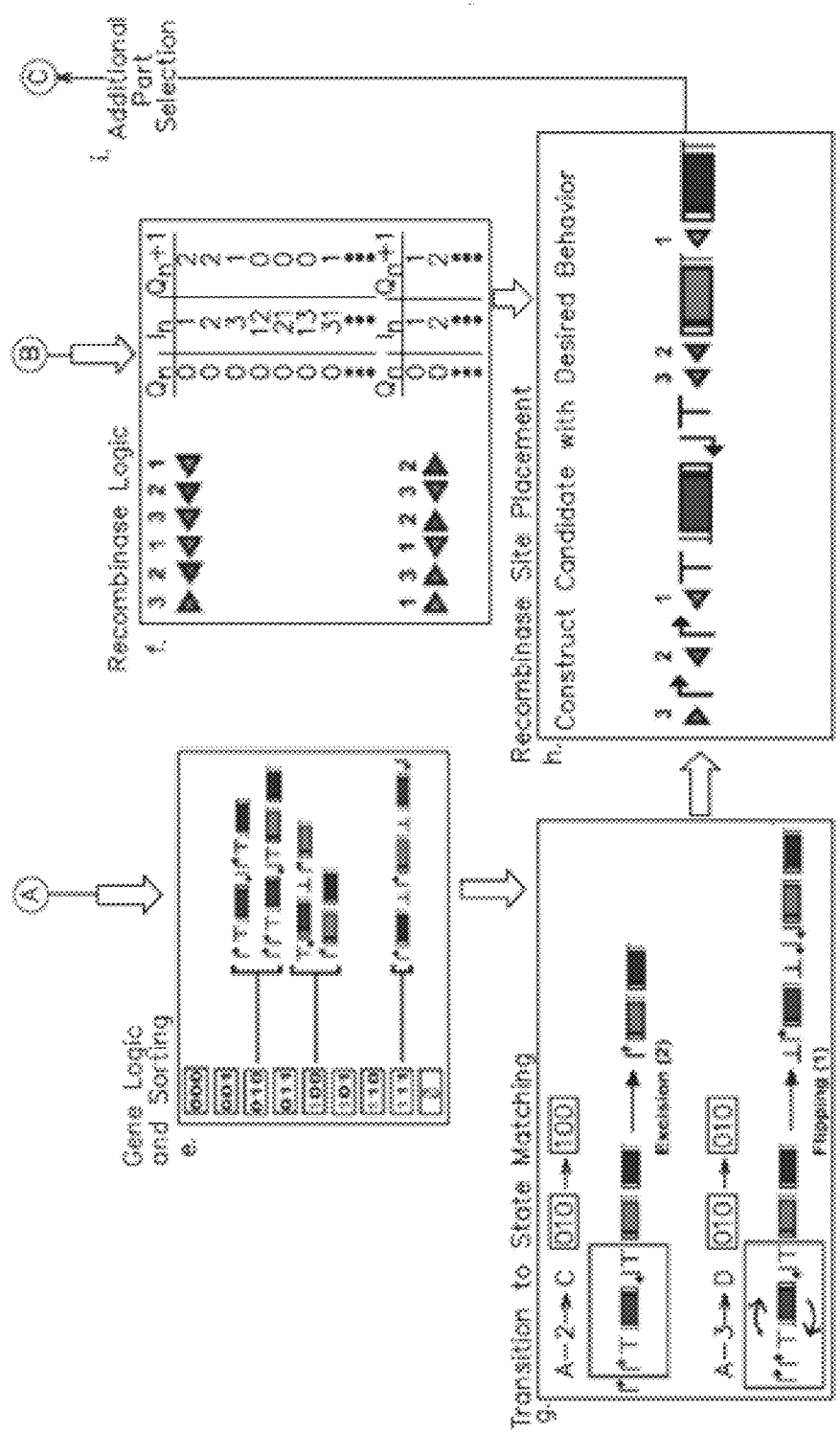

FIG. 34 depicts a non-limiting example of a general outline for an algorithm of the invention. The user designs a state diagram of interest that behaves in a complex, conditional manner (FIG. 34A). In the example of the differentiation network shown, an input of '1' always results in the added expression of the blue gene to the current set of outputs, while an input of '2' adds the expression of the green gene. Finally, if '3' is the first input, then the original red gene is preserved. Otherwise, the original red gene is switched off, as can be seen in states B and C (FIG. 34A). This behavior directly results from how the user drew the states, their corresponding outputs and the transitions that link them. Numerous other state machines and design architectures are contemplated herein. One can define nodes where multiple genes are active at the same time (states E-H), or where two nodes have the same output yet a distinct state (states A and D), or where all expression at a node is turned off. The provided example utilizes a network for which the full possible set of inputs (e.g., all possible permutations of inputs 1, 2 and 3) is not drawn. An initial input of '1' or '2' prevents any further inputs from being delivered productively to the system. The user can also define trees where not all possible transitions produce a new output (though technically a new DNA state may be generated).

Once the user has plotted out the desired state machine diagram, the next step is to translate the resultant diagram into a grammar (FIG. 34B). The grammar description is a listing of all transitions in the network, such that each entry contains the input at that transition, the state where the transition originates, the state where it terminates, and the outputs of both of these states.

Applying the grammar, the program assesses the minimal collection of parts required to achieve the provided network behavior (FIG. 34C). The number of gene modules initialized into the program is chosen according to the unique set of total outputs in the network, while the number of regulatory elements is determined by the maximum number of genes expressed simultaneously for all outputs within the network. In parallel, the program will determine how many recombinases are required based upon the number of unique inputs designated by the user.

With the parts selected, the program computes all relevant permutations of the gene expression components and of the recombinase sites separately (FIG. 34D). This reduces the computational burden of the algorithm and also allows for an uncoupled assessment of the underlying logic of the gene regulatory and recombination elements. For both the gene regulatory parts and the recombinase sites, the program accounts for two possible orientations for each component when computing the combinations, depending on the strand of DNA on which that component resides relative to the others. To reduce the computational demand further, the determination of the recombinase combinations can be performed by assuming, at least to a first approximation, that the recombinase sites are interchangeable.

The program evaluates the fundamental logic of each generated combination. In the case of analyzing gene expression, the program evaluates the location of every gene module in each construct and assesses whether it is active based on the relative orientation and location of gene regulatory elements. Constructs with the same gene outputs are then grouped together (FIG. 34E). To enhance this further, a scoring approach can be implemented, which analyzes each construct for biological feasibility. Once the gene regulatory constructs have been placed into bins corresponding to gene outputs, the program traverses the entire differentiation diagram by looking at each transition in turn and computing whether candidates in the bins that correspond to the outputs for the start and end state of that transition are separated by a single recombination event. As candidates are processed for each transition, those that do not meet the requirements of that transition are discarded, allowing for constructs that match the entire network to eventually emerge.

In the case of the RRSs, the logic computation involves the creation of tables that track the current state, $Q_n$, of a combination of RRSs and the resultant state $Q_{n+1}$, after the entire set of all combinations of possible unique inputs, I (FIG. 34F). The latter accounts for the unique conditional nature of the nested sites—for example, an input of $1 \rightarrow 2$ may result in a different orientation of RRSs than the same inputs in the reverse order (e.g., $2 \rightarrow 1$) if the RRSs are nested within each other. Thus, for a system with only two recombinase inputs, the full set of possible inputs would be $I=[1,2,1 \rightarrow 2,2 \rightarrow 1]$.

Finally, the collection of constructs that yield the proper gene expression profiles and information about the recombinase logic that matches all inputs are combined together to produce a full set of circuits that display the same behavior as the desired state diagram, likely with different architectures (FIG. 34H). If there are no productive candidate suggestions that satisfy all of the transitions in the differentiation network, the program will cycle back to the initial part selection stage and sequentially add more gene regulatory parts to enhance the possibility that a successful construct design is discovered.

Ultimately, this algorithm will produce a list of recombinase-based circuits, containing different permutations of RRSs and regulatory parts, which should satisfy a given desired state diagram. The algorithm can be validated through the reverse process. Namely, for each resulting recombinase-based circuit, all possible states are transition through based on different identities and timing of inputs in order to draw the corresponding state diagrams and confirm the algorithm's accuracy.

Due to the rapid increase in circuit complexity that is expected with each additional recombinase and set of RRSs that are available for design, the computation time of the algorithm can scale quickly. To minimize processing time, the algorithm can be parallelized and run on computational clusters, and the code can be optimize using a different language (e.g., C). Furthermore, because larger state diagrams can be often decomposed into combinations of smaller state diagrams, the results of smaller state diagrams may be stored in memory and the results used in future computations to minimize unnecessary recalculations.

Improvements can be made to the core algorithm to enhance its flexibility, power and efficiency. Other recombinase reactions (e.g., integration or bidirectional inversion) can be added or more regulatory element types defined. The tool can be refined to rank-sort designs that maximize computational effectiveness while limiting biological load. Because every state diagram will usually have many potential circuit implementations, the various implementations can be scored based on expected performance. For example, very short DNA sequences are inverted less efficiently than longer sequences due to the effects of DNA stiffness on the DNA looping needed for recombinase activity [54]. Also, different recombinases will likely display different efficiencies which can be incorporated into the scoring criteria with data from, e.g., Example 2.

Example 4. Synthetic "Stem Cell" and Differentiation Networks in Living Cells

Figure 35:
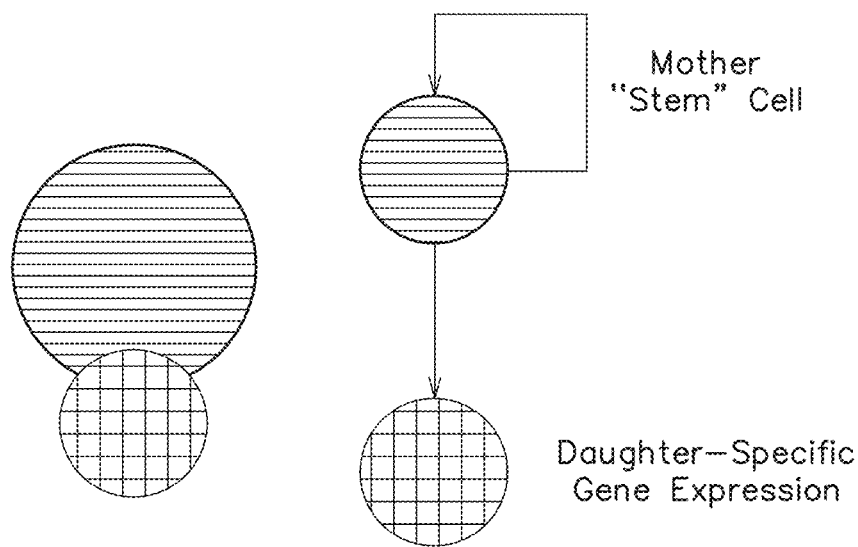
FIG. 35 shows one example of a genetic scheme to initiate downstream synthetic differentiation networks.

The pluripotent stem cell state is central to the biology of higher organisms but is not present in the unicellular *Saccharomyces cerevisiae* (*S. cerevisiae*). To construct models of stem cell and differentiation networks, synthetic circuits in *S. cerevisiae* with stem-cell behaviors are designed using Gibson and Golden Gate DNA assembly strategies and genomically integrate these circuits or place them in yeast artificial chromosomes (YACs) (FIG. 35). These circuits enable the characteristic asymmetric cell division of stem cells by taking advantage of daughter-specific promoters [55,56], such as PSCW11. Recombinases are expressed under the control of daughter-specific promoters, such that they can only be asymmetrically expressed in daughter cells. These recombinases trigger transitions from the yeast stem cell state into downstream states (see below). Daughter-specific circuits are designed to be inducible for starting and controlling "stem cell" experiments externally. This is achieved by designing the output of the daughter-specific promoters to be inducible synthetic transcription factors (sTFs) (e.g., TetR-based or LacIbased sTFs), which control downstream recombinase expression, modifying daughter-specific promoters to contain binding sites for inducible repressors (e.g., TetR or LacI), and/or using inducible recombinases (e.g., estradiol-inducible Cre).

The dynamic range and time course of these daughter-specific circuits are characterized with fluorescent proteins as the outputs and monitoring the cellular fluorescence profiles using microscopy. Using image processing software [57], fluorescence confinement to daughter cells is confirmed and its concentration and time dependence on external inducers measured.

Designing Synthetic Differentiation Networks.

Figure 36:
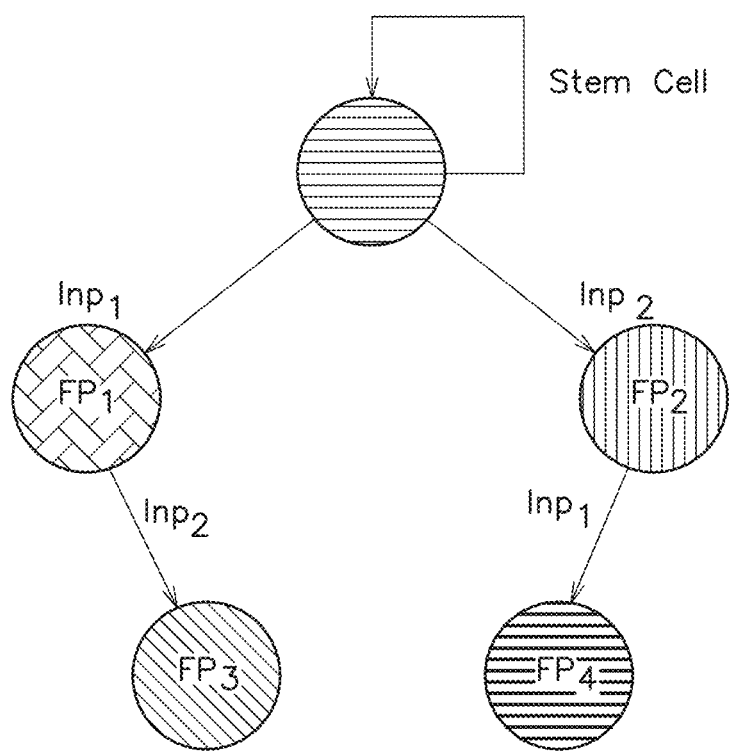
FIG. 36 shows one example of a 2-to-4 multiplexer circuit that produces four distinct fluorescent proteins (FP) with different combinations and orders of inputs (Inp)
Figure 37A:
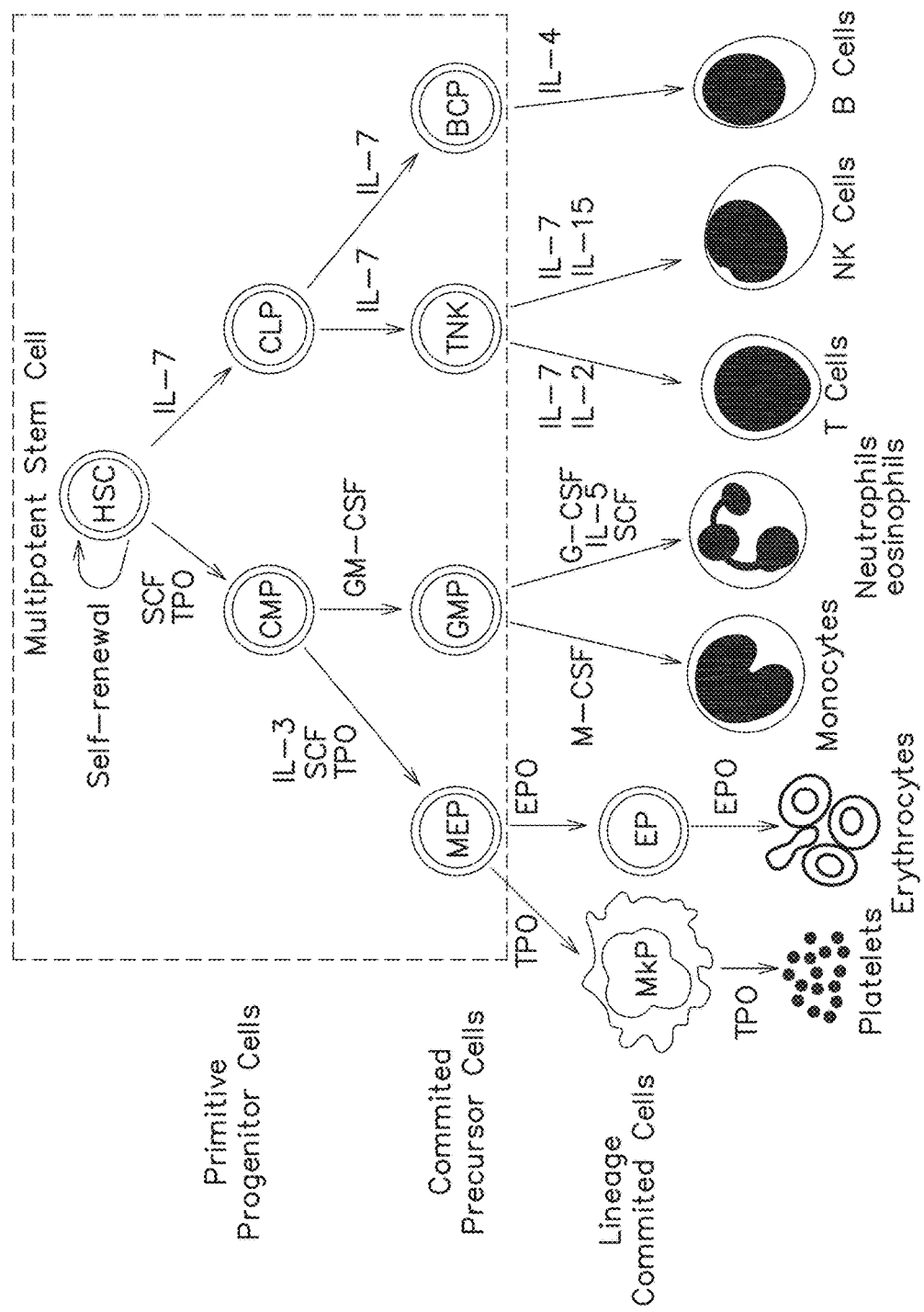
FIG. 37 shows a network that mimics the hematopoietic stem cell (HSC) differentiation pathway.
Figure 37B:
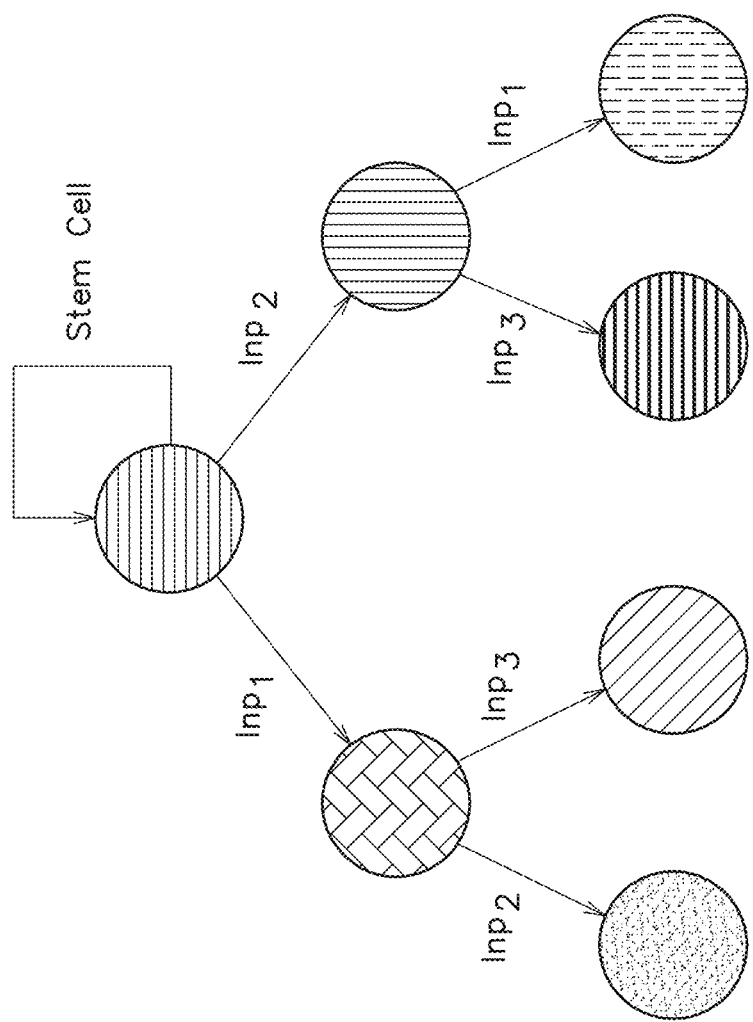

The asymmetric circuits described above activate differentiation cascades, upon the addition of external inducers, only in daughters of the yeast stem cells. Synthetic networks are engineered to guide these "progenitor" cells down specific differentiation pathways. Two proof-of-concept differentiation networks are used as model systems: (1) a 2-to-4 multiplexer circuit, in which the timing and identity of two external inputs leads to four different fluorescent protein outputs (FIG. 36) and (2) a network which mimics the HSC differentiation pathway (FIG. 37).

The inputs to these networks are external inducers that control recombinase expression. Stochastic switching is attained by expressing intermediate recombinase levels or inducing switching to completion by expressing high recombinase levels. To fine-tune recombinase expression, a wide-dynamic-range (WDR) positive feedback (PF) shunt motif [58] is implemented in *S. cerevisiae*. Promoters with TetO binding sites are designed to express a TetON-based system (where aTc induces TetR-VP16 binding to the promoter). This PF-loop is integrated or placed on YACs so it is present in low copy numbers. For the shunt, promoters with TetO binding sites expressing a fluorescent protein on a high-copy 2-micron plasmid are engineered. A similar strategy is used for isopropyl β-D-1-thiogalactopyranoside (IPTG)-based control of a LacI-regulated gene. WDR circuit behavior is verified using flow cytometry, and then the fluorescence gene is replaced with recombinases.

The outputs of these differentiation networks include different reporter genes, such as fluorescent, colorimetric, luciferase and drug resistance genes. The reporters allow convenient measurement of the proportion of cell populations in each state. In instances where it may be challenging to perform multiplexed imaging, using flow cytometry for example, of a single circuit with more than three simultaneous fluorescent reporters, other reporters proposed above are used, or multiple versions of the same circuit are built with two or three reporters placed into the different output gene positions. The outputs can also be sTFs that regulate endogenous or synthetic pathways [59-62]. The sTFs can be built off of the zinc finger (ZF), transcription activator-like effector (TALE), and clustered regularly interspaced short palindromic repeat (CRISPR) transcription factor frameworks and permit tunably regulated desired pathways in each state. For example, synthetic transcription factors (sTFs) can be used to differentially regulate endogenous pathways in each state (e.g., pseudohyphal growth, mating type, flocculation).

Many different implementations of recombinase circuits from the algorithms described above can be used, thus enabling multiple potential alternatives in instances of inadequate performance. Manually designed circuits can also be used. Some designs may encode multiple RRS pairs that are recognized by the same recombinase for inversion or excision. To reduce crosstalk between undesired RRSs, RRSs that otherwise share the same sequence but have their central dinucleotide residues mutated can be designed. It has been shown that RRS pairs that contain the same central dinucleotides preferentially react with each other [64-66]. Moreover, as an alternative to expressing recombinases via the PF-shunt WDR logarithmic circuits, linearized transcriptional circuits can be used [67]. These negative-feedback circuits enable linear control of output genes with external inducers. WDR logarithm circuits in *Escherichia coli* that do not require the positive feedback (PF) component to be on a LCP and the shunt component to be on a separate HCP (Daniel, Rubens et al. in preparation) have also been developed; instead, both of these components can be on the same vector. This is achieved through mutagenesis of the PF and shunt.

Characterizing Synthetic Differentiation Networks.

The differentiation networks are tested by inducing the expression of different recombinases with different timings (FIG. 37). Permutations of recombinase expression are explored and the states and transitions monitored with flow cytometry, microscopy, PCR, and DNA sequencing. How the efficiency of state transitions and the stability of each state depend on the circuit topologies and the temporal dynamics of the inputs are determined. Low, intermediate and high levels of recombinases are expressed with WDR circuits to determine how different levels affect the fidelity and stochasticity of state transitions. Intermediate levels of recombinase expression may lead to mixed populations. As an extension, there is an exploration of how reversing the direction of inversions via expression of recombinases plus recombinase directionality factors (RDFs) affects the behavior of the state machines [63]. This work provides the first demonstration of a complex synthetic differentiation network, along with multiple knobs that can be used for tuning behavior.

Example 5. State Machine Circuits

Provided herein are logic and memory systems that can be used to construct biological circuits, thus enabling the modeling of complex systems with a simple state machine representation (e.g., from computer science). For example, the logic and memory systems of the invention can be used to transition a cell between unique states depending on the order and identity of inputs (e.g., chemical-based or recombinase-based inputs). One non-limiting example of this is an n-inputs-to-2n-outputs circuit, which enables the selection of one of 2n outputs based on the combination of n inputs used (FIGS. 38A-38E, 39A-39C). In general, the state machine concept is scalable and enables n inputs→$2^n$ outputs.

Figure 38A:
FIG. 38A shows one examples of a "four-color system" of the invention, including a genetic construct with logic gates that include two nucleic acid outputs, blue fluorescent protein (BFP) and yellow fluorescent protein (YFP), and another genetic construct with logic gates that include two nucleic acid outputs, red fluorescent protein (RFP) and green fluorescent protein (GFP), thus enabling the mapping of two cellular inputs into four cellular outputs (generally scalable to n inputs→$2^n$ outputs)
Figure 38A:
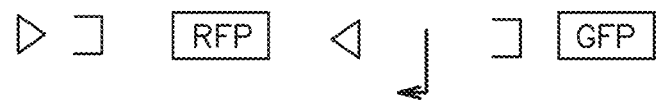

The logic gates used in this Example are schematized in FIG. 38A. Logic gate 1 includes two output nucleic acids, one encoding blue fluorescent protein (BFP) and the other encoding yellow fluorescent protein (YFP). Cognate phiC31 recombinase recognition sites (RRSs) are depicted as brackets, and cognate Bxb1 RRSs are depicted as triangles. Logic gate 2 similarly includes two output nucleic acids, one encoding red fluorescent protein (RFP) and one encoding green fluorescent protein (GFP). Logic gates 1 and 2 will be referred to herein as a "four-color system."

Figure 38B:
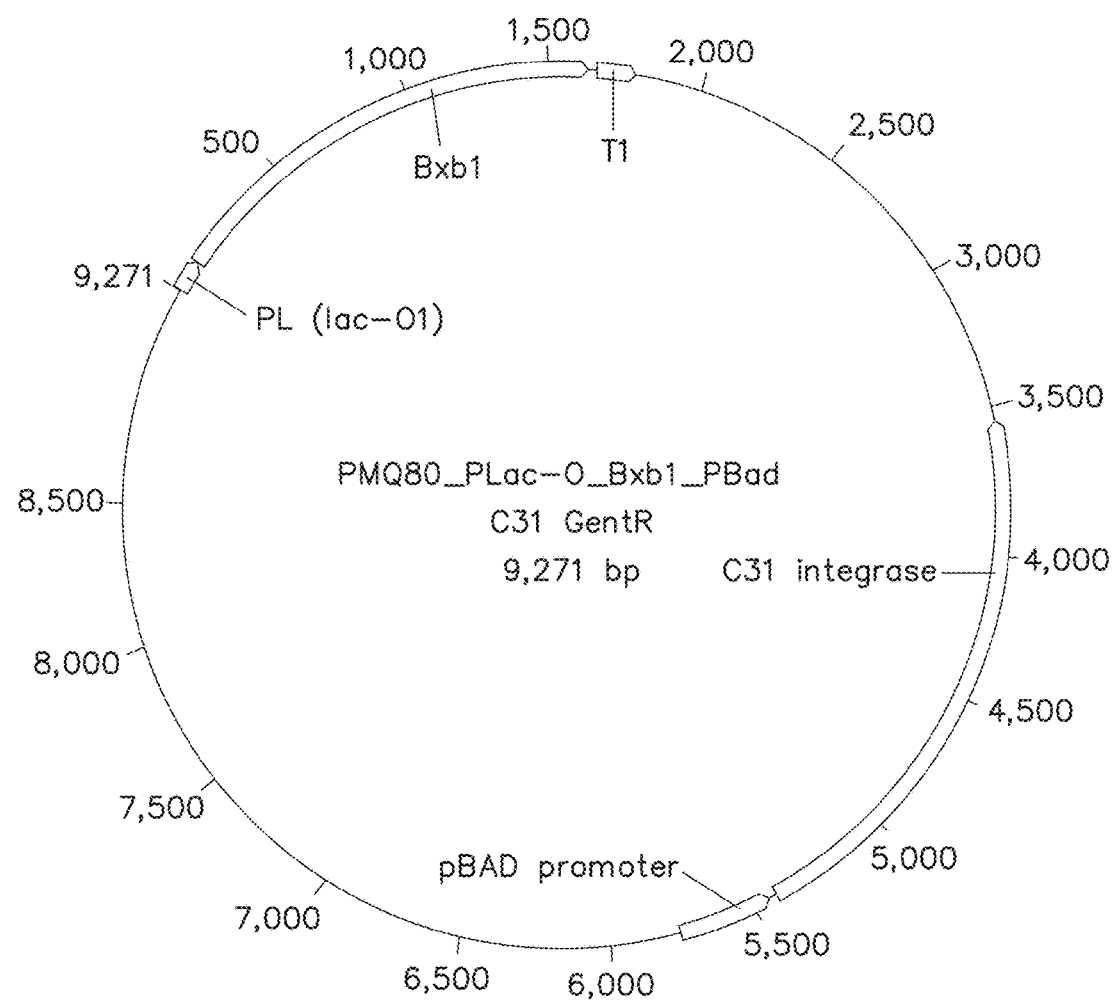
FIG. 38B shows a plasmid map that includes Bxb1 recombinase under the control of the isopropyl β-D-1-thiogalactopyranoside (IPTG)-inducible PL (lac-O1) promoter and phiC31 recombinase under the control of the arabinose-inducible pBAD promoter.
Figure 38C:
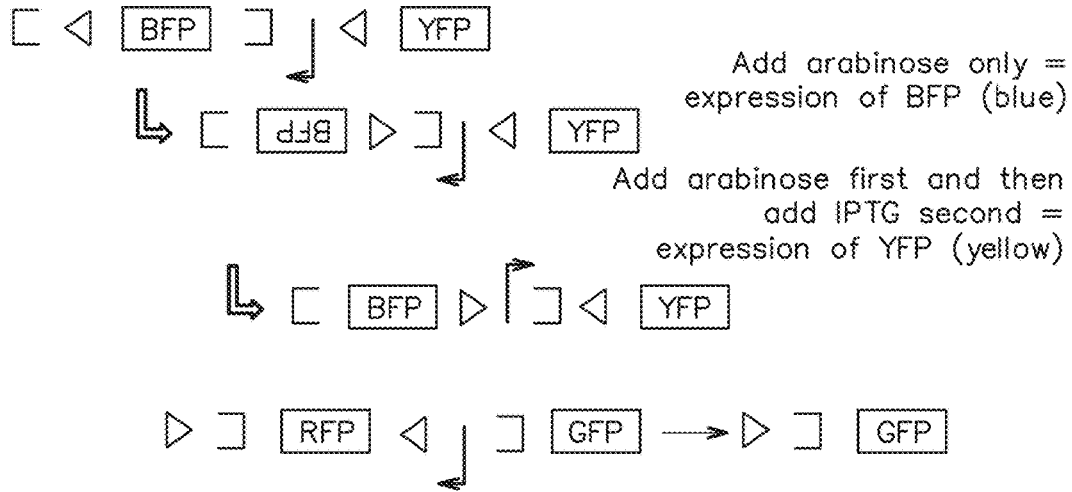
FIG. 38C shows the orientation of genetic elements in the four-color system after exposure to arabinose only and after exposure to arabinose followed by IPTG, which leads to BFP expression followed by YFP expression.
Figure 38D:
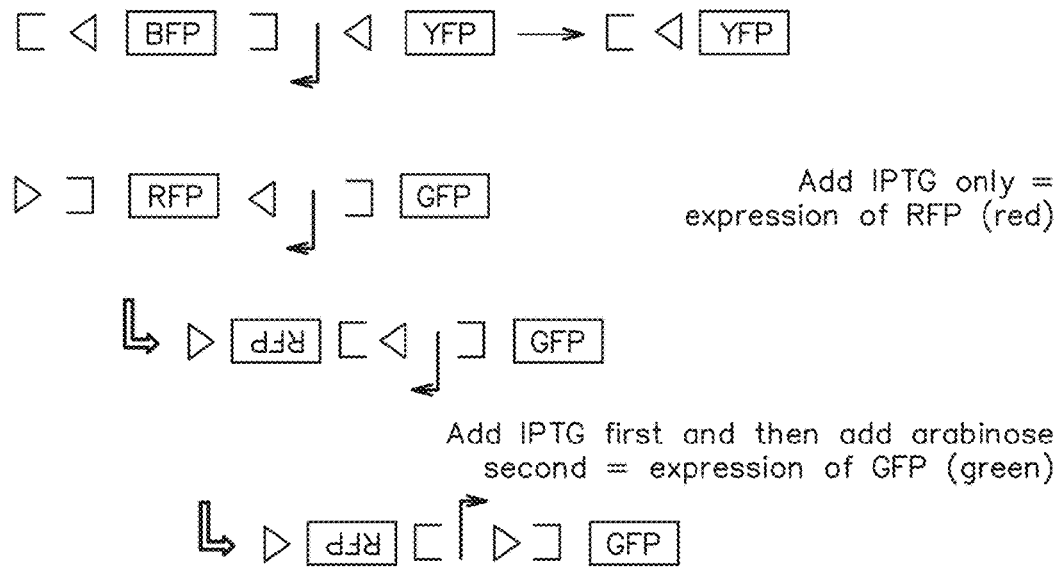
FIG. 38D shows the orientation of genetic elements in the four-color system after exposure to IPTG only and after exposure to IPTG followed by arabinose, which leads to RFP expression followed by GFP expression.
Figure 38E:
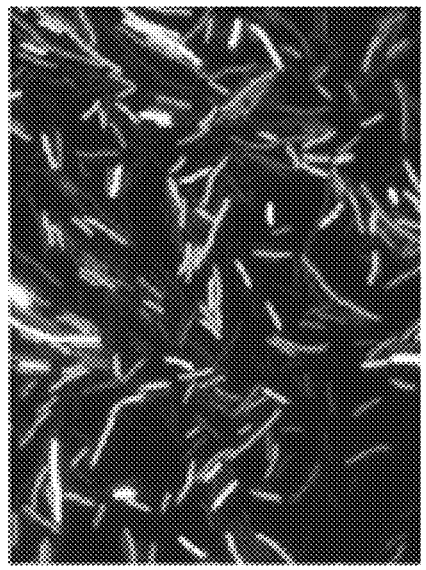
FIG. 38E shows microscopy images of yeast cells expressing RFP, GFP, BFP, or YFP, after exposure to IPTG only, IPTG then arabinose, arabinose only, or arabinose then IPTG, respectively; the cell were transfected with constructs of the four color system.
Figure 38E:
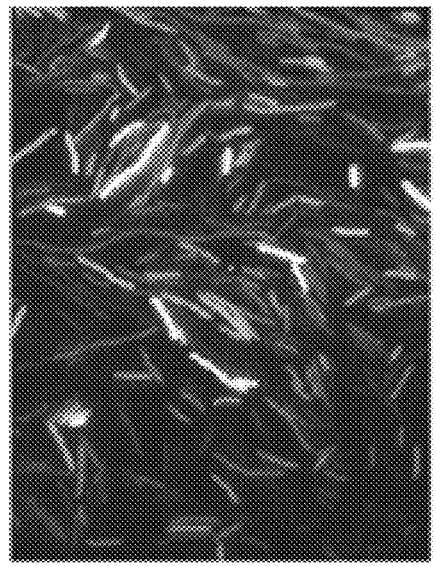
Figure 38E:
Figure 38E:
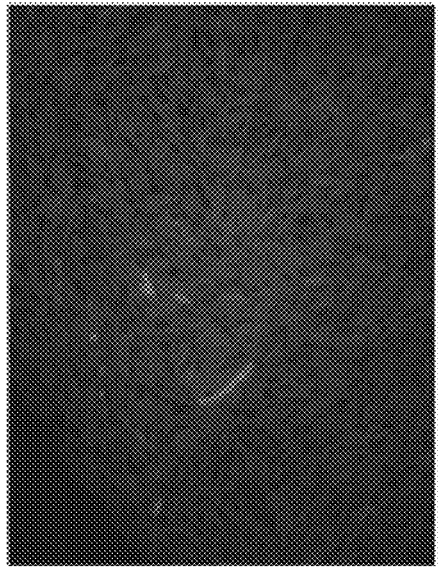

In one experiment, cells were transformed with plasmids containing the four-color system and the two recombinases, PhiC31 recombinase and Bxb1 recombinase under the control of an arabinose-inducible promoter and an IPTG-inducible promoter, respectively (FIG. 38B). Cells were grown overnight in media without inducer and then exposed to IPTG only, IPTG then arabinose, arabinose or arabinose then IPTG (FIG. 38). FIG. 38 shows fluorescence of RFP in cells exposed to IPTG only, fluorescence of GFP in cells exposed to IPTG and then arabinose, fluorescence of BFP in cells exposed to arabinose only, and fluorescence of YFP in cells exposed to arabinose and then IPTG.

Figure 39A:
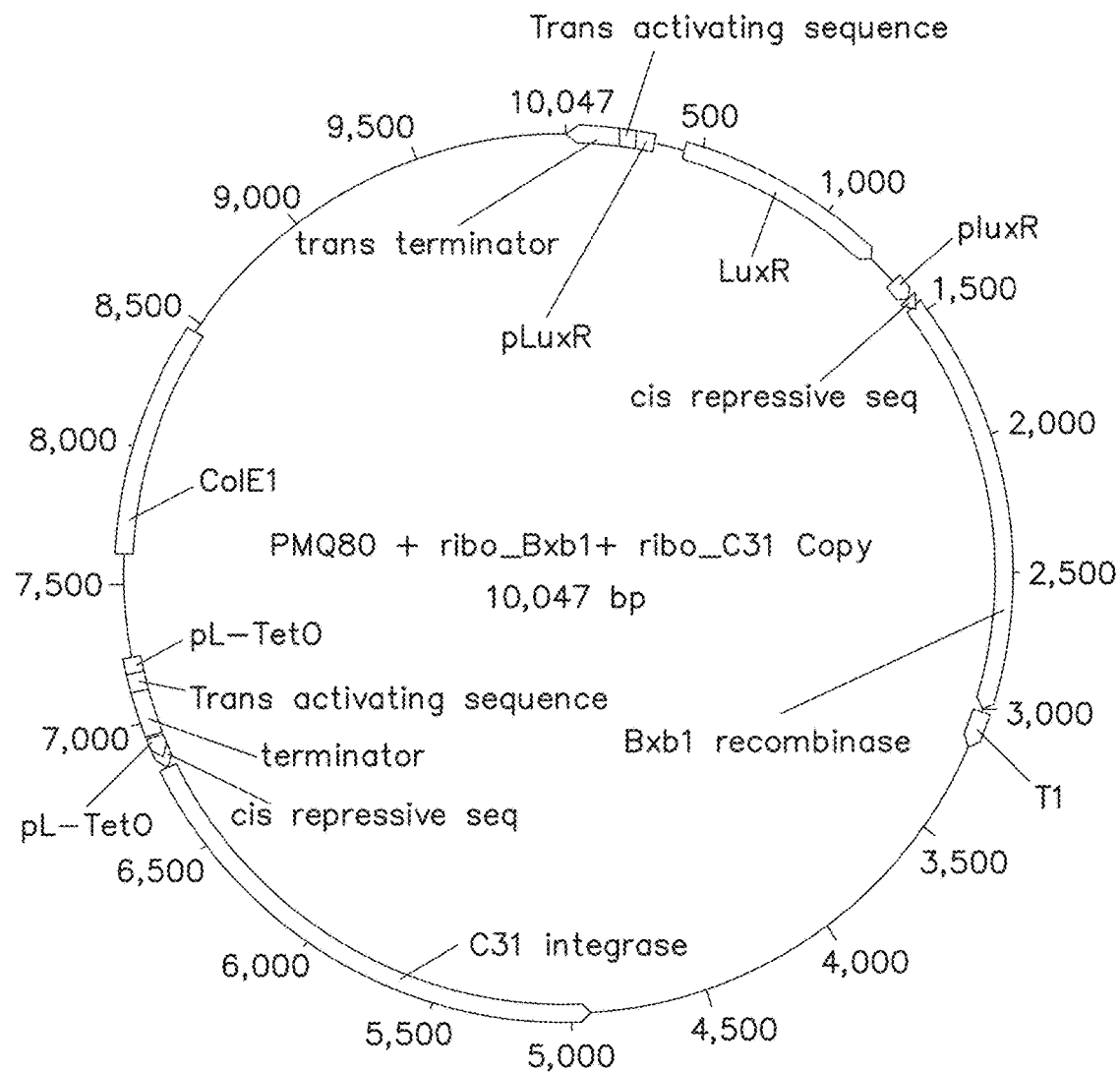
FIG. 39A shows a plasmid map that includes riboregulated Bxb1 recombinase and phiC31 recombinase.
Figure 39B:
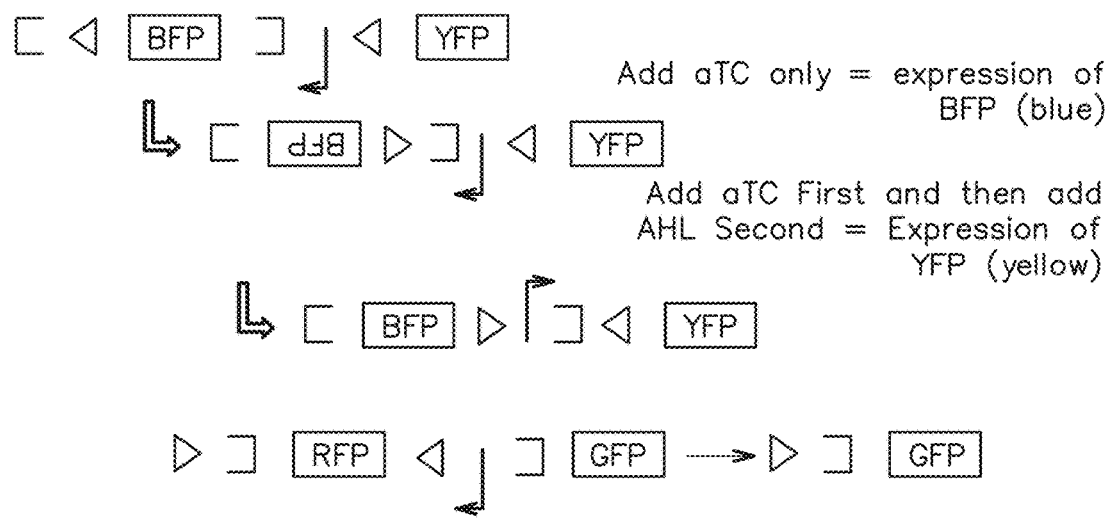
FIG. 39B shows the orientation of genetic elements in the four-color system after exposure to aTc only and after exposure to aTc followed by AHL.
Figure 39C:
FIG. 39C shows the orientation of genetic elements in the four-color system after exposure to AHL only and after exposure to AHL followed by aTc.
Figure 39C:
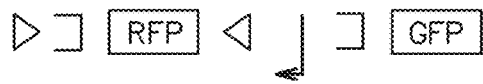
Figure 39C:
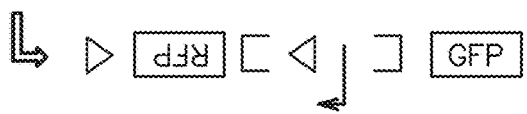
Figure 39C:
Figure 40A:
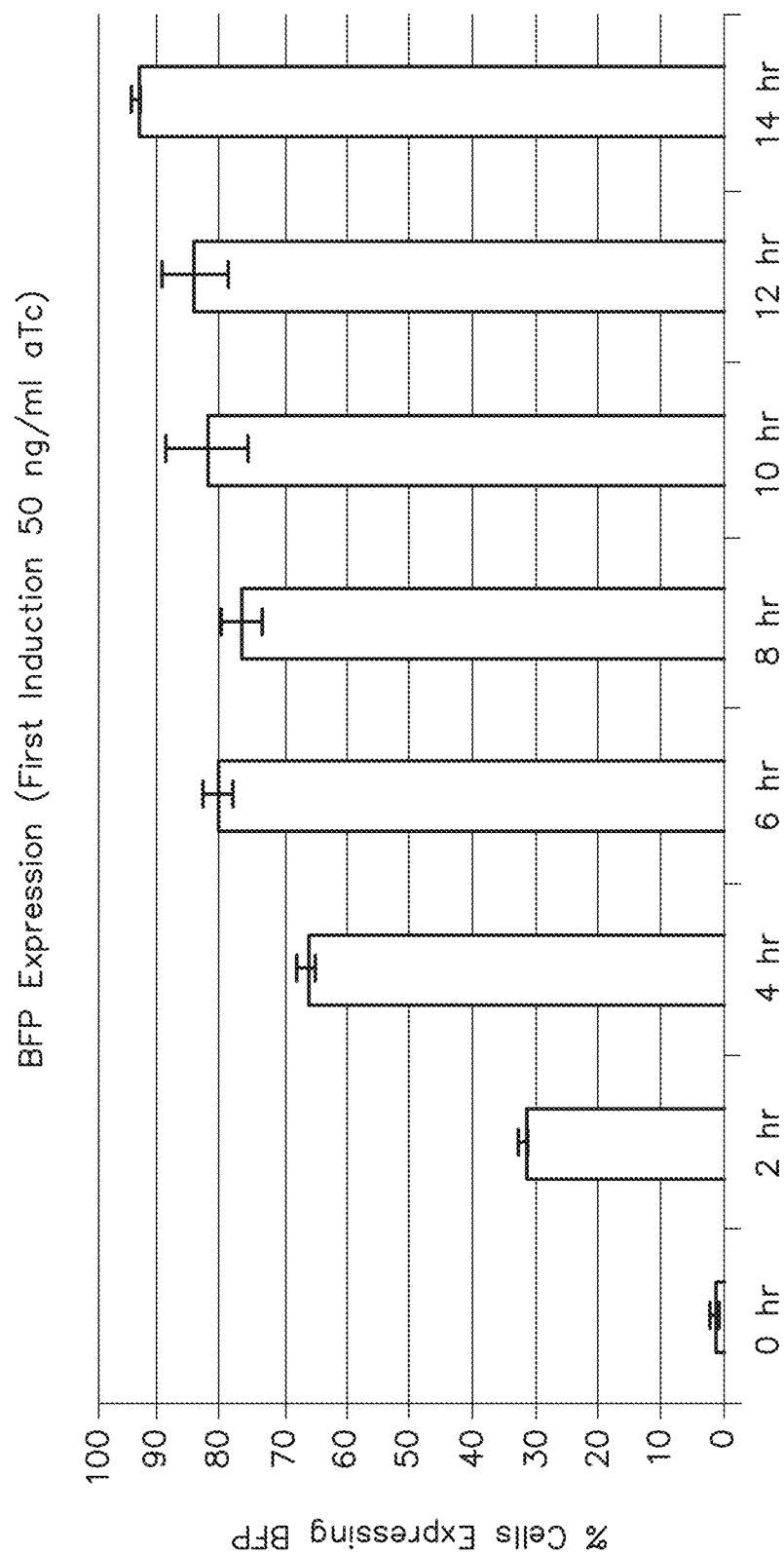
FIG. 40A shows a graph plotting the percentage of cells expressing BFP after exposure to 50 ng/ml aTC over time.
Figure 40B:
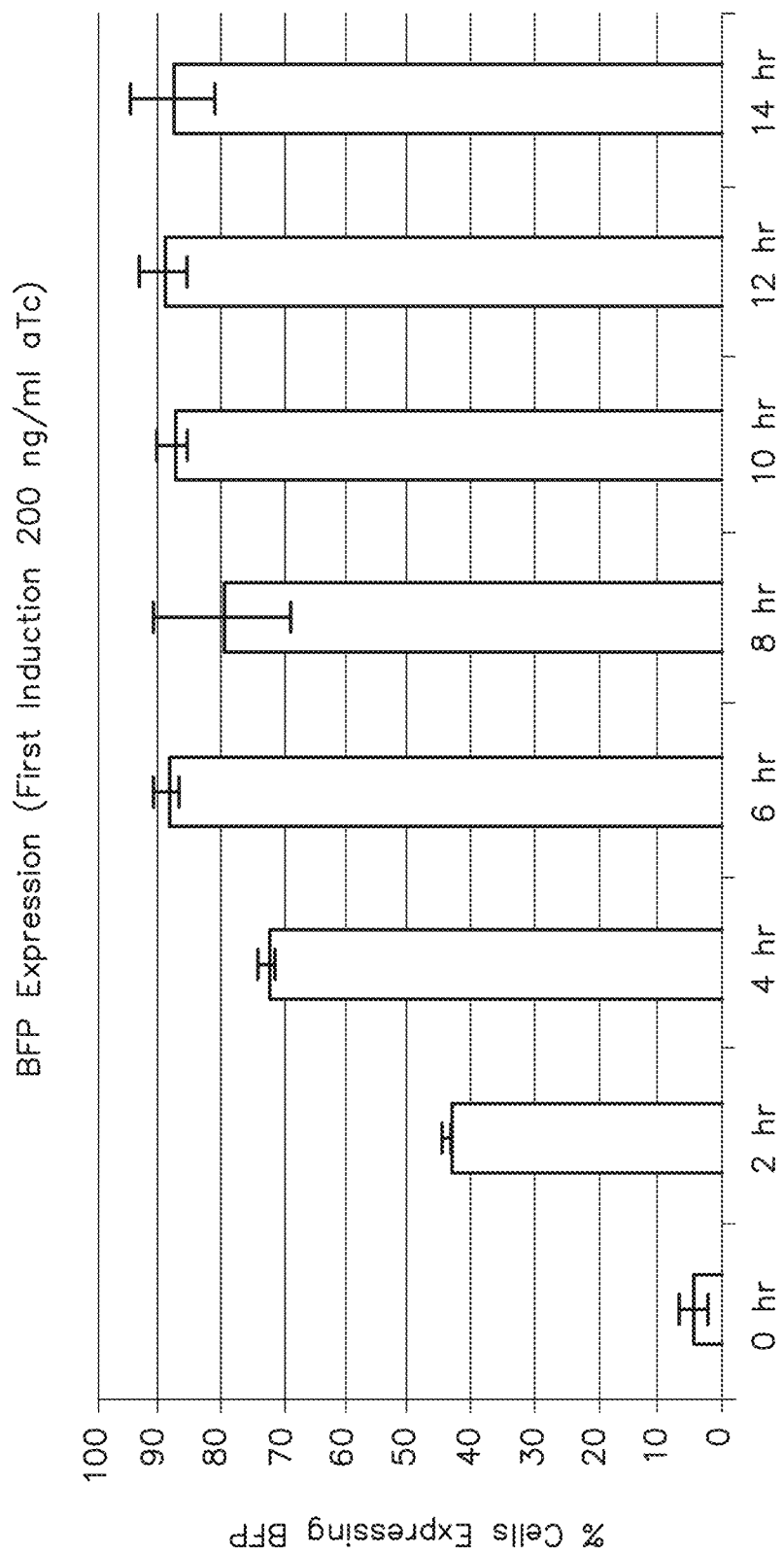
FIG. 40B shows a graph plotting the percentage of cells expressing BFP after exposure to 200 ng/ml aTC over time.
Figure 40C:
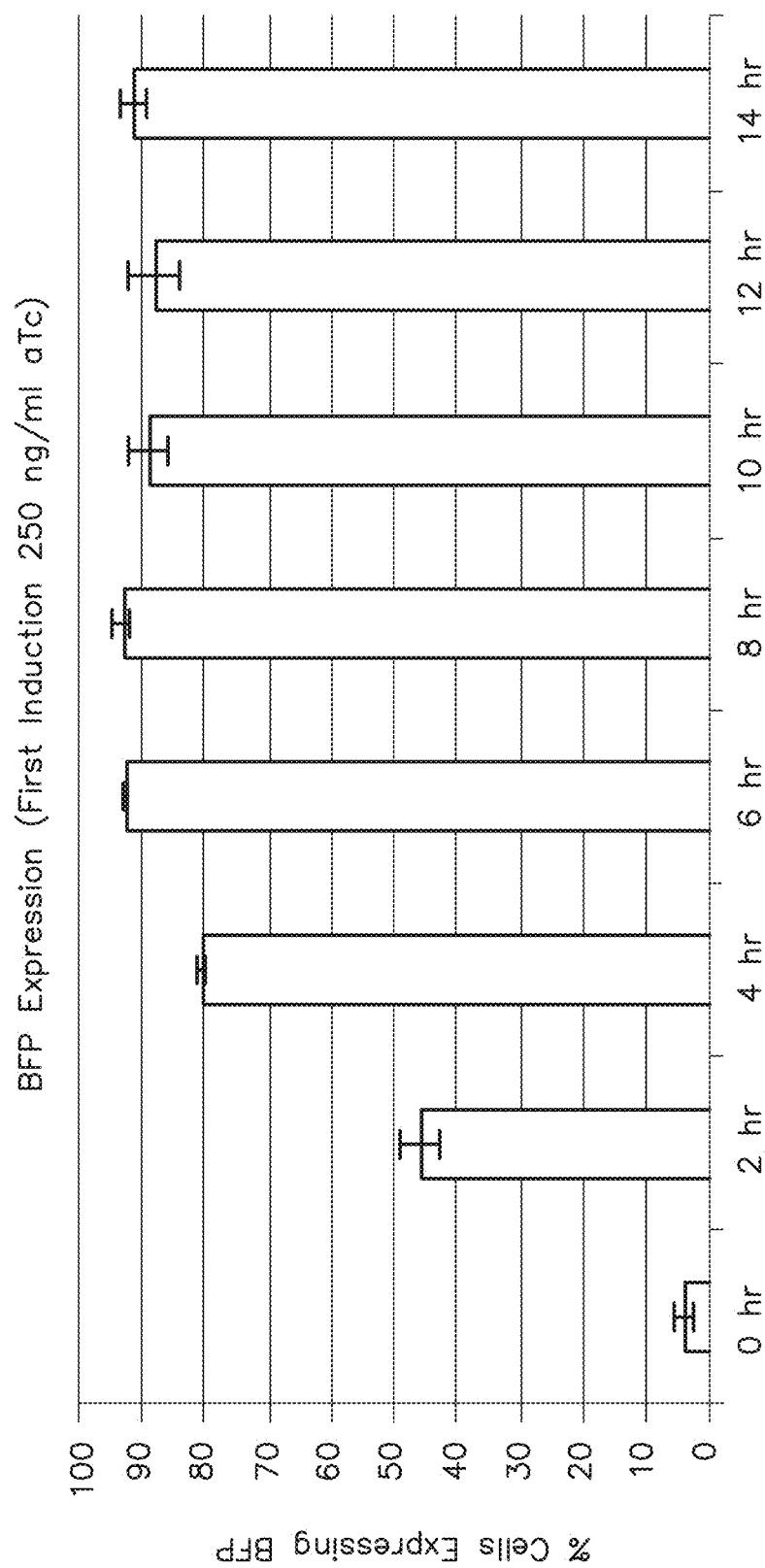
FIG. 40C shows a graph plotting the percentage of cells expressing BFP after exposure to 250 ng/ml aTC over time.
Figure 40D:
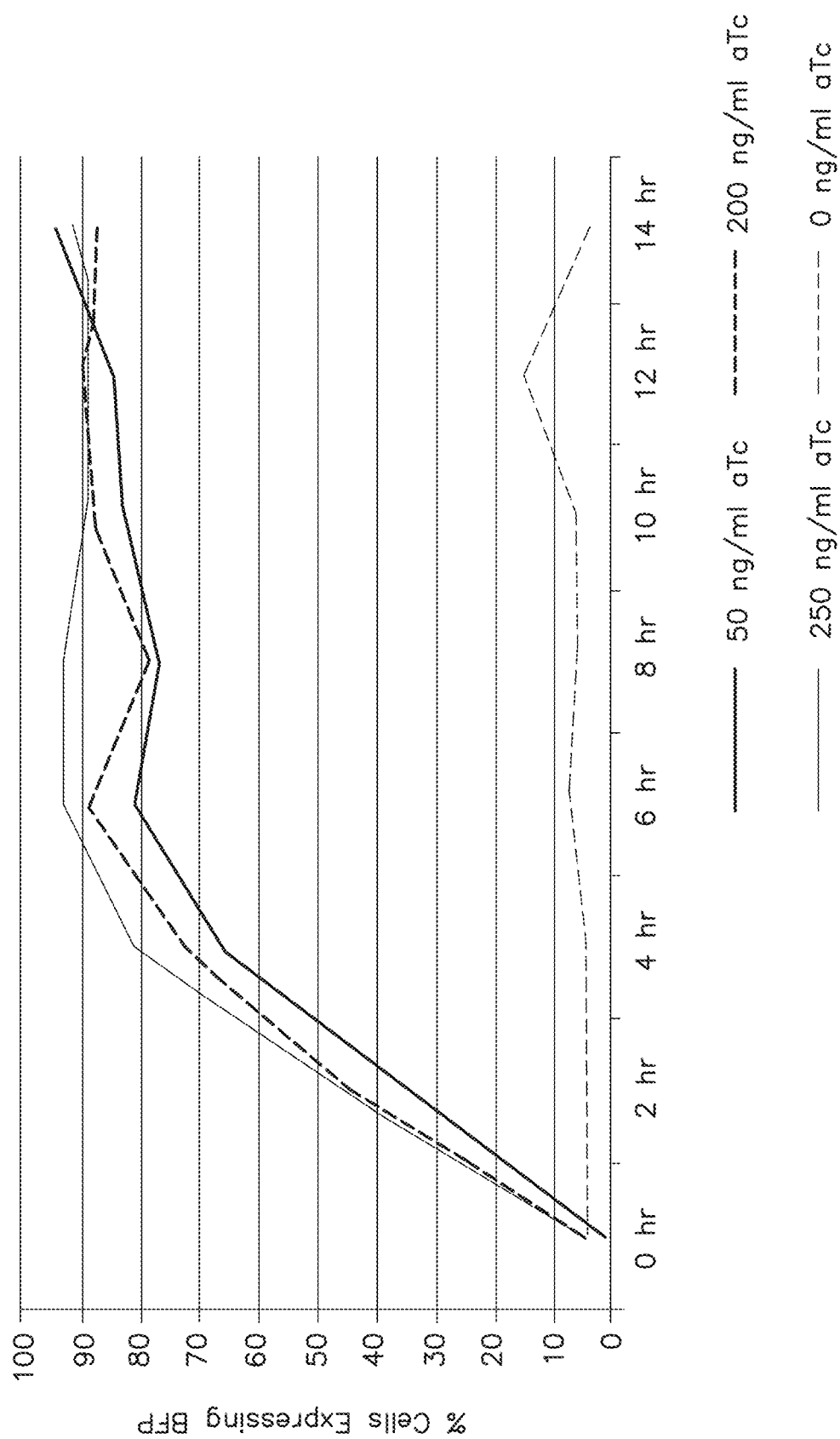
FIG. 40D shows a graph plotting the percentage of cells expressing BFP after exposure to various concentrations of aTC over time.
Figure 41A:
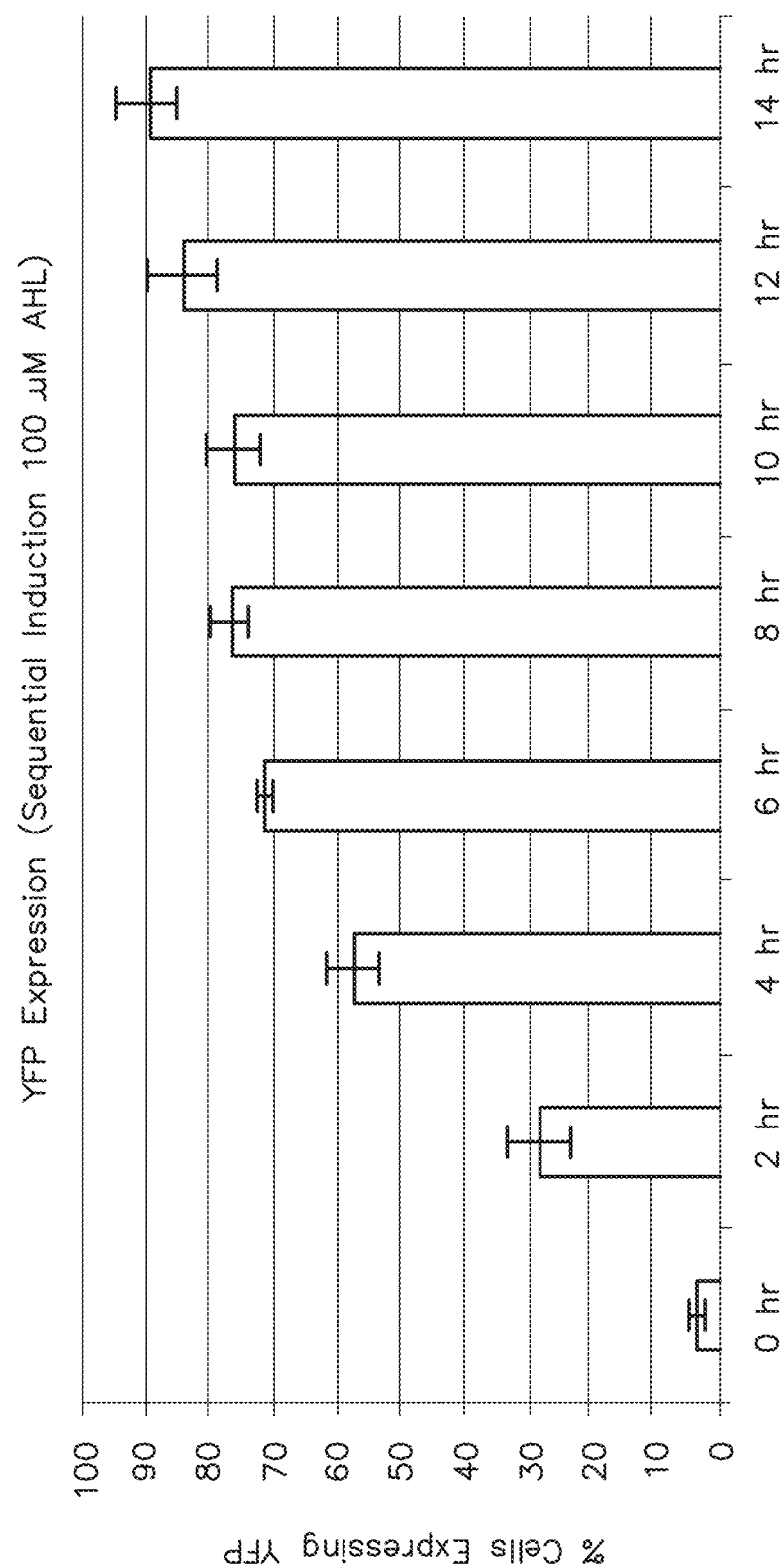
FIG. 41A shows a graph plotting the percentage of cells expressing YFP after exposure to aTC followed by 100 µM AHL over time.
Figure 41B:
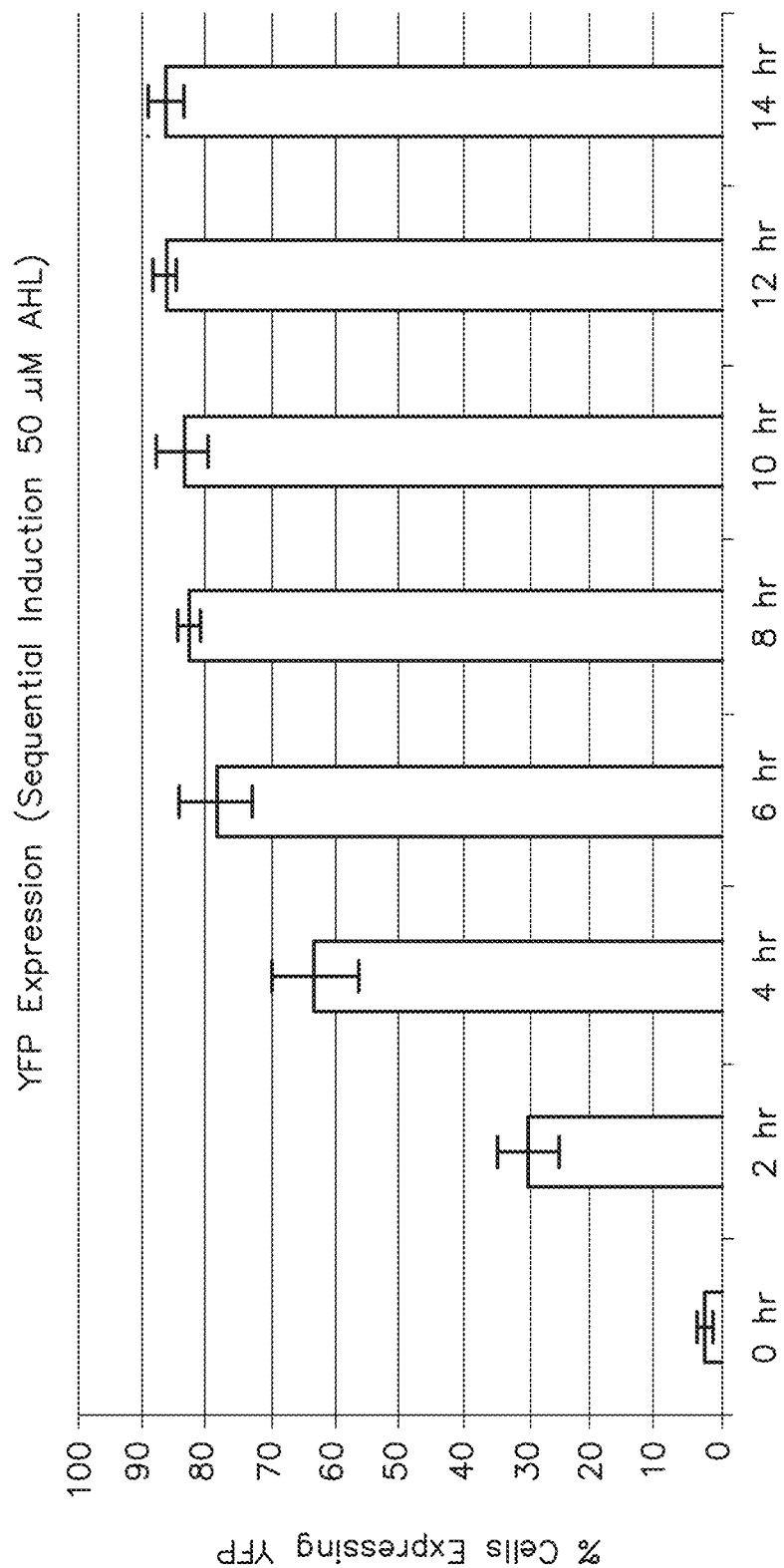
FIG. 41B shows a graph plotting the percentage of cells expressing YFP after exposure to aTC followed by 50 µM AHL over time.
Figure 41C:
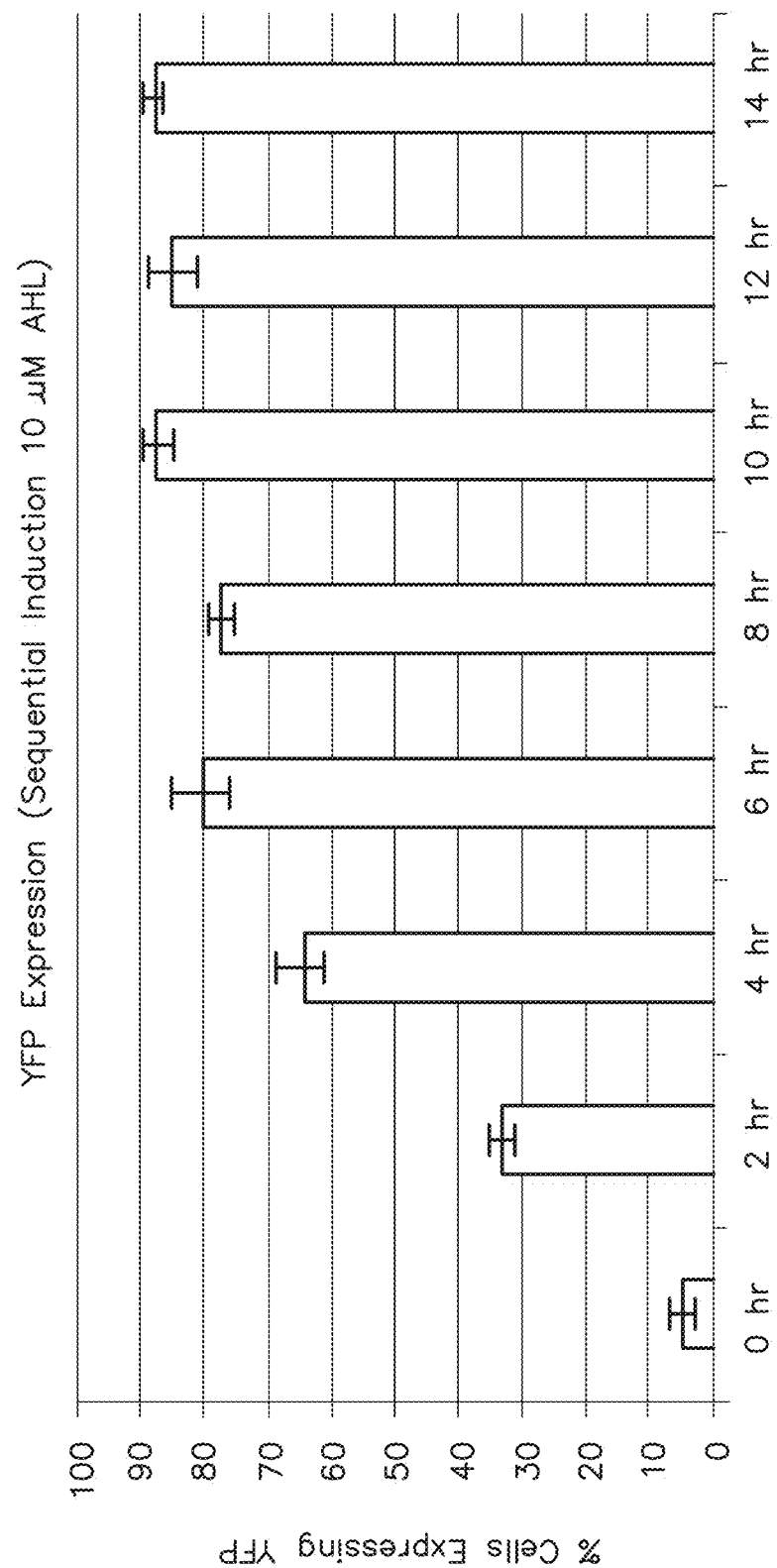
FIG. 41C shows a graph plotting the percentage of cells expressing YFP after exposure to aTC followed by 10 µM AHL over time.
Figure 41D:
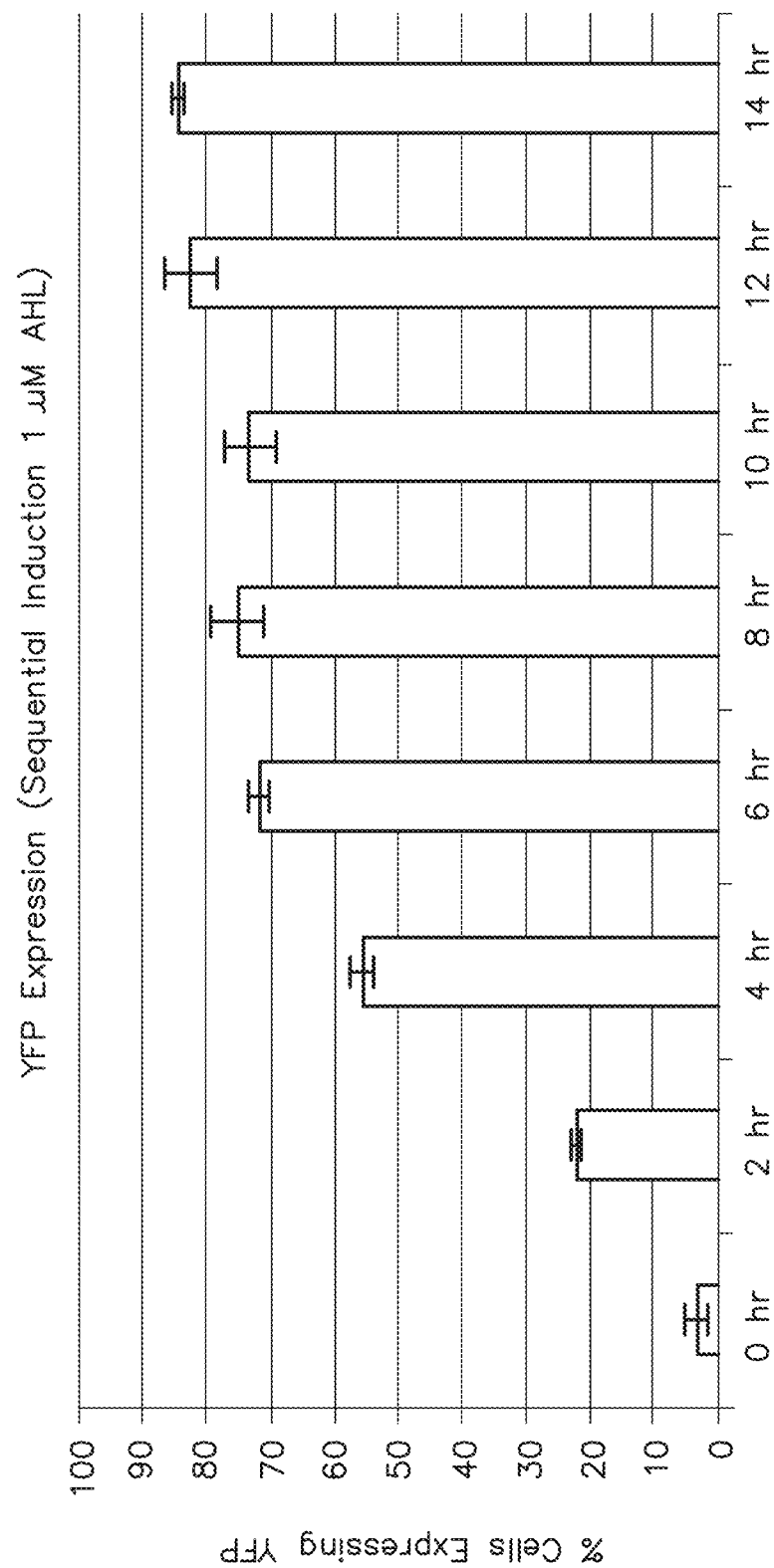
FIG. 41D shows a graph plotting the percentage of cells expressing YFP after exposure to aTC followed by 1 µM AHL over time.
Figure 41E:
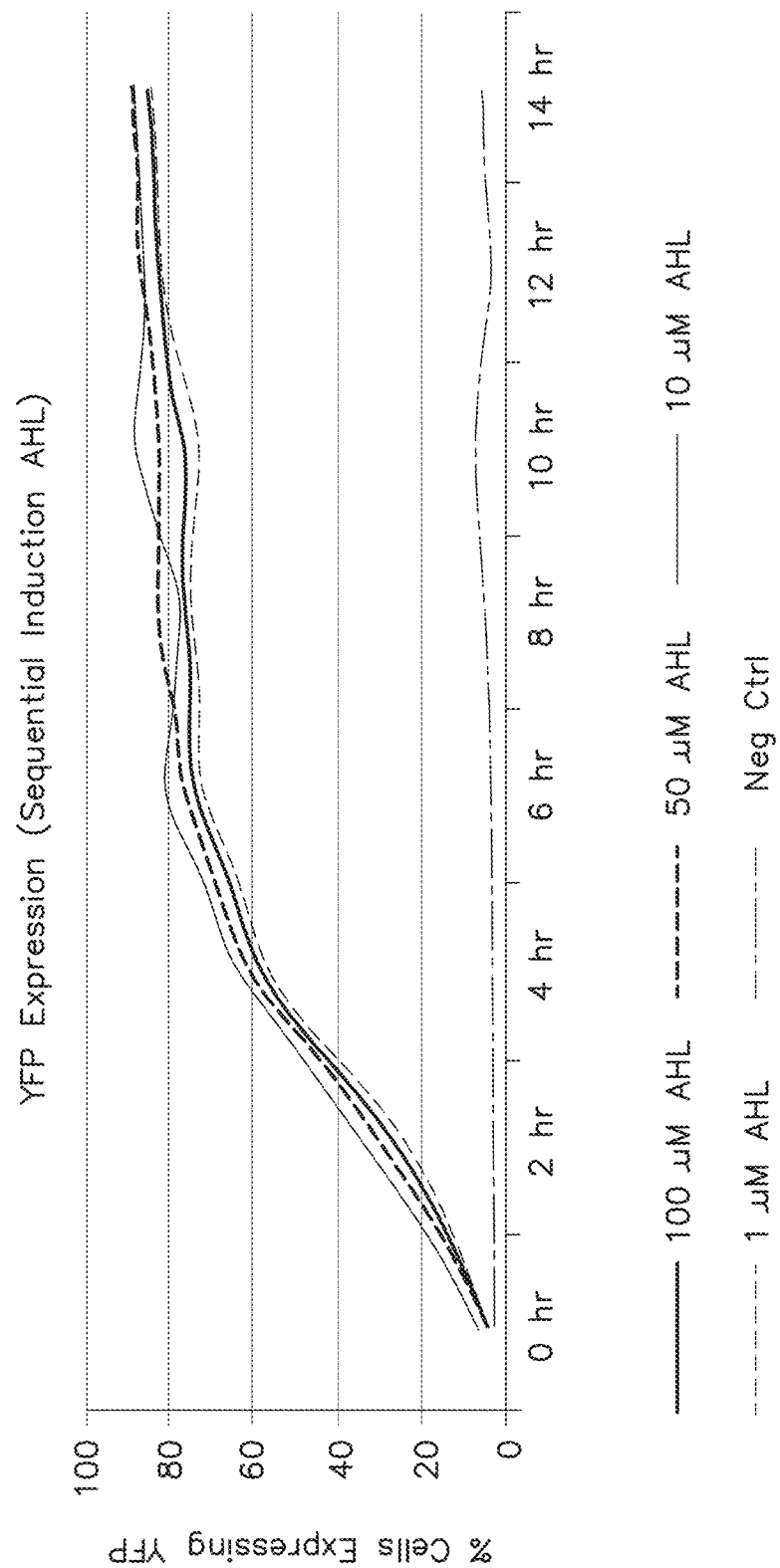
FIG. 41E shows a graph plotting the percentage of cells expressing YFP after exposure to aTC followed by exposure to various concentrations of AHL over time.

In another experiment, cells were transformed with plasmids containing the four-color system and the two recombinases, PhiC31 recombinase and Bxb1 recombinase under riboregulator control (FIG. 39A). Cells were grown overnight in media without inducer (aTc and AHL), centrifuged, washed and diluted 1:2000 the next day. Cells were exposed to 50 ng/ml, 200 ng/ml and 250 ng/ml concentrations of one input inducer, aTc, for 2, 4, 6, 8, 10, 12 and 14 hours, respectively. Expression of BFP was then measured using flow cytometry. Output nucleic acid expression was also confirmed by PCR (data not shown). FIGS. 40A-40D show graphs plotting the percentage of cells expressing BFP at various input concentrations over time.

Cells that were induced with aTC overnight were then centrifuged, washed, diluted 1:2000 and exposed to 1 µM, 10 µM, 50 µM and 100 µM concentrations of the other inducer, AHL, for 2, 4, 6, 8, 10, 12 and 14 hours, respectively. Expression of YFP was then measured using flow cytometry. Output nucleic acid expression was also confirmed by PCR (data not shown). FIGS. 41A-41E show graphs plotting the percentage of cells expressing YFP at various input concentrations over time.

Experimental Methods

All experiments were performed in Luria-Bertani (LB)-Miller medium (Fisher #BP1426-2) using appropriate antibiotics at the following concentrations: carbenicillin (50 µg/ml), kanamycin (30 µg/ml), and chloramphenicol (25 µg/ml).

Recombinase-Based Computation Plasmid Construction

All plasmids were constructed using basic molecular cloning techniques [27] and Gibson assembly [28]. New England Biolab (NEB) restriction endonucleases, T4 DNA Ligase, and PHUSION® PCR kits were used. Polymerase chain reactions (PCRs) were carried out with a Bio-Rad S1000™ Thermal Cycler With Dual 48/48 Fast Reaction Modules (BioRad). Custom sequences, including recombinase recognition sites, were constructed from Integrated DNA Technologies (Coralville, Iowa).

All plasmids were transformed into E. coli strain DH5αPRO (F-φ80lacZΔM15 Δ(lacZYA-argF)U169 deoR recA1 endA1 hsdR17(rk−, mk+) phoA supE44 thi-1 gyrA96 relA1λ, PN25/tetR, Placiq/lacI, Spr) with standard protocols and isolated with QIAprep® Spin Miniprep Kits (Qiagen). Plasmid modifications were confirmed by restriction digests and sequencing by Genewiz (Cambridge, Mass.).

Promoter PLtet0-1 and the ribosomal binding site (RBS) present in pZA31G were removed via excision by XhoI and KpnI and replaced with the same RBS and an EagI restriction site. All components for the recombinase-based computation devices that consisted of promoters and/or terminators located between recognition sites and a downstream gfp that was not positioned between recognition sites were then Gibson assembled between the AatII and XhoI restriction sites in pZA31G CmR. All the other designs (i.e., those that involved gfp positioned between recognition sites) were Gibson assembled between AatII and AvrII restriction sites.

The Bxb1 gene was cloned into a variant of the riboregulator vector rrjc12y(rii)g from Callura et al. between the restriction sites KpnI and HindIII [29,30]. This high-copy-number plasmid contains kanamycin resistance, and the PLuxI promoter driving transcription of taRNA (trans-activating RNA) version taR12y and Bxb1. The Bxb1 gene has the crR12y cis-repressive sequence upstream of the RBS.

The phiC31 gene was obtained from Addgene plasmid 18941 (Cambridge, Mass.). The phiC31 gene was cloned into a variant of the riboregulator vector rrjt12(11)g from Callura et al. between the restriction sites KpnI and PstI [29,30]. This medium-copy-number plasmid contains carbenicillin resistance, and the PLtet0-1 promoter driving transcription of both taRNA version taR12 and phiC31. The phiC31 gene has the crR12 cis-repressive sequence upstream of the RBS.

Gibson Assembly

Gibson assembly was used to join promoters (proD) [5], terminators (T1) [6], and output gene (gfp) [6] modules (Table 2) together to implement integrated logic and memory plasmids in single-step reactions.

DNA fragments that overlap in sequence by ~40 bases were constructed by PCR via the design of PCR primers which contain 'overhangs' that provide sequence overlap with adjacent fragments. The protocol described by Gibson et al. was followed [28]. Briefly, Gibson assembly master mix was prepared by adding: 320 µL of 5×ISO Buffer, 0.64 µL of 10 U/µL T5 exonuclease, 20 µL of 2 U/µL PHUSION® polymerase, 160 µL of 40 U/µL Taq ligase and water to bring it to 1.2 mL. Aliquots of 15 µL were prepared and used for a single Gibson reaction. Next, 100 ng of the linearized vector backbone and equimolar amounts of the other assembly pieces were added to the 15 µL master mix in a 20 µL total volume assembly reaction mixture. The assembly reaction was incubated at 50° C. for 60 minutes, and then 5 µL of the assembly reaction were transformed into 100 µL of competent E. coli.

Recombinase-Based Computation Flow Cytometer Measurements

Prior to performing flow cytometer measurements, cells were grown overnight in inducer-free media and then diluted 1:1000 in media with inducer anhydrotetracycline (Sigma) at a final concentration of 20 ng/mL and/or N-Acyl homoserine lactone (AHL) at a final concentration of 1 µM, as indicated. The cells were grown for 4 h in inducer(s), washed, diluted 1:1000 and grown overnight at 37° C. and 300 rpm in inducer(s). Next, the cells were centrifuged and washed in media without inducer. Cells were then diluted 1:100 into a new 96-well plate containing fresh 1× phosphate-buffered saline (PBS) and immediately assayed using a BD-FACS LSRFortessa-HTS cell analyzer (BD biosciences, CA). FlowJo (Treestar, Oreg.) was used for data analysis and visualization. Fluorescence was measured with a 488-nm argon laser excitation and a 515-nm to 545-nm emission filter. To ensure consistency between samples, 50,000 cells were collected for each sample and gated. A consistent threshold was applied to determine the percentage of cells deemed GFP positive (ON state) or GFP negative (OFF state) (FIG. 5). The percentage of cells that expressed GFP were averaged over three independent experiments. Error bars represent standard errors of the mean.

Stable Memory Maintenance over Multiple Generations

To study the temporal stability of our recombinase-based memory devices, cells containing an AND gate were induced from OFF to ON as described above. These cells were then repeatedly grown and diluted 1:2000 every day in media without inducer for 9 days to achieve ~11 generations per day. The ability of the cells to maintain their state was monitored each by measuring the expression of green fluorescent protein using flow cytometry, as described herein. The logic and memory systems of the invention held state for at least ~90 cell doublings. These data demonstrate the long-term operational stability of the systems.

Stable Memory Maintenance after Cell Death

Cells containing a NOR gate were exposed to no inputs, AHL alone, aTc alone and both AHL and aTc overnight, centrifuged, washed, and then killed by exposing them to 90° C. for 30 min. PCR was performed on DNA isolated from the dead cells using PHUSION® PCR kits (New England Biolab) according to manufacturer's instructions. PCRs were carried out with a Bio-Rad S1000™ Thermal Cycler With Dual 48/48 Fast Reaction Modules (BioRad). The PCR products were analyzed by electrophoresis on a 1% agarose gel.

Figures 2, 3, 4:
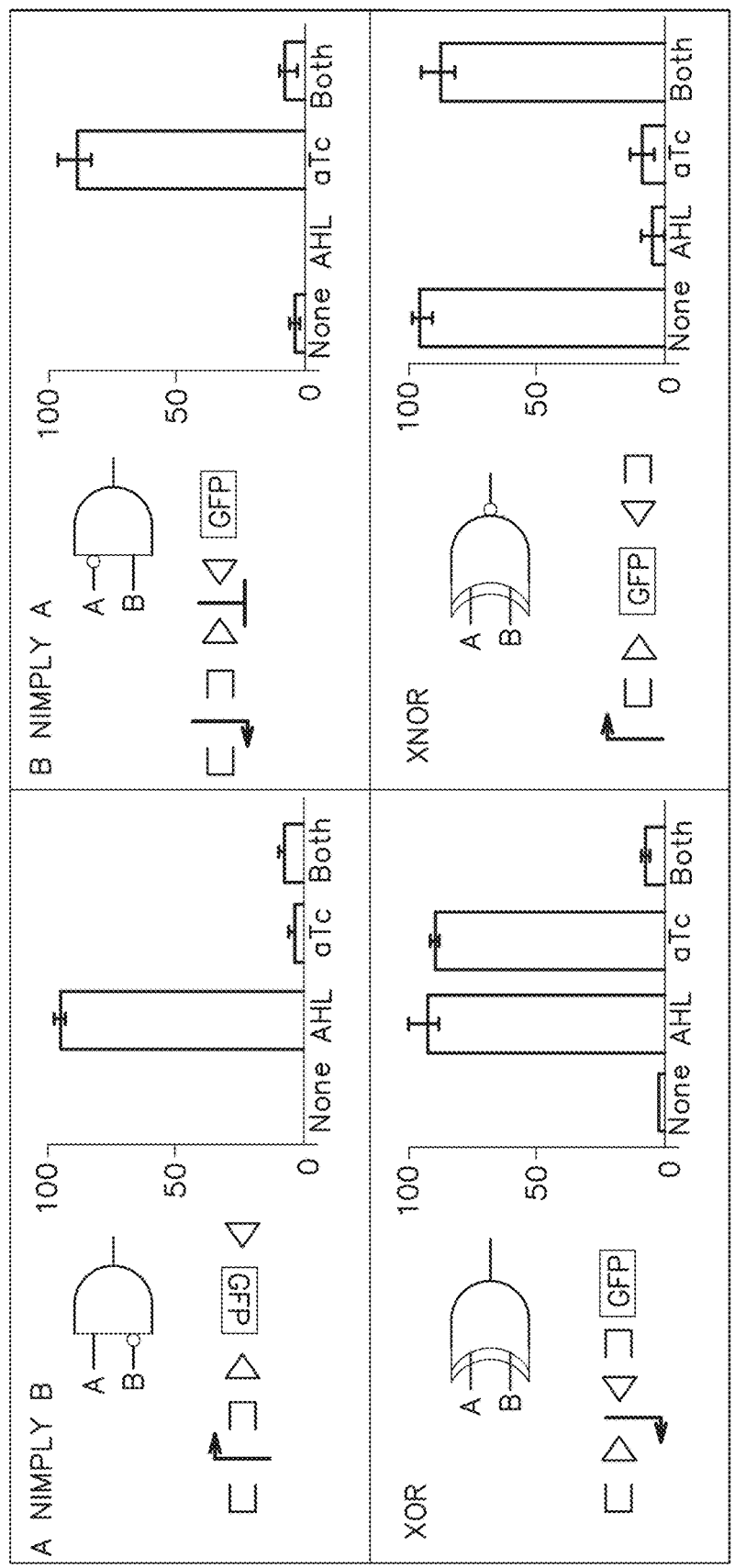
Figure 3:
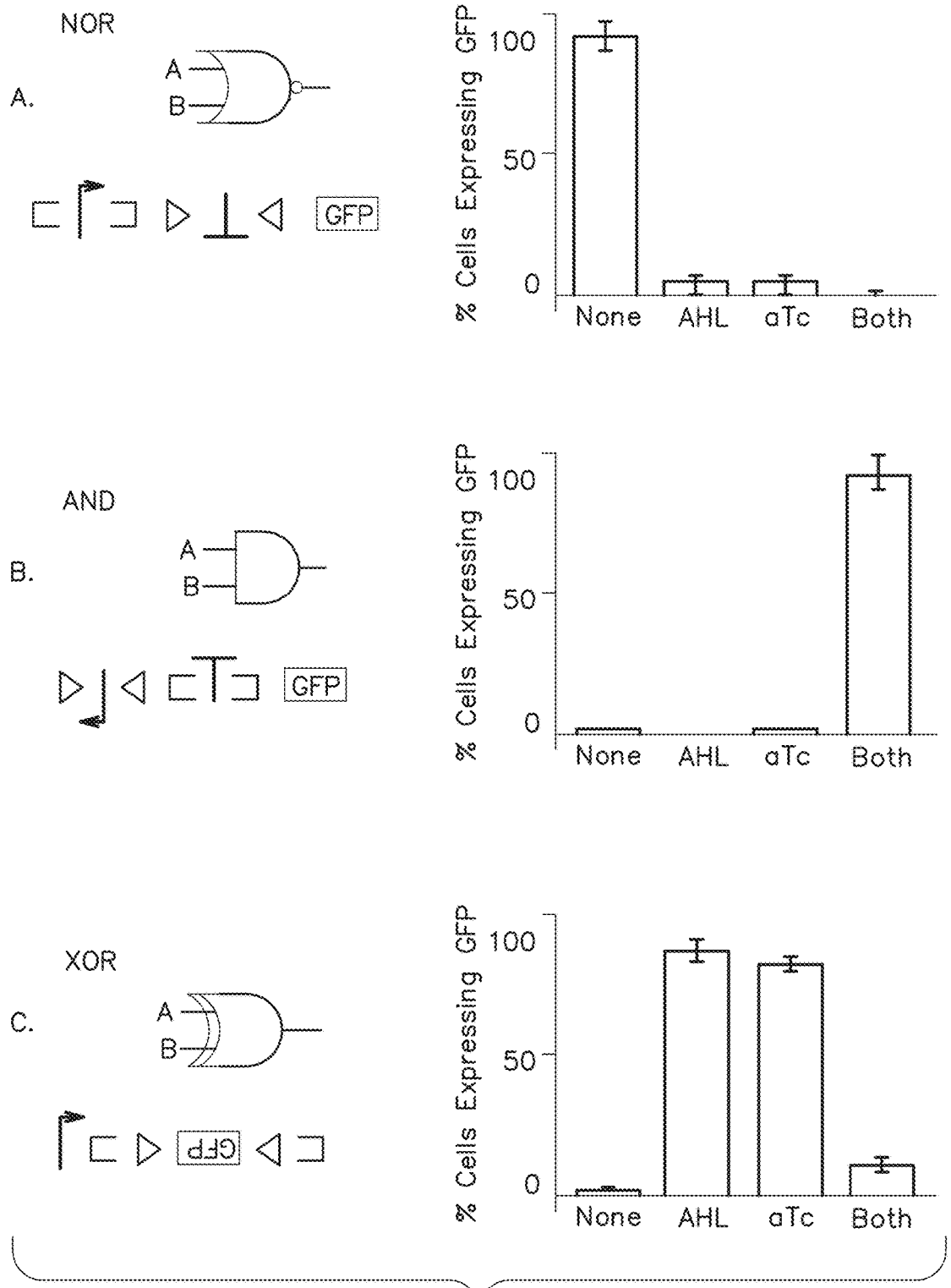

Specific primers used in FIG. 4:

```
                                                (SEQ ID NO: 1)
    P1: GGC GCG TAC TCC TAA GAA AC (SEQ ID NO: 2)
    P2: TCT CCG TCG TCA GGA TCA TC (SEQ ID NO: 3)
    P3: ATT AAA GAG GAG AAA GGT ACC ATG C (SEQ ID NO: 4)
    P4: AAA GTT AAA CAA AAT TAT TTG TAG AGG G
```

TABLE 2

Synthetic parts used to implement integrated logic and memory.

| Part Name | Part Type | Sequence | Source |
|---|---|---|---|
| proD | Promoter | CACAGCTAACACCACGTCGTCCCTATCTGCTGCCCTAGGTCT ATGAGTGGTTGCTGGATAACTTTACGGGCATGCATAAGGCTC GTATAATATATTCAGGGAGACCACAACGGTTTCCCTCTACAA ATAATTTTGTTTAACTTT (SEQ ID NO: 5) | 31 |
| T1 | Unidirectional terminator | GGCATCAAATAAAACGAAAGGCTCAGTCGAAAGACTGGGCC TTTCGTTTTATCTGTTGTTTGTCGGTGAACGCTCTCCTGAG TAGGACAAATCCGCCGCCCTAGA (SEQ ID NO: 6) | 32 |
| gfP | Output gene | ATGCGTAAAGGAGAAGAACTTTTCACTGGAGTTGTCCCAATT CTTGTTGAATTAGATGGTGATGTTAATGGGCACAAATTTTCT GTCAGTGGAGAGGGTGAAGGTGATGCAACATACGGAAAACTT ACCCTTAAATTTATTTGCACTACTGGAAAACTACCTGTTCCA TGGCCAACACTTGTCACTACTTTCGGTTATGGTGTTCAATGC TTTGCGAGATACCCAGATCATATGAAACAGCATGACTTTTTC AAGAGTGCCATGCCCGAAGGTTATGTACAGGAAGAACTATA TTTTTCAAAGATGACGGGAACTACAAGACACGTGCTGAAGTC AAGTTTGAAGGTGATACCCTTGTTAATAGAATCGAGTTAAAA GGTATTGATTTTAAAGAAGATGGAAACATTCTTGGACACAAA TTGGAATACAACTATAACTCACACAATGTATACATCATGGCA GACAAACAAAAGAATGGAATCAAAGTTAACTTCAAAATTAGA CACAACATTGAAGATGGAAGCGTTCAACTAGCAGACCATTAT CAACAAAATACTCCAATTGGCGATGGCCCTGTCCTTTTACCA GACAACCATTACCTGTCCACACAATCTGCCCTTTCGAAAGAT CCCAACGAAAAGAGAGACCACATGGTCCTTCTTGAGTTTGTA ACAGCTGCTGGGATTACACATGGCATGGATGAACTATACAAA TAA (SEQ ID NO: 7) | 32 |
| Bxb1 | Recombinase | ATGAGAGCCCTGGTAGTCATCCGCCTGTCCCGCGTCACCGA TGCTACGACTTCACCGGAGCGTCAGCTGGAGTCTTGCCAGC AGCTCTGCGCCCAGCGCGGCTGGGACGTCGTCGGGGTAGCG GAGGATCTGGACGTCTCCGGGGCGGTCGATCCGTTCGACCG GAAGCGCAGACCGAACCTGGCCCGGTGGCTAGCGTTCGAGG AGCAACCGTTCGACGTGATCGTGGCGTACCGGGTAGACCGG TTGACCCGATCGATCCGGCATCTGCAGCAGCTGGTCCACTG GGCCGAGGACCACAAGAAGCTGGTCGTCTCCGCGACCGAAG CGCACTTCGATACGACGACGCCGTTTGCGGCGGTCGTCATC GCGCTTATGGGAACGGTGGCGCAGATGGAATTAGAAGCGAT CAAAGAGCGGAACCGTTCGGCTGCGCATTTCAATATCCGCG CCGGGAAATACCGAGGATCCCTGCCGCCGTGGGGATACCTG CCTACGCGCGTGGACGGGGAGTGGCGGCTGGTGCCGGACCC TGTGCAGCGAGAGCGCATCCTCGAGGTGTATCACCGCGTCG TCGACAACCACGAGCCGCTGCACCTGGTGGCCCACGACCTG |33|

TABLE 2-continued

Synthetic parts used to implement integrated logic and memory.

| Part Name | Part Type | Sequence | Source |
|---|---|---|---|
| | | AACCGGCGTGGTGTCCTGTCGCCGAAGGACTACTTCGCGCA<br>GCTGCAAGGCCGCGAGCCGCAGGGCCGGGAGTGGTCGGCTA<br>CCGCGCTGAAGCGATCGATGATCTCCGAGGCGATGCTCGGG<br>TACGCGACTCTGAACGGTAAGACCGTCCGAGACGACGACGG<br>AGCCCCGCTGGTGCGGGCTGAGCCGATCCTGACCCGTGAGC<br>AGCTGGAGGCGCTGCGCGCCGAGCTCGTGAAGACCTCCCGG<br>GCGAAGCCCGCGGTGTCTACCCCGTCGCTGCTGCTGCGGGT<br>GTTGTTCTGCGCGGTGTGCGGGGAGCCCGCGTACAAGTTCG<br>CCGGGGGAGGACGTAAGCACCCGCGCTACCGCTGCCGCTCG<br>ATGGGGTTCCCGAAGCACTGCGGGAACGGCACGGTGGCGAT<br>GGCCGAGTGGGACGCGTTCTGCGAGGAGCAGGTGCTGGATC<br>TGCTCGGGGACGCGGAGCGTCTGGAGAAAGTCTGGGTAGCC<br>GGCTCGGACTCCGCGGTCGAACTCGCGGAGGTGAACGCGGA<br>GCTGGTGGACCTGACGTCGCTGATCGGCTCCCCGGCCTACC<br>GGGCCGGCTCTCCGCAGCGAGAAGCACTGGATGCCCGTATT<br>GCGGCGCTGGCCGCGCGGCAAGAGGAGCTGGAGGGTCTAGA<br>GGCTCGCCCGTCTGGCTGGGAGTGGCGCGAGACCGGGCAGC<br>GGTTCGGGGACTGGTGGCGGGAGCAGGACACCGCGGCAAAG<br>AACACCTGGCTTCGGTCGATGAACGTTCGGCTGACGTTCGA<br>CGTCCGCGGCGGGCTGACTCGCACGATCGACTTCGGGGATC<br>TGCAGGAGTACGAGCAGCATCTCAGGCTCGGCAGCGTGGTC<br>GAACGGCTACACACCGGGATGTCGTAG (SEQ ID NO: 8) | |
| Bxb1 attB | Recombinase recognition site | TCGGCCGGCTTGTCGACGACGCGGTCTCCGTCGTCAGGATC<br>ATCCGGGC (SEQ ID NO: 9) | 33 |
| Bxb1 attP | Recombinase recognition site | GTCGTGGTTTGTCTGGTCAACCACCGCGGTCTCAGTGGTGTA<br>CGGTACAAACCCCGAC (SEQ ID NO: 10) | 33 |
| phiC31 | Recombinase | ATGACACAAGGGGTTGTGACCGGGGTGGACACGTACGCGGG<br>TGCTTACGACCGTCAGTCGCGCGAGCGCGAGAATTCGAGCG<br>CAGCAAGCCCAGCGACACAGCGTAGCGCCAACGAAGACAAG<br>GCGGCCGACCTTCAGCGCGAAGTCGAGCGCGACGGGGGCCG<br>GTTCAGGTTCGTCGGGCATTTCAGCGAAGCGCCGGGCACGT<br>CGGCGTTCGGGACGGCGGAGCGCCCGGAGTTCGAACGCATC<br>CTGAACGAATGCCGCGCCGGGCGGCTCAACATGATCATTGT<br>CTATGACGTGTCGCGCTTCTCGCGCCTGAAGGTCATGGACG<br>CGATTCCGATTGTCTCGGAATTGCTCGCCCTGGGCGTGACG<br>ATTGTTTCCACTCAGGAAGGCGTCTTCCGGCAGGGAAACGT<br>CATGGACCTGATTCACCTGATTATGCGGCTCGACGCGTCGC<br>ACAAAGAATCTTCGCTGAAGTCGGCGAAGATTCTCGACACG<br>AAGAACCTTCAGCGCGAATTGGGCGGGTACGTCGGCGGGAA<br>GGCGCCTTACGGCTTCGAGCTTGTTTCGGAGACGAAGGAGA<br>TCACGCGCAACGGCCGAATGGTCAATGTCGTCATCAACAAG<br>CTTGCGCACTCGACCACTCCCCTTACCGGACCCTTCGAGTT<br>CGAGCCCGACGTAATCCGGTGGTGGTGGCGTGAGATCAAGA<br>CGCACAAACACCTTCCCTTCAAGCCGGGCAGTCAAGCCGCC<br>ATTCACCCGGGCAGCATCACGGGGCTTTGTAAGCGCATGGA<br>CGCTGACGCCGTGCCGACCCGGGGCGAGACGATTGGGAAGA<br>AGACCGCTTCAAGCGCCTGGGACCCGGCAACCGTTATGCGA<br>ATCCTTCGGGACCCGCGTATTGCGGGCTTCGCCGCTGAGGT<br>GATCTACAAGAAGAAGCCGGACGGCACGCCGACCACGAAGA<br>TTGAGGGGTTACCGCATTCAGCGCGACCCGATCACGCTCCGG<br>CCGGTCGAGCTTGATTGCGGACCGATCATCGAGCCCGCTGA<br>GTGGTATGAGCTTCAGGCGTGGTTGGACGGCAGGGGGCGCG<br>GCAAGGGGCTTTCCCGGGGCAAGCCATTCTGTCCGCCATG<br>GACAAGCTGTACTGCGAGTGTGGCGCCGTCATGACTTCGAA<br>GCGCGGGGAAGAATCGATCAAGGACTCTTACCGCTGCCGTC<br>GCCGGAAGGTGGTCGACCCGTCCGCACCTGGGCAGCACGAA<br>GGCACGTGCAACGTCAGCATGGCGGCACTCGACAAGTTCGT<br>TGCGGAACGCATCTTCAACAAGATCAGGCACGCCGAAGGCG<br>ACGAAGAGACGTTGGCGCTTCTGTGGGAAGCCGCCCGACGC<br>TTCGGCAAGCTCACTGAGGCGCCTGAGAAGAGCGGCGAACG<br>GGCGAACCTTGTTGCGGAGCGCGCCGACGCCCTGAACGCCC<br>TTGAAGAGCTGTACGAAGACCGCGCGGCAGGCGCGTACGAC<br>GGACCCGTTGGCAGGAAGCACTTCCGGAAGCAACAGGCAGC<br>GCTGACGCTCCGGCAGCAAGGGGCGGAAGAGCGGCTTGCCG<br>AACTTGAAGCCGCCGAAGCCCCGAAGCTTCCCCTTGACCAA<br>TGGTTCCCCGAAGACGCCGACGCTGACCCGACCGGCCCTAA<br>GTCGTGGTGGGGGCGCGCGTCAGTAGACGACAAGCGCGTGT<br>TCGTCGGCGCTCTTCGTAGACAAGATCGTTGTCACGAAGTCG<br>ACTACGGGCAGGGGGCAGGGAACGCCCATCGAGAAGCGCGC | 34 |

TABLE 2-continued

Synthetic parts used to implement integrated logic and memory.

| Part Name | Part Type | Sequence | Source |
|---|---|---|---|
| | | TTCGATCACGTGGGCGAAGCCGCCGACCGACGACGACGAAG ACGACGCCCAGGACGGCACGGAAGACGTAGCGGCGTAG (SEQ ID NO: 11) | |
| phiC31 attB | Recombinase recognition site | TGCGGGTGCCAGGGCGTGCCCTTGGGCTCCCCGGGCGCGTA CTCC (SEQ ID NO: 12) | 34 |
| phiC31 attP | Recombinase recognition site | GTGCCCCAACTGGGGTAACCTTTGAGTTCTCTCAGTTGGGGG (SEQ ID NO: 13) | 34 |
| proA | Promoter | CACAGCTAACACCACGTCGTCCCTATCTGCTGCCCTAGGTCT ATGAGTGGTTGCTGGATAACTTTACGGGCATGCATAAGGCTC GTAGGCTATATTCAGGGAGACCACAACGGTTTCCCTCTACAA ATAATTTTGTTTAACTTT (SEQ ID NO: 14) | 31 |
| proC | Promoter | CACAGCTAACACCACGTCGTCCCTATCTGCTGCCCTAGGTCT ATGAGTGGTTGCTGGATAACTTTACGGGCATGCATAAGGCTC GTATGATATATTCAGGGAGACCACAACGGTTTCCCTCTACAA ATAATTTTGTTTAACTTT (SEQ ID NO: 15) | 31 |

REFERENCES

Each of the below references are incorporated by reference herein.

1. Hasty, J., McMillen, D. & Collins, J. J. Engineered gene circuits. Nature 420, 224-230, doi:10.1038/nature01257 nature01257 [pii] (2002).
2. Regot, S. et al. Distributed biological computation with multicellular engineered networks. Nature 469, 207-211, doi:10.1038/nature09679 (2011).
3. Auslander, S., Auslander, D., Muller, M., Wieland, M. & Fussenegger, M. Programmable single-cell mammalian biocomputers. Nature 487, 123-127, doi:10.1038/nature11149 (2012).
4. Nissim, L. & Bar-Ziv, R. H. A tunable dual-promoter integrator for targeting of cancer cells. Mol Syst Biol 6, 444, doi:10.1038/msb.2010.99 (2010).
5. Ajo-Franklin, C. M. et al. Rational design of memory in eukaryotic cells. Gene Dev 21, 2271-2276, doi:Doi 10.1101/Gad.1586107 (2007).
6. Elowitz, M. B. & Leibler, S. A synthetic oscillatory network of transcriptional regulators. Nature 403, 335-338, doi:10.1038/35002125 (2000).
7. Tamsir, A., Tabor, J. J. & Voigt, C. A. Robust multicellular computing using genetically encoded NOR gates and chemical 'wires'. Nature, doi:nature09565 [pii] 10.1038/nature09565 (2010).
8. Benenson, Y. Biomolecular computing systems: principles, progress and potential. Nat Rev Genet 13, 455-468, doi:10.1038/nrg3197 (2012).
9. Friedland, A. E. et al. Synthetic gene networks that count. Science 324, 1199-1202, doi:324/5931/1199 [pii] 10.1126/science.1172005 (2009).
10. Ham, T. S., Lee, S. K., Keasling, J. D. & Arkin, A. P. Design and construction of a double inversion recombination switch for heritable sequential genetic memory. PLoS One 3, e2815, doi:10.1371/journal.pone.0002815 (2008).
11. Ghosh, P., Pannunzio, N. R. & Hatfull, G. F. Synapsis in phage Bxb1 integration: selection mechanism for the correct pair of recombination sites. J Mol Biol 349, 331-348, doi:10.1016/j.jmb.2005.03.043 (2005).
12. Kim, A. I. et al. Mycobacteriophage Bxb1 integrates into the *Mycobacterium smegmatis* groEL1 gene. Mol Microbiol 50, 463-473 (2003).
13. Groth, A. C., Olivares, E. C., Thyagarajan, B. & Calos, M. P. A phage integrase directs efficient site-specific integration in human cells. Proc Natl Acad Sci USA 97, 5995-6000, doi:10.1073/pnas.090527097 (2000).
14. Callura, J. M., Cantor, C. R. & Collins, J. J. Genetic switchboard for synthetic biology applications. Proc Natl Acad Sci USA 109, 5850-5855, doi:10.1073/pnas.1203808109 (2012).
15. Tabor, J. J. et al. A synthetic genetic edge detection program. Cell 137, 1272-1281, doi:50092-8674(09)00509-1 [pii] 10.1016/j.cell.2009.04.048 (2009).
16. Win, M. N. & Smolke, C. D. Higher-order cellular information processing with synthetic RNA devices. Science 322, 456-460, doi:322/5900/456 [pii]10.1126/science.1160311 (2008).
17. Rinaudo, K. et al. A universal RNAi-based logic evaluator that operates in mammalian cells. Nat Biotechnol 25, 795-801, doi:10.1038/nbt1307 (2007).
18. Gibson, D. G. et al. Enzymatic assembly of DNA molecules up to several hundred kilobases. Nature methods 6, 343-345, doi:10.1038/nmeth.1318 (2009).
19. Bonnet, J., Subsoontorn, P. & Endy, D. Rewritable digital data storage in live cells via engineered control of recombination directionality. Proc Natl Acad Sci USA 109, 8884-8889, doi:10.1073/pnas.1202344109 (2012).
20. Groth, A. C. & Calos, M. P. Phage integrases: biology and applications. J Mol Biol 335, 667-678, doi: S0022283603013561 [pii] (2004).
21. Gordley, R. M., Gersbach, C. A. & Barbas, C. F., 3rd. Synthesis of programmable integrases. Proc Natl Acad Sci USA 106, 5053-5058, doi:0812502106 [pii] 10.1073/pnas.0812502106 (2009).
22. Lux, M. W., Bramlett, B. W., Ball, D. A. & Peccoud, J. Genetic design automation: engineering fantasy or scientific renewal? Trends in Biotechnology 30, 120-126 (2012).
23. Jang, S. S., Oishi, K. T., Egbert, R. G. & Klavins, E. Specification and Simulation of Synthetic Multicelled Behaviors. ACS Synthetic Biology 1, 365-374, doi: 10.1021/sb300034m (2012).

24. McMillen, D., Kopell, N., Hasty, J. & Collins, J. J. Synchronizing genetic relaxation oscillators by intercell signaling. Proc Natl Acad Sci USA 99, 679-684, doi: 10.1073/pnas.02264229999/2/679 [pii] (2002).
25. You, L., Cox, R. S., Weiss, R. & Arnold, F. H. Programmed population control by cell-cell communication and regulated killing. Nature 428, 868-871 (2004).
26. Bacchus, W. et al. Synthetic two-way communication between mammalian cells. Nat Biotech 30, 991-996, doi: nature.com/nbt/journal/v30/n10/abs/nbt.2351.html-supplementary-information (2012).
27. Sambrook, J., Fritsch, E. F. & Maniatis, T. Molecular Cloning: A Laboratory Manual Cold Spring Laboratory Press 2 (1989).
28. Gibson, D. G. et al. Enzymatic assembly of DNA molecules up to several hundred kilobases. Nature methods 6, 343-345 (2009).
29. Isaacs, F. J. et al. Engineered riboregulators enable post-transcriptional control of gene expression. Nat Biotechnol 22, 841-847 (2004).
30. Callura, J. M., Cantor, C. R. & Collins, J. J. Genetic switchboard for synthetic biology applications. Proceedings of the National Academy of Sciences 109, 5850-5855 (2012).
31. Davis, J. H., Rubin, A. J. & Sauer, R. T. Design, construction and characterization of a set of insulated bacterial promoters. Nucleic Acids Res 39, 1131-1141 (2011).
32. Friedland, A. E. et al. Synthetic gene networks that count. Science 324, 1199-1202 (2009).
33. Ghosh, P., Pannunzio, N. R. & Hatfull, G. F. Synapsis in phage Bxb1 integration: selection mechanism for the correct pair of recombination sites. J Mol Biol 349, 331-348 (2005).
34. Groth, A. C., Olivares, E. C., Thyagarajan, B. & Calos, M. P. A phage integrase directs efficient site-specific integration in human cells. Proc Natl Acad Sci USA 97, 5995-6000 (2000).
35. Kilby, N. J., Trends Genet. 9, 413 (December, 1993).
36. Haynes, K. A., J Biol Eng 2, 8 (2008).
37. Ham, T. S., Biotechnol Bioeng 94, 1 (2006).
38. Datsenko, K. A., Proc Natl Acad Sci USA 97, 6640 (2000).
39. Ow & Ausubel, J. Bacteriol. 155, 704-713 (1983).
40. Lorbach et al., J. Mol. Biol., 296, 1175-81 (2000).
41. Loessner et al., Mol. Micro. 35, 324-340 (2000).
42. Matsuura et al., J Bacteriol. 178, 3374-3376 (1996).
43. Cheng, A. A. & Lu, T. K. Synthetic Biology: An Emerging Engineering Discipline. Annual review of biomedical engineering 14, 155-178 (2012).
44. Lu, T. K., Khalil, A. S. & Collins, J. J. Next-generation synthetic gene networks. Nat Biotechnol 27, 1139-1150 (2009).
45. Mijakovic, I., Petranovic, D. & Jensen, P. R. Tunable promoters in systems biology. Current Opinion in Biotechnology 16, 329-335 (2005).
46. Thomson, J. G. & Ow, D. W. Site-specific recombination systems for the genetic manipulation of eukaryotic genomes. Genesis 44, 465-476 (2006).
47. Bai Flagfeldt, D., Siewers, V., Huang, L. & Nielsen, J. Characterization of chromosomal integration sites for heterologous gene expression in Saccharomyces cerevisiae. Yeast 26, 545-551 (2009).
48. Voth, W. P., Richards, J. D., Shaw, J. M. & Stillman, D. J. Yeast vectors for integration at the HO locus. Nucleic Acids Research 29, e59 (2001).
49. Gerasimova, T. I. & Corces, V. G. CHROMATIN INSULATORS AND BOUNDARIES: Effects on Transcription and Nuclear Organization. Annual Review of Genetics 35, 193-208 (2001).
50. Grilly, C., Stricker, J., Pang, W. L., Bennett, M. R. & Hasty, J. A synthetic gene network for tuning protein degradation in Saccharomyces cerevisiae. Mol Syst Biol 3, 127 (2007).
51. Ferreira, J. P., Overton, K. W. & Wang, C. L. Tuning gene expression with synthetic upstream open reading frames. Proceedings of the National Academy of Sciences 110, 11284-11289 (2013).
52. Dvir, S., Velten, L., Sharon, E., Zeevi, D., Carey, L. B., Weinberger, A. & Segal, E. Deciphering the rules by which 5'-UTR sequences affect protein expression in yeast. Proceedings of the National Academy of Sciences (2013).
53. Blount, B. A., Weenink, T., Vasylechko, S. & Ellis, T. Rational diversification of a promoter providing fine-tuned expression and orthogonal regulation for synthetic biology. PLoS One 7, e33279 (2012).
54. Ringrose, L., Chabanis, S., Angrand, P. O., Woodroofe, C. & Stewart, A. F. Quantitative comparison of DNA looping in vitro and in vivo: chromatin increases effective DNA flexibility at short distances. EMBO J 18, 6630-6641 (1999).
55. Lindstrom, D. L. & Gottschling, D. E. The Mother Enrichment Program: A Genetic System for Facile Replicative Life Span Analysis in Saccharomyces cerevisiae. Genetics 183, 413-422 (2009).
56. Colman-Lerner, A., Chin, T. E. & Brent, R. Yeast Cbk1 and Mob2 activate daughter-specific genetic programs to induce asymmetric cell fates. Cell 107, 739-750 (2001).
57. Bennett, M. R. & Hasty, J. Microfluidic devices for measuring gene network dynamics in single cells. Nat Rev Genet 10, 628-638 (2009).
58. Daniel, R., Rubens, J. R., Sarpeshkar, R. & Lu, T. K. Synthetic analog computation in living cells. Nature 497, 619-623 (2013).
59. Neuteboom, L. W., Lindhout, B. I., Saman, I. L., Hooykaas, P. J. & van der Zaal, B. J. Effects of different zinc finger transcription factors on genomic targets. Biochem Biophys Res Commun 339, 263-270 (2006).
60. Kim, S., Kim, E. J. & Kim, J. S. Construction of combinatorial libraries that encode zinc finger-based transcription factors. Methods Mol Biol 649, 133-147 (2010).
61. Kang, J. S. & Kim, J. S. Zinc finger proteins as designer transcription factors. J Biol Chem 275, 8742-8748 (2000).
62. Blancafort, P., Chen, E. I., Gonzalez, B., Bergquist, S., Zijlstra, A., Guthy, D., Brachat, A., Brakenhoff, R. H., Quigley, J. P., Erdmann, D. & Barbas, C. F., 3rd. Genetic reprogramming of tumor cells by zinc finger transcription factors. Proc Natl Acad Sci USA 102, 11716-11721 (2005).
63. Ghosh, P., Wasil, L. R. & Hatfull, G. F. Control of phage Bxb1 excision by a novel recombination directionality factor. PLoS Biol 4, e186 (2006).
64. Ghosh, P., Kim, A. I. & Hatfull, G. F. The Orientation of Mycobacteriophage Bxb1 Integration Is Solely Dependent on the Central Dinucleotide of attP and attB. Molecular Cell 12, 1101-1111 (2003).
65. Ghosh, P., Bibb, L. A. & Hatfull, G. F. Two-step site selection for serine-integrase-mediated excision: DNA-directed integrase conformation and central dinucleotide proofreading. Proceedings of the National Academy of Sciences 105, 3238-3243 (2008).

66. Zhang, L., Wang, L., Wang, J., Ou, X., Zhao, G. & Ding, X. DNA Cleavage is Independent of Synapsis during *Streptomyces* Phage φBT1 Integrase-Mediated Site-Specific Recombination. Journal of Molecular Cell Biology 2, 264-275 (2010).
67. Nevozhay, D., Adams, R. M., Murphy, K. F., Josić, K. & Balázsi, G. Negative autoregulation linearizes the dose-response and suppresses the heterogeneity of gene expression. Proc Natl Acad Sci USA 106, 5123-5128 (2009).
68. Lou et al., Ribozyme-based insulator parts buffer synthetic circuits from genetic context. Nature Biotechnology 30, 1137-1142 (2012).
70. Qi et al., RNA processing enables predictable programming of gene expression. Nature Biotechnology 30, 1002-1006 (2012).
71. Mutalik et al. Precise and reliable gene expression via standard transcription and translation initiation elements. Nature Methods 10, 354-360 (2013).
72. Colloms et al. Rapid metabolic pathway assembly and modification using serine integrase site-specific recombination. Nucleic Acids Research. (2013) doi: 10.1093/nar/gkt1101.

EQUIVALENTS

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

All references, patents and patent applications disclosed herein are incorporated by reference with respect to the subject matter for which each is cited, which in some cases may encompass the entirety of the document.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A synthetic logic and memory system operable in a single cell, the system comprising
   (a) a plurality of engineered nucleic acid sequences encoding at least two inducible promoters and at least two recombinases, wherein each recombinase-encoding nucleic acid sequence of the plurality is operably linked to a different inducible promoter,
   (b) a plurality of logic gates, each comprising an engineered output nucleic acid sequence operably linked, or conditionally operably linked, to (1) a promoter and/or (2) a unidirectional terminator, wherein at least one of the output nucleic acid sequence, the promoter and the unidirectional terminator is flanked by a forward and a reverse recognition site of at least one of the recombinases of (a), and
   wherein the logic gates provide AND, OR, NAND, NOR, XOR, XNOR, A IMPLY B, B IMPLY A, A NIMPLY B and B NIMPLY A two-input Boolean logic functions.

2. The synthetic logic and memory system of claim 1, wherein the at least two recombinases are irreversible recombinases.

3. The synthetic logic and memory system of claim 2, wherein the at least two irreversible recombinases are serine recombinases.

4. The synthetic logic and memory system of claim 3, wherein the serine recombinases are Bxb1 and phiC31.

5. The synthetic logic system of claim 1, further comprising A, NOT A, B and NOT B logic gates.

6. The synthetic logic and memory system of claim 1, further comprising TRUE and/or FALSE logic gates,
   wherein the TRUE logic gate is a single genetic circuit construct of an output nucleic acid sequence operably linked to a promoter, and
   wherein the FALSE gate is a single genetic circuit construct of an output nucleic acid sequence immediately downstream of an inverted promoter.

7. The synthetic logic and memory system of claim 1, wherein the output nucleic acid encodes an output product.

8. The synthetic logic and memory system of claim 7, wherein the output product is a reporter protein, a transcriptional repressor, a transcriptional activator, a selection marker, an enzyme, a receptor protein, a ligand protein, an RNA, a riboswitch, a short-hairpin RNA or a recombinase.

9. The synthetic logic and memory system of claim 1, wherein the NOR logic gate comprises (a) an output nucleic acid operably linked to a promoter and (b) two unidirectional terminators, and wherein each terminator is inverted and flanked by different forward and reverse recombinase recognition sites and is located between the promoter and the output nucleic acid.

10. The synthetic logic and memory system of claim 1, wherein the AND logic gate comprises an output nucleic acid conditionally operably linked to a promoter, and wherein the output nucleic acid and the promoter is each inverted and flanked by different forward and reverse recombinase recognition sites.

11. The synthetic logic and memory system of claim 1, wherein the OR logic gate comprises an output nucleic acid conditionally operably linked to two promoters, and wherein each promoter is inverted and flanked by different forward and reverse recombinase recognition sites.

12. The synthetic logic and memory system of claim 1, wherein the NAND logic gate comprises an output nucleic acid operably linked to two promoters, and wherein each promoter is flanked by different forward and reverse recombinase recognition sites.

13. The synthetic logic and memory system of claim 5, wherein the A logic gate comprises an output nucleic acid conditionally operably linked to a promoter, and wherein the output nucleic acid is inverted and flanked by forward and reverse recombinase recognition sites.

14. The synthetic logic and memory system of claim 5, wherein the B logic gate comprises an output nucleic acid conditionally operably linked to a promoter, and wherein the promoter is inverted and flanked by forward and reverse recombinase recognition sites.

15. The synthetic logic and memory system of claim 5, wherein the NOT A logic gate comprises an output nucleic acid operably linked to a promoter, and wherein the output nucleic acid is flanked by forward and reverse recombinase recognition sites.

16. The synthetic logic and memory system of claim 5, wherein the NOT B logic gate comprises an output nucleic acid operably linked to a promoter, and wherein the promoter is flanked by forward and reverse recombinase recognition sites.

17. The synthetic logic and memory system of claim 1, wherein the A IMPLY B logic gate comprises an output nucleic acid operably linked to a first promoter and conditionally operably linked to a second promoter, and wherein the first promoter is flanked by forward and reverse recombinase recognition sites, and the second promoter is inverted and flanked by different forward and reverse recombinase recognition sites and is located between the first promoter and the output nucleic acid.

18. The synthetic logic and memory system of claim 1, wherein the B IMPLY A logic gate comprises an output nucleic acid conditionally operably linked to a first promoter and operably linked to a second promoter, and wherein the first promoter is inverted and flanked by forward and reverse recombinase recognition sites, and the second promoter is flanked by different forward and reverse recombinase recognition sites and is located between the first promoter and the output nucleic acid.

19. The synthetic logic and memory system of claim 1, wherein the A NIMPLY B logic gate comprises an output nucleic acid conditionally operably linked to a promoter, and wherein the promoter is flanked by forward and reverse recombinase recognition sites, and the output nucleic acid is inverted and flanked by different forward and reverse recombinase recognition sites.

20. The synthetic logic and memory system of claim 1, wherein the B NIMPLY A logic gate comprises an output nucleic acid conditionally operably linked to a promoter and a unidirectional terminator, and wherein the promoter is inverted and flanked by forward and reverse recombinase recognition sites, and the terminator is inverted and flanked by different forward and reverse recombinase recognition sites and is located between the promoter and the output nucleic acid.

21. The synthetic logic and memory system of claim 1, wherein the XOR logic gate comprises an output nucleic acid conditionally operably linked to a promoter, and wherein the promoter is inverted and flanked by two forward and reverse recombinase recognition sites.

22. The synthetic logic and memory system of claim 1, wherein the XNOR logic gate comprises an output nucleic acid operably linked to a promoter, and wherein the output nucleic acid is flanked by two forward and reverse recombinase recognition sites.

23. A cell comprising the synthetic logic and memory system of claim 1.

24. A cell comprising at least one irreversible recombinase and at least two logic gates of the synthetic logic and memory system of claim 1.

25. A method of altering gene expression or cellular differentiation comprising
    engineering a cell to comprise at least one recombinase and at least two logic gates of the synthetic logic and memory system of claim 1.

* * * * *